(12) United States Patent
Ohmori et al.

(10) Patent No.: US 6,885,990 B1
(45) Date of Patent: Apr. 26, 2005

(54) SPEECH RECOGNITION BASED ON INTERACTIVE INFORMATION RETRIEVAL SCHEME USING DIALOGUE CONTROL TO REDUCE USER STRESS

(75) Inventors: Kumiko Ohmori, Chigasaki (JP); Masanobu Higashida, Kyoto-fu (JP); Noriko Mizusawa, Yokosuka (JP)

(73) Assignee: Nippon Telegraph and Telephone Company, Tokyo (JP)

( * ) Notice: Subject to any disclaimer, the term of this patent is extended or adjusted under 35 U.S.C. 154(b) by 600 days.

(21) Appl. No.: 09/583,219

(22) Filed: May 30, 2000

(30) Foreign Application Priority Data

| May 31, 1999 | (JP) | ............................. P11-150855 |
| Aug. 4, 1999 | (JP) | ............................. P11-221820 |
| Aug. 17, 1999 | (JP) | ............................. P11-230216 |

(51) Int. Cl.[7] .................. G10L 15/08; G06F 17/30
(52) U.S. Cl. ..................... 704/270; 704/10; 707/3
(58) Field of Search ..................... 704/7, 10, 257, 704/270, 270.1; 707/3, 5

(56) References Cited

U.S. PATENT DOCUMENTS

| 4,866,778 A |   | 9/1989 | Baker |
| 5,677,991 A |   | 10/1997 | Hsu et al. |
| 5,729,659 A | * | 3/1998 | Potter ............................. 704/270 |
| 5,797,116 A | * | 8/1998 | Yamada et al. ............... 704/10 |
| 6,236,967 B1 | * | 5/2001 | Brotman et al. ............. 704/270 |
| 6,526,380 B1 | * | 2/2003 | Thelen et al. ................ 704/251 |

FOREIGN PATENT DOCUMENTS

| EP | 0 651 372 A2 | 5/1995 |
| EP | 0 865 014 A2 | 9/1998 |
| EP | 0 905 677 A1 | 3/1999 |
| JP | 03-177899 | 8/1991 |
| JP | 04-002198 | 1/1992 |
| JP | 08-202387 | 8/1996 |

(Continued)

OTHER PUBLICATIONS

Andreas Kellner et al., "Strategies for Name Recognition in Automatic Directory Assistance Systems", Proc. 4th IEEE Workshop on Interactive Voice Technology for Telecommunications Applications (IVTTA), 'Online' Sep. 1998, pp. 21–26, XP002264883.

Tim Barry et al., "The Simultaneous Use of Three Machine Speech Recognition Systems to Increase Recognition Accuracy", Proceedings of the IEEE National Aerospace and Electronics Conference Maecon, New York, NY, US, May 23, 1994, pp. 667–671, XP002064395.

Primary Examiner—Abul K. Azad
(74) Attorney, Agent, or Firm—Brenda O. Holmes; Kilpatrick Stockton LLP

(57) ABSTRACT

In the disclosed speech recognition based interactive information retrieval scheme, the recognition target words in the speech recognition database are divided into prioritized recognition target words that constitute a number of data that can be processed by the speech recognition processing in the prescribed processing time and that have relatively higher importance levels based on statistical information, and the other non-prioritized recognition target words. Then, the speech recognition processing for the speech input with respect to the prioritized recognition target words is carried out at higher priority, and a confirmation process is carried out when the recognition result satisfies a prescribed condition for judging that the retrieval key can be determined only by a confirmation process with the user. On the other hand, a related information query to request the user to enter another speech input for a related information of the retrieval key is carried out when the recognition result does not satisfy the prescribed condition, and the original recognition result is adjusted according to the recognition result for another speech input. In this way, the retrieval key determination is realized through natural speech dialogues with the user.

23 Claims, 36 Drawing Sheets

FOREIGN PATENT DOCUMENTS

| | | |
|---|---|---|
| JP | 2589300 | 12/1996 |
| JP | 2859299 | 12/1996 |
| JP | 08-320697 | 12/1996 |
| JP | 09330195 | 12/1997 |
| JP | 10143523 | 5/1998 |
| WO | WO 98/34217 | 8/1998 |

* cited by examiner

FIG.2

| ATTRIBUTE VALUES OF ATTRIBUTE #1 | ATTRIBUTE VALUES OF ATTRIBUTE #2 | ... | ATTRIBUTE VALUES OF ATTRIBUTE #α |
|---|---|---|---|
| ATTRIBUTE VALUE #1₁ | ATTRIBUTE VALUE #2₁ | ... | ATTRIBUTE VALUE #α₁ |
| ATTRIBUTE VALUE #1₁ | ATTRIBUTE VALUE #2₁ | ... | ATTRIBUTE VALUE #α₂ |
| ATTRIBUTE VALUE #1₁ | | ... | ATTRIBUTE VALUE #α₃ |
| ATTRIBUTE VALUE #1₁ | ATTRIBUTE VALUE #2₂ | ... | ATTRIBUTE VALUE #α₄ |
| | | ... | |
| ATTRIBUTE VALUE #1₂ | ATTRIBUTE VALUE #2₃ | ... | |
| ATTRIBUTE VALUE #1₂ | ATTRIBUTE VALUE #2ⱼ | ... | |
| ATTRIBUTE VALUE #1₂ | | ... | |
| | ATTRIBUTE VALUE #2ⱼ | ... | |
| ATTRIBUTE VALUE #1₃ | | ... | |
| ATTRIBUTE VALUE #1₃ | ATTRIBUTE VALUE #2ₗ | ... | |
| | | ... | |
| ATTRIBUTE VALUE #1₃ | | ... | |
| | | ... | |
| ATTRIBUTE VALUE #1ₙ | | ... | |
| ATTRIBUTE VALUE #1ₙ | ATTRIBUTE VALUE #2ₚ | ... | |
| | ATTRIBUTE VALUE #2ₚ | ... | |
| ATTRIBUTE VALUE #1ₙ | | ... | ATTRIBUTE VALUE #α₂ |

FIG.4

| ATTRIBUTE VALUES OF ATTRIBUTE #1 (PREFECTURE) | ATTRIBUTE VALUES OF ATTRIBUTE #2 (CITY/TOWN) | ATTRIBUTE VALUES OF ATTRIBUTE #3 (SECTION) |
|---|---|---|
| TOKYO | MINATO | ROPPONGI |
| TOKYO | MINATO | AKASAKA |
| TOKYO | MINATO | SHIBA |
| TOKYO | MINATO | DAIBA |
| TOKYO | MINATO | |
| TOKYO | MINATO | |
| TOKYO | MINATO | |
| TOKYO | -- | -- |
| TOKYO | CHUOU | GINZA |
| TOKYO | CHUOU | NIHONBASHI |
| TOKYO | CHUOU | |
| TOKYO | -- | -- |
| TOKYO | CHIYODA | |
| TOKYO | CHIYODA | |
| TOKYO | SUGINAMI | |
| TOKYO | SUGINAMI | |
| -- | -- | -- |
| KANAGAWA | YOKOHAMA | ISOGO |
| KANAGAWA | YOKOHAMA | KANAZAWA |
| KANAGAWA | -- | -- |
| KANAGAWA | YOKOSUKA | HIKARINOOKA |
| KANAGAWA | | NAGASAWA |
| KANAGAWA | CHIGASAKI | -- |

FIG.5

| OUTPUT ORDER | ATTRIBUTE VALUE (CITY/TOWN) CANDIDATE | RECOGNITION LIKELIHOOD |
|---|---|---|
| 1 | AMAGASAKI | 970 |
| 2 | CHUOU | 900 |
| 3 | YOKKAICHI | 820 |
| 4 | CHIYODA | 710 |
| . | . | . |
| . | . | . |
| 50 | YOKOHAMA | . |
| . | . | . |
| . | . | . |
| 100 | YOKOSUKA | 14 |

DESCENDING ORDER OF RECOGNITION LIKELIHOOD

| OUTPUT ORDER | ATTRIBUTE VALUE (CITY/TOWN) CANDIDATE | RECOGNITION LIKELIHOOD |
|---|---|---|
| 1 | CHIGASAKI | 1,200 |
| 2 | TAKASAKI | 1,050 |
| 3 | TAKAMATU | 980 |
| 4 | AMAGASAKI | 970 |
| . | . | . |
| 10 | YOKKAICHI | 820 |
| . | . | . |
| 500 | YOKOHAMA | . |
| . | . | . |
| 2100 | NAHA | 2 |

DESCENDING ORDER OF RECOGNITION LIKELIHOOD

CITY/TOWN CONTAINED IN NON-PRIORITZED RECOGNITION TARGET WORDS

FIG.7

| OUTPUT ORDER | RELATED ATTRIBUTE VALUE CANDIDATE | RECOGNITION LIKELIHOOD |
|---|---|---|
| 1 | KAGAWA | 1,020 |
| 2 | KANAGAWA | 1,000 |
| 3 | ISHIKAWA | 910 |
| 4 | FUKUOKA | 870 |
| . | . | . |
| . | . | . |
| 47 | HOKKAIDO | 34 |

DESCENDING ORDER OF RECOGNITION LIKELIHOOD ↓

FIG.11

| SPEECH RECOGNITION RESULT | RECOGNITION LIKELIHOOD |
|---|---|
| SPEECH RETRIEVAL KEY CANDIDATE #1 | RETRIEVAL KEY RECOGNITION LIKELIHOOD OF RETRIEVAL KEY #1 |
| SPEECH RETRIEVAL KEY CANDIDATE #2 | RETRIEVAL KEY RECOGNITION LIKELIHOOD OF RETRIEVAL KEY #2 |
| SPEECH RETRIEVAL KEY CANDIDATE #3 | RETRIEVAL KEY RECOGNITION LIKELIHOOD OF RETRIEVAL KEY #3 |
| ‥ | ‥ |
| SPEECH RETRIEVAL KEY CANDIDATE #i | RETRIEVAL KEY RECOGNITION LIKELIHOOD OF RETRIEVAL KEY #i |

DESCENDING ORDER OF RETRIEVAL KEY RECOGNITION LIKELIHOOD →

FIG.12

| SPEECH RETRIEVAL KEY #1 | RELATED ATTRIBUTE #1 OF RETRIEVAL KEY #1 | . | RELATED ATTRIBUTE #m OF RETRIEVAL KEY #1 |
|---|---|---|---|
| SPEECH RETRIEVAL KEY #2 | RELATED ATTRIBUTE OF RETRIEVAL KEY #2 | . | RELATED ATTRIBUTE OF RETRIEVAL KEY #2 |
| SPEECH RETRIEVAL KEY #3 | RELATED ATTRIBUTE OF RETRIEVAL KEY #3 | . | RELATED ATTRIBUTE OF RETRIEVAL KEY #3 |
| . | . | . | . |
| SPEECH RETRIEVAL KEY #i | RELATED ATTRIBUTE OF RETRIEVAL KEY #i | . | RELATED ATTRIBUTE OF RETRIEVAL KEY #i |
| . | . | . | . |
| SPEECH RETRIEVAL KEY #n | RELATED ATTRIBUTE OF RETRIEVAL KEY #n | . | RELATED ATTRIBUTE OF RETRIEVAL KEY #n |
| . | . | . | . |
| . | . | . | . |
| SPEECH RETRIEVAL KEY #z | RELATED ATTRIBUTE OF RETRIEVAL KEY #z | . | RELATED ATTRIBUTE OF RETRIEVAL KEY #z |

FIG.13

DESCENDING ORDER OF RELATED INFORMATION RECOGNITION LIKELIHOOD →

| ATTRIBUTE INFORMATION | RELATED INFORMATION RECOGNITION LIKELIHOOD | RECOGNITION LIKELIHOOD OF RELATED INFORMATION CANDIDATE #1 | RECOGNITION LIKELIHOOD OF RELATED INFORMATION CANDIDATE #2 | RECOGNITION LIKELIHOOD OF RELATED INFORMATION CANDIDATE #3 | | RECOGNITION LIKELIHOOD OF RELATED INFORMATION CANDIDATE #n | | | RECOGNITION LIKELIHOOD OF RELATED INFORMATION CANDIDATE #z |
|---|---|---|---|---|---|---|---|---|---|
| RELATED INFORMATION CANDIDATE #1 | | | | | | | | | |
| RELATED INFORMATION CANDIDATE #2 | | | | | | | | | |
| RELATED INFORMATION CANDIDATE #3 | | | | | | | | | |
| . | | | | | | | | | |
| . | | | | | | | | | |
| RELATED INFORMATION CANDIDATE #n | | | | | | | | | |
| . | | | | | | | | | |
| . | | | | | | | | | |
| RELATED INFORMATION CANDIDATE #z | | | | | | | | | |

FIG.15

| | 1ST LEVEL | 2ND LEVEL | 3RD LEVEL | 4TH LEVEL |
|---|---|---|---|---|
| 1 | BERLIN PHILHARMONIC | BERLIN PHILHARMONIC | BERLIN PHILHARMONIC | BERLIN PHILHARMONIC |
| 2 | VIENNA PHILHARMONIC | VIENNA PHILHARMONIC | VIENNA PHILHARMONIC | VIENNA PHILHARMONIC |
| 3 | NEW YORK PHILHARMONIC | NEW YORK PHILHARMONIC | NEW YORK PHILHARMONIC | NEW YORK PHILHARMONIC |
| 4 | LONDON SYMPHONY | LONDON SYMPHONY | LONDON SYMPHONY | LONDON SYMPHONY |
| 5 | CHICAGO SYMPHONY | CHICAGO SYMPHONY | CHICAGO SYMPHONY | CHICAGO SYMPHONY |
| 6 | BOSTON SYMPHONY | BOSTON SYMPHONY | BOSTON SYMPHONY | BOSTON SYMPHONY |
| . | . | . | . | . |
| . | . | . | . | . |
| . | . | . | . | . |
| 59 | VIENNA STATE OPERA | VIENNA STATE OPERA | VIENNA STATE OPERA | VIENNA STATE OPERA |
| 60 | METROPOLITAN OPERA | METROPOLITAN OPERA | METROPOLITAN OPERA | METROPOLITAN OPERA |
| . | | . | . | . |
| . | | . | . | . |
| . | | . | . | . |
| 90 | | GUSTAV LEONHARDT | GUSTAV LEONHARDT | GUSTAV LEONHARDT |
| . | | . | . | . |
| 149 | | HESPERION XX | HESPERION XX | HESPERION XX |
| 150 | | CONSORT OF MUSICKE | CONSORT OF MUSICKE | CONSORT OF MUSICKE |
| . | | | . | . |
| . | | | . | . |
| . | | | . | . |
| . | | | . | . |
| . | | | . | . |
| 249 | | | SEQUENTIA | SEQUENTIA |
| 250 | | | HUELGAS ENSEMBLE | HUELGAS ENSEMBLE |
| . | | | | . |
| . | | | | . |
| . | | | | . |
| . | | | | . |
| 350 | | | | LONDON SINFONIETTA |

FIG.16

| | SPEECH RETRIEVAL KEY CANDIDATE | RECOGNITION LIKELIHOOD | NORMALIZED LIKELIHOOD |
|---|---|---|---|
| 1 | LONDON SYMPHONY | 4,500 | 0.0375 |
| 2 | BOSTON SYMPHONY | 4,300 | 0.0358 |
| 3 | NEW YORK PHILHARMONIC | 3,900 | 0.0325 |
| 4 | VIENNA STATE OPERA | 3,700 | 0.0308 |
| 5 | METROPOLITAN OPERA | 3,700 | 0.0308 |
| 6 | CHICAGO SYMPHONY | 3,400 | 0.0283 |
| . | . | . | . |
| . | . | . | . |
| 60 | PHILHARMONIA ORCHESTRA | 1,600 | 0.0133 |
| TOTAL | | 120,000 | 1.0000 |

DESCENDING ORDER OF RETRIEVAL KEY RECOGNITION LIKELIHOOD →

FIG.17

| | RETRIEVAL KEY CANDIDATE | DATE | PLACE | DAY OF WEEK | PREFECTURE | STYLE |
|---|---|---|---|---|---|---|
| 1 | BERLIN PHILHARMONIC | APRIL 12 | OPERA CITY | MON | TOKYO | ORCHESTRA |
| 2 | VIENNA PHILHARMONIC | MAY 30 | SYMPHONY HALL | SUN | OSAKA | ORCHESTRA |
| 3 | NEW YORK PHILHARMONIC | APRIL 3 | OPERA CITY | SAT | TOKYO | ORCHESTRA |
| 4 | LONDON SYMPHONY | MAY 30 | SYMPHONY HALL | SUN | OSAKA | ORCHESTRA |
| 5 | CHICAGO SYMPHONY | APRIL 20 | SUNTORY HALL | TUE | TOKYO | ORCHESTRA |
| 6 | BOSTON SYMPHONY | APRIL 10 | OPERA CITY | SAT | TOKYO | ORCHESTRA |
| . | . | . | . | . | . | . |
| . | . | . | . | . | . | . |
| 59 | VIENNA STATE OPERA | APRIL 20 | NHK HALL | TUE | TOKYO | OPERA |
| 60 | METROPOLITAN OPERA | APRIL 21 | NHK HALL | WED | TOKYO | OPERA |
| . | . | . | . | . | . | . |
| . | . | . | . | . | . | . |
| 90 | GUSTAV LEONHARDT | MARCH 3 | CASALS HALL | WED | TOKYO | BAROQUE |
| . | . | . | . | . | . | . |
| 149 | HESPERION XX | MARCH 30 | FESTIVAL HALL | TUE | OSAKA | BAROQUE |
| 150 | CONSORT OF MUSICKE | APRIL 10 | SUNTORY HALL | SAT | TOKYO | BAROQUE |
| . | . | . | . | . | . | . |
| . | . | . | . | . | . | . |
| 249 | SEQUENTIA | APRIL 2 | ORCHARD HALL | FRI | TOKYO | RENAISSANCE |
| 250 | HUELGAS ENSEMBLE | APRIL 21 | TOKYO CATHEDRAL | WED | TOKYO | RENAISSANCE |
| . | . | . | . | . | . | . |
| . | . | . | . | . | . | . |
| 350 | LONDON SINFONIETTA | MARCH 3 | FESTIVAL HALL | WED | OSAKA | CONTEMPORARY |

FIG.18

| | ATTRIBUTE INFORMATION CANDIDATE | RELATED INFORMATION LIKELIHOOD | NORMALIZED LIKELIHOOD |
|---|---|---|---|
| 1 | MARCH 5 | 5,600 | 0.0102 |
| 2 | MARCH 10 | 5,400 | 0.0098 |
| 3 | MARCH 4 | 4,800 | 0.0090 |
| 4 | APRIL 10 | 4,400 | 0.0080 |
| 5 | MARCH 3 | 4,200 | 0.0077 |
| 6 | APRIL 3 | 3,500 | 0.0064 |
| 7 | MARCH 30 | 3,000 | 0.0055 |
| . | . | . | . |
| . | . | . | . |
| 61 | APRIL 20 | 1,100 | 0.0020 |
| TOTAL | | 549,000 | 1.0000 |

↓ DESCENDING ORDER OF RELATED INFORMATION LIKELIHOOD

FIG.19

| | SPEECH RETRIEVAL KEY CANDIDATE | RECOGNITION LIKELIHOOD | NORMALIZED LIKELIHOOD |
|---|---|---|---|
| 1 | HESPERION XX | 4,200 | 0.0080 |
| 2 | CONSORT OF MUSICKE | 4,020 | 0.0077 |
| 3 | LONDON SYMPHONY | 3,900 | 0.0074 |
| 4 | GUSTAV LEONHARDT | 3,800 | 0.0072 |
| 5 | BOSTON SYMPHONY | 3,500 | 0.0067 |
| 6 | CHICAGO SYMPHONY | 2,800 | 0.0053 |
| . | . | . | . |
| . | . | . | . |
| 60 | ENSEMBLE ORGANUM | 1,900 | 0.0036 |
| . | . | . | . |
| . | . | . | . |
| 150 | GOTHIC VOICES | 240 | 0.0004 |
| TOTAL | | 525,000 | 1.0000 |

DESCENDING ORDER OF RETRIEVAL KEY RECOGNITION LIKELIHOOD

FIG.21

|   | ATTRIBUTE INFORMATION CANDIDATE | RELATED INFORMATION LIKELIHOOD | NORMALIZED LIKELIHOOD |
|---|---|---|---|
| 1 | CASALS HALL | 4,200 | 0.0833 |
| 2 | ORCHARD HALL | 3,900 | 0.0774 |
| 3 | FESTIVAL HALL | 3,700 | 0.0734 |
| 4 | SYMPHONY HALL | 2,200 | 0.0436 |
| 5 | NHK HALL | 2,000 | 0.0397 |
| 6 | SUNTORY HALL | 2,000 | 0.0397 |
| . | . | . | . |
| . | . | . | . |
| 40 | OPERA CITY | 1,400 | 0.0278 |
| TOTAL |  | 50,400 | 1.0000 |

DESCENDING ORDER OF RELATED INFORMATION LIKELIHOOD

FIG.24

| RETRIEVAL KEY CANDIDATE | ATTRIBUTE ITEM #1 | ATTRIBUTE ITEM #2 | . | . | ATTRIBUTE ITEM #n |
|---|---|---|---|---|---|
| RETRIEVAL KEY #1 | ATTRIBUTE VALUE #1-10 | ATTRIBUTE VALUE #2-2 | | | ATTRIBUTE VALUE #n-11 |
| RETRIEVAL KEY #2 | ATTRIBUTE VALUE #1-2 | ATTRIBUTE VALUE #2-9 | | | ATTRIBUTE VALUE #n-1 |
| RETRIEVAL KEY #3 | ATTRIBUTE VALUE #1-k | ATTRIBUTE VALUE #2-12 | . | . | ATTRIBUTE VALUE #n-k |
| . | . | . | . | . | . |
| . | . | . | . | . | . |
| RETRIEVAL KEY #k | ATTRIBUTE VALUE #1-5 | ATTRIBUTE VALUE #2-21 | . | . | ATTRIBUTE VALUE #n-3 |

FIG.25

| ATTRIBUTE ITEM #1 | ATTRIBUTE ITEM #2 | . | . | ATTRIBUTE ITEM #n |
|---|---|---|---|---|
| ATTRIBUTE VALUE CANDIDATE #1-1 | ATTRIBUTE VALUE CANDIDATE #2-1 | . | . | ATTRIBUTE VALUE CANDIDATE #n-1 |
| ATTRIBUTE VALUE CANDIDATE #1-2 | ATTRIBUTE VALUE CANDIDATE #2-2 | . | . | ATTRIBUTE VALUE CANDIDATE #n-2 |
| ATTRIBUTE VALUE CANDIDATE #1-3 | ATTRIBUTE VALUE CANDIDATE #2-3 | . | . | ATTRIBUTE VALUE CANDIDATE #n-3 |
| . | . | . | . | . |
| . | . | . | . | . |
| ATTRIBUTE VALUE CANDIDATE #1-k | ATTRIBUTE VALUE CANDIDATE #2-k | . | . | ATTRIBUTE VALUE CANDIDATE #n-k |

| RETRIEVAL KEY CANDIDATE | PREFECTURE | DISTRICT | · | · | SEASIDE OR NOT |
|---|---|---|---|---|---|
| SAPPORO | HOKKAIDO | HOKKAIDO | · | · | NO |
| ASAHIKAWA | HOKKAIDO | HOKKAIDO | · | · | YES |
| · | · | · | · | · | · |
| YOKOHAMA | KANAGAWA | KANTO | · | · | YES |
| · | · | · | · | · | · |
| NAHA | OKINAWA | KYUSHU | · | · | YES |

| PREFECTURE | DISTRICT | · | · | SEASIDE OR NOT |
|---|---|---|---|---|
| HOKKAIDO | HOKKAIDO | · | · | YES |
| AOMORI | TOHOKU | · | · | NO |
| AKITA | KANTO | · | · | |
| · | TOKAI | · | · | |
| KANAGAWA | KINKI | · | · | |
| TOKYO | HOKURIKU | · | · | |
| · | SANIN | | | |
| · | SHIKOKU | | | |

| ORDER | RETRIEVAL KEY CANDIDATE | RECOGNITION LIKELIHOOD |
|---|---|---|
| 1ST | YOKOHAMA | 0.892 |
| 2ND | YOKOSUKA | 0.812 |
| 3RD | SAKAIDE | 0.783 |
| . | . | . |
| . | . | . |
| . | . | . |
| 189TH | KOTOHIRA | 0.108 |

| ACCESS FREQUENCY | CITY/TOWN |
|---|---|
| 1ST | MINATO |
| 2ND | CHUOU |
| 3RD | SHIBUYA |
| 4TH | YOKOHAMA |
| 5TH | SHINJUKU |
| . | . |
| . | . |
| 49TH | OSAKA |
| 50TH | MAIHAMA |

DESCENDING ORDER OF ACCESS FREQUENCY

FIG.37

| ORDER | CITY/TOWN |
|---|---|
| 1ST | YOKOSUKA |
| 2ND | YOKOHAMA |
| 3RD | YOTSUGI |
| 4TH | MAIHAMA |
| . | . |
| . | . |
| 50TH | MINATO |

DESCENDING ORDER OF RECOGNITION LIKELIHOOD

FIG.38

| ORDER | CITY/TOWN |
|---|---|
| 1ST | YOKOHAMA |
| 2ND | YOKOSUKA |
| 3RD | YOKOYAMA |
| 4TH | MIHAMA |
| . | . |
| . | . |
| 50TH | CHIBA |

DESCENDING ORDER OF RECOGNITION LIKELIHOOD

FIG.39

| ORDER | CITY/TOWN |
|-------|-----------|
| 1ST | YOKOKAWA |
| 2ND | TAKASAKI |
| 3RD | MAEHASHI |
| . | . |
| . | . |
| . | . |
| 41TH | KIRYU |

DESCENDING ORDER OF RECOGNITION LIKELIHOOD

SPEECH RECOGNITION BASED ON INTERACTIVE INFORMATION RETRIEVAL SCHEME USING DIALOGUE CONTROL TO REDUCE USER STRESS

BACKGROUND OF THE INVENTION

1. Field of the Invention

The present invention relates to a speech recognition based interactive information retrieval scheme aimed at retrieving user's intended information through a speech dialogue with a user.

2. Description of the Background Art

The computer based speech recognition processing is a processing for matching a user input speech with a recognition target database, and calculating a similarity of the input speech with respect to every word in the database as a recognition likelihood. The current recognition technology has a limitation on the number of recognition target words for which the recognition result can be outputting within a real dialogue processing time, and a considerable amount of time is required until returning a response to the user when the number of recognition target words exceeds this limit. Also, a lowering of the recognition accuracy due to an increase of the recognition target words is unavoidable. Moreover, the recognition accuracy is largely dependent on speakers and speech utterance environments, and a lowering of the recognition accuracy due to surrounding noise or a lowering of the recognition accuracy due to incompleteness of the input speech uttered by a speaker can occur even in the case where a recognition device has high performance and accuracy, so that there is no guarantee for being able to always obtain 100% accuracy.

The conventional speech recognition based interactive information retrieval system carries out the recognition processing using a speech recognition device with respect to a user's input speech, keeps a user awaiting until the processing is finished, and presents candidates obtained as a result of the recognition to the user sequentially in a descending order of recognition likelihood by repeating the presentation of candidates until a correct one is confirmed by the user.

On the other hand, in the case of utilizing speech as interface for the information providing service, the real time performance and the accuracy are required. When there are many recognition target words, the target information is classified by an attribute tree formed by a plurality of hierarchical levels. Lower level attributes have a greater possibility of having the number of attribute values that exceeds the number that can be processed within the real dialogue processing time. In order to ascertain the user's intended target information, there is a need to determine an attribute value at each level, but a higher level attribute value can be automatically determined by tracing the tree once a lower level attribute value is determined (provided that the determined lower level attribute value and the related lower level attribute value are in one-to-one correspondence without any overlap). Consequently, it is possible to expect that the target information can be ascertained in short time if it is possible to ascertain the lower level attribute value first.

However, the conventional speech recognition based interactive information retrieval system does not allow the user to input the lower level attribute value first in view of the recognition error and the number of words that can be processed within a time that does not spoil naturalness of the dialogue with the user. Namely, it has been necessary to adopt a method for narrowing the recognition target words down to the number of data that can be processed within the real dialogue processing time by first asking a query for the higher level attribute for which the number of attribute values is small and requesting input, determining the attribute value by repeating presentation of candidates obtained as a result of the recognition in a descending order of recognition likelihood until the entered attribute value can be determined, and selecting only those attribute values that are related to the determined higher level attribute value among the next level attribute values as the next recognition target.

Such a conventional method cannot narrow down the next level recognition target attribute values unless the higher level attribute value is determined so that the presentation of candidates to the user is repeated until the higher level attribute value is determined. However, in this conventional method, a process including the attribute value input request, the candidate presentation and confirmation until the attribute value is determined for each attribute, and the narrowing down of the next level attribute values after the attribute value determination, is required to be repeated as many times as the number of hierarchical levels involved in order to ascertain the target information, and this number of repetition is greater for the target information that has deeper attribute hierarchical levels, so that it has been difficult to ascertain the target information efficiently.

In a system for ascertaining a target information from an information database that comprises the number of words exceeding the number that can be processed within the real dialogue processing time, in order to determine the (lower level) attribute value from which the target information can be ascertained, the user is kept awaiting during the recognition processing and the confirmation process for sequentially presenting the recognition result is carried out. However, when it is difficult to determine the correct attribute value smoothly due to recognition errors, it is necessary to repeat the confirmation process many times despite of the fact that the user has already been kept awaiting, and this can make the dialogue unnatural and cause a great stress on the user.

Consequently, in the current system based on the current speech recognition technology, it is impossible to allow the user's input starting from the lower level attribute value such that a reasonably accurate response can be returned without requiring a wait time to the user, and it is necessary to request the user's input sequentially from the higher level attribute value and repeat the attribute value determination. The recognition target words of the lower level are to be narrowed down by determining the higher level attribute value, so that the dialogue cannot proceed further until the higher level attribute value is determined. In other words, there is a need for the confirmation process until it becomes possible to determine the entered attribute value at each level.

If it is possible to ascertain the lower level attribute value first, the higher level attribute value can be ascertained automatically so that the target information can be ascertained efficiently, and in view of this fact, the currently used process for repeating query, determination and confirmation process until the determination with respect to each query sequentially from the higher level is very circumlocutory or circuitous for the user.

In particular, the user is forced to enter input from the higher level because input from the lower level is not allowed, the presentation and confirmation process must be repeated when it is not possible to obtain a correct attribute value as a top candidate due to recognition errors, and the attribute value input and the confirmation process must be repeated as many times as the number of hierarchical levels involved until the target information is ascertained (the lowest level attribute value is determined) even after determining each input by several trials of the presentation and confirmation process. Although these are indispensable processes for the system, they appear as very circuitous and superfluous processes for the user who prefers natural and short dialogues, and cause a great stress on the user.

As a method for ascertaining the target information while reducing stress on the user, allowing the user's input from the lower level attribute value can be considered, but this requires the determination of the attribute value that has the number of recognition target words exceeding the number that can be processed within the real dialogue processing time.

Also, in the computer based speech recognition processing, the recognition of speeches by unspecified speakers and speeches uttered at irregular utterance speed are particularly difficult, and in addition the degradation of speech quality due to surrounding noise or the like can make 100% speech recognition accuracy practically impossible, so that the instantaneous determination of a speech retrieval key that is entered as the user's speech input is difficult.

Also, in the speech recognition based interactive information retrieval system, in order to realize the natural dialogues with the user, it is prerequisite for the system to return a response to the user's input in real time that does not appear unnatural to the human sense. However, there is a limit to the number of words that can be speech recognition processed within a prescribed period of time. For this reason, when the recognition target is a large scale database having the number of words that cannot be processing within a prescribed period of time, it is difficult to achieve the task requested by the user within a prescribed period of time through natural dialogues between the user and the system, without making the user conscious of the processing time required for the information retrieval at a time of the speech recognition processing by the system as well as the incompleteness of the speech recognition accuracy by the system.

Consequently it is necessary to keep the user awaiting while the system outputs the recognition processing result and when the presented result turns out to be the recognition error it is necessary to keep the user awaiting further until another recognition result is presented, so that it is difficult to construct a system using speech as input interface that has both quickness and accuracy equivalent to a human operator based system, according to the current speech recognition technology.

Also, in the conventional retrieval method aiming at the determination of the retrieval key requested by the user with respect to a large scale database that cannot be processed in real time, because of the limitation on the number of data that can be speech recognition processed in real time, the user is urged to enter a retrieval assist key that can lead to the narrowing down of the retrieval key candidates such that the recognition targets can be reduced from the entire large scale database to the number of data that can be processed in real time, without allowing the user to enter the requested retrieval key immediately.

Here, the retrieval assist keys are selected to be data formed by the number of data that can be processed in real time, such that each retrieval key to be requested by the user always has one retrieval assist key as its higher level key, the retrieval assist key (higher level key) of the retrieval key to be requested is simple and obvious to the user, and lower level keys (the retrieval keys to be requested by the user) belonging to one retrieval assist key are formed by the number of data that can be processed in real time, so as to enable the determination of the retrieval key.

Also, in the conventional retrieval method aimed at the determination of the retrieval key requested by the user using the speech input, the speech recognition processing with respect to the retrieval assist key (higher level key) is carried out first, and the obtained retrieval assist key (higher level key) candidates are presented to the user sequentially in a descending order of the recognition likelihood until a response indicating it is a correct one is obtained. When the retrieval assist key is determined, the retrieval key (lower level key) candidates having the determined retrieval assist key as the higher level key are extracted as the recognition target data, and the input of the retrieval key (lower level key) that the user really wants to request is urged to the user. Similarly as for the retrieval assist key, the retrieval key is determined by presenting the retrieval key candidates obtained by the speech recognition processing to the user sequentially in a descending order of recognition likelihood until a response indicating it is a correct one is obtained.

As such, the current speech recognition technology has a limit to the number of words for which the matching with the speech recognition database, the recognition likelihood calculation and the recognition result output can be carried out in real time, so that a longer recognition time is required when the number of recognition target words is increased. In the speech retrieval system using speech as input interface, when the recognition target is a large scale database, keeping the user awaiting during the speech recognition processing by the system can cause stress on the user, so that the current system carries out the narrowing down of the recognition target by utilizing the attribute values of the attribute items that each recognition target data has, so as to be able to output the recognition result in real time.

However, the current speech recognition technology is such that the 100% speech recognition accuracy cannot be attained even when the recognition target is narrowed down to the number of words that can be processed in real time. In particular, the recognition of speeches by unspecified speakers, speeches uttered at irregular utterance speed, and speech uttered under the noisy environment are particularly difficult, so that the confirmation process for confirming the recognition result to the user is indispensable in order to ascertain the input speech. The confirmation process is a process for presenting the recognition candidates obtained by the speech recognition processing to the user sequentially in a descending order of recognition likelihood. The number of confirmation processes becomes larger for the poorer input speech recognition accuracy. However, the user demands the input interface to have a handling equivalent to the human operator, so that the repeated confirmation processes can cause stress on the user.

In the current speech recognition based interactive information retrieval system using a large scale database as the recognition target, the attribute value input for the attribute item in order to narrow down the recognition target to the number that can be processed in real time is urged, and then the user's requested retrieval key input is urged when the recognition target is narrowed down according to the attribute values, so that the confirmation process is required for both the attribute value and the retrieval key. The attribute value input is an indispensable process in realizing the real time recognition processing from a viewpoint of the system, but it is circuitous for the user because the retrieval key that the user really wants to request cannot be entered immediately, and the confirmation processes are repeated twice, once for the attribute value detection and another for the retrieval key determination, which cause further stress on the user.

Also, the retrieval system using speech as input interface and having a large scale database as the recognition and retrieval target is aiming at providing quick and accurate responses to the user such that the user may have an illusion of dialogue with a human operator, so that it has been necessary to adopt a query format that can lead to the narrowing down of the number of recognition target words effectively for the system such that the recognition processing time and the recognition accuracy can be compensated. For this reason, without allowing the input of the retrieval key that the user really wants to request immediately, the retrieval assist key that can lead to the narrowing down of the retrieval key is determined first. However, the user is forced to enter the input of the retrieval assist key first rather than the retrieval key that the user really wants to request and then urged to enter the retrieval key only after the retrieval assist key is determined, so that this process may appear to the user as if a superfluous process for the user (indispensable process for the system) is forced before the input of the retrieval key that the user really wants to request and can cause stress on the user.

SUMMARY OF THE INVENTION

It is therefore an object of the present invention to provide a speech recognition based interactive information retrieval scheme capable of ascertaining the target information by determining the attribute values without making the user conscious of the time required for the speech recognition processing and the retrieval, and without causing unnatural dialogues with the user due to incompleteness of the speech recognition processing. In this scheme, in a process for determining the attribute value necessary in order to ascertain the target information, the recognition target attribute value can be determined even when the number of attribute values exceeds the number that can be processed within a prescribed period of time, by utilizing a method for narrowing down the recognition target words that can return a response with a tolerable level of accuracy for the user without making the user to have a feeling of being kept awaited, and a method for ascertaining input that can realize the reduction or the omission of the confirmation processes.

It is another object of the present invention to provide an operator-less speech recognition based interactive information retrieval scheme using speech dialogues based on the dialogue control which is capable of determining the retrieval key entered by the user through natural dialogues. In this scheme, the retrieval key can be determined using a large scale database having the retrieval target words that cannot be processed within a prescribed period of time, without making the user conscious of the time required for the speech recognition processing and the database matching, and without causing unnatural dialogues with the user due to incompleteness of the speech recognition processing, such that the task of determining the speech retrieval key entered by the user can be achieved in the operator-less speech recognition based interactive information retrieval system, without making the user conscious of the waiting time, through dialogues that have both quickness and naturalness equivalent to a human operator based system.

It is another object of the present invention to provide a speech recognition based interactive information retrieval scheme using a large scale database as the recognition target, which is capable of ascertaining a retrieval key entered by the speech input while reducing stress on the user. In this scheme, the retrieval key is ascertained without carrying out the attribute value determination, such that the confirmation process for the purpose of determining the attribute value is eliminated and the circuity due to the confirmation process is eliminated, while the processing time required for the retrieval key determination is shortened.

It is another object of the present invention to provide a speech recognition based interactive information retrieval scheme capable of realizing the retrieval that has both quickness and naturalness in determining the retrieval key from a large scale database. In this scheme, the recognition and the retrieval are carried out without making the user conscious of the waiting time and incompleteness of the recognition accuracy during the recognition even when the retrieval key that the user really wants to request is entered immediately at the beginning, by utilizing the bias in the access frequencies of data in the large scale database, in the retrieval aimed at determining the retrieval key entered by the user using the large scale database as the recognition target.

First, in the first scheme of the present invention, at a time of determining the attribute value of the attribute having the number of attribute value candidates exceeding the number than can be processed within the real dialogue processing time in the information database, the importance levels are assigned to a set of the recognition target attribute values (recognition target words) of that attribute according to the bias of the past access frequencies or the like, and the priority recognition processing with respect to data with a higher importance level is carried out, in order to return a response having a tolerable level of accuracy for the user within such a time that the user does not sense any stress and unnaturalness in response to the input of the retrieval target attribute.

Namely, the number of attribute values (the number specified by the system, which is assumed to be N) that can be processed within the real dialogue processing time by the speech recognition device are selected as the prioritized recognition target words according to the importance levels, and the speech recognition processing is carried out at a higher priority for these prioritized recognition target words.

Then, based on a comparison of a prescribed threshold and the recognition likelihood with respect to each attribute value candidate that is calculated from the recognition result, for example, when a prescribed condition for judging that the attribute value can be ascertained only by the confirmation process with the user is satisfied, the confirmation process for presenting the result to the user is attempted.

In the recognition processing for the prioritized recognition target words, the prioritized recognition target words are formed by those attribute values that have higher possibility of being accessed, from the attribute values if the attribute that exceed the number than can be processing within the real dialogue processing time, so that appropriate recognition result can be presented at this point in many cases with respect to the most users.

When the above condition for judging that the attributed value can be ascertained only by the confirmation process is not satisfied, either the target attribute value is not contained in the prioritized recognition target words, or the accuracy of the recognition device is poor so that a correct one was not obtained as leading candidates. In this case, the dialogue is proceeded to a related information query, where other hierarchically adjacent attribute is queried, for example, and the attribute value is determined by cross-checking the recognition result of the other attribute and the earlier recognition results such that the conventionally used repetition of the confirmation processes starting from the leading candidates is eliminated and thereby the user stress is eliminated.

One of the features of this first scheme is that the dialogue is proceeded to the related information query while the recognition processing for the non-prioritized recognition target words is carried out in parallel by utilizing the related information query dialogue time, in order to deal with the case where the target attribute value is contained in the remaining non-prioritized recognition target words, without notifying the user that the processing up to this point has been based only on the recognition result for the prioritized recognition target words. When the recognition processing for a response to the related information query is carried out and the recognition result is obtained, the recognition result for only those non-prioritized recognition target words for which the recognition processing has been finished by then in the parallel recognition processing are added to the recognition result of the prioritized recognition target words, and the recognition result is narrowed down by referring to the relevancy with the recognition result of the related information query response.

Here, when the non-prioritized recognition target words comprises the number of words that exceeds the number (N) that can be processed within the real dialogue processing time, the recognition processing for the non-prioritized recognition target words is still not completed by the time when a response to one related information query is obtained, and the user would have to be kept awaited if the recognition processing is continued up to the completion. In such a case, the non-prioritized recognition target words are subdivided into a plurality of sets each having N words. Then, the recognition processing is carried out by supplying each set of the non-prioritized recognition target words sequentially in a descending order of the importance level as the next recognition target words to the recognition device. Then, the recognition result for each set of non-prioritized recognition target words that has been processed by the time when a response to the related information query is entered by the user is added to the recognition result obtained so far.

Such a related information query has an effect of realizing a natural dialogue in which the user answers a question that seems natural, rather than a superfluous process such as the waiting time or the repeated confirmation process. On the other hand, from a viewpoint of the system, the related information query dialogue time can be utilized as the recognition time for the non-prioritized recognition target words, and in addition, if a related information that can lead to the narrowing down of the attribute value to be determined is obtained from the relevancy among the attribute values, this obtained related information can be utilized as information for narrowing down the attribute value.

Then, whether the condition for judging that the target attribute value can be ascertained only by the confirmation process is satisfied or not is checked again with respect to the result obtained by cross-checking the result of the related information query and the earlier recognition result, and if this condition is satisfied the confirmation process is attempted, whereas otherwise another related information is queried.

If the recognition processing for the non-prioritized recognition target words has not been completed yet, the recognition processing is continued by utilizing the related information query dialogue time in order to deal with the case where the target attribute value is contained in those attribute values for which the recognition processing has not been carried out yet. When there is no more related information to be queried, further recognition processing time for the non-prioritized recognition target words is gained by repeating the similar related information queries several times or by presenting the recognition result of the related information query response in order to obtain more accurate related information, for example.

In this first scheme, the dialogue is proceeded in such a way that the user remains totally unaware of the internal processing state of the system, so that it is possible to realize the attribute value determination and the target information ascertaining through a flow of natural dialogues. Namely, according to this first scheme, it becomes possible to make it appear to the user as if the system is carrying out the recognition processing for all the attribute values and returning a response according to such recognition results. The dialogue is proceeded to the related information query such that the user remains unaware of the fact that the first response is actually returned according to the recognition result only for the prioritized recognition target words, and the fact that the target attribute value may not necessarily be contained in the prioritized recognition target words.

Then, by cross-checking the result of the related information query while adding the recognition result for the non-prioritized recognition target words that is obtained by the gradually continued recognition processing, it is possible to maintain natural dialogues with the user while determining the input attribute value and ascertaining the target information within appropriate time, even with respect to the recognition target words that exceed the number that can be processed within the real dialogue processing time, without causing the user to feel unnaturalness or stress.

According to this first scheme, it becomes possible to allow the user to immediately enter the lower level attribute value input, which seems like a natural and efficient way of ascertaining the target information from the user's perspective, and moreover the inadvertent repetition of the confirmation process is avoided, so that the reduction of the stress on the user can be expected. In addition, it is possible to realize the interactive information retrieval process that has both high accuracy and naturalness and that does not make the use conscious of the waiting time and incompleteness of the recognition accuracy.

Next, in the second scheme of the present invention, the importance levels are assigned to data in the speech recognition database having a large number of the speech recognition target words that cannot be processed within a prescribed time, according to the statistical information such as past access frequencies or utilization frequencies. Then, a plurality of statistically hierarchized databases are formed by partial databases created by selecting respectively defined prescribed numbers of data sequentially from data having higher importance levels, and hierarchically structuring these partial databases such that a lower level partial database contains a larger number of data and the lowest level partial database contains all data of the speech recognition database. These statistically hierarchized databases are specifically designed to maintain the naturalness of the dialogue to be carried out between the user and the system in order to achieve the task.

Here, the real time performance is realized virtually by utilizing differences between the processing times for different levels due to differences in the number of data contained at different levels. Namely, the speech recognition processing and the speech retrieval key candidate extraction based on the speech recognition likelihood are carried out in parallel for different levels of the statistically hierarchized databases, and the dialogue leading with respect to the user is carried out sequentially for different levels, starting from the highest level statistically hierarchized database for which the processing is finished first, while continue processing the other levels.

The statistically hierarchized databases used in this second scheme are retrieval key attribute databases that maintain attribute values of the attribute items expressing features of each data as the related attribute information, with respect to all data of the retrieval target speech recognition database. The related attribute information is utilized at a time of carrying out the retrieval key determination related query in which the related attribute information of the speech retrieval key is queried in order to narrow down the speech retrieval key in this scheme.

Also, in this second scheme, in order to narrow down candidates from the speech retrieval key leading candidates, when a plurality of related attribute information candidates obtained from the retrieval key determination related query and the speech retrieval key leading candidates to be narrowed down are found to be related by referring to the retrieval key attribute database, the retrieval key recognition likelihood and the related information recognition likelihood are normalized and multiplexed so as to realize the candidate determination.

This second scheme realizes the speech retrieval key determination in a speech recognition based interactive information retrieval apparatus aiming at the speech retrieval key determination for which the retrieval target is the speech recognition database having a large number of the speech recognition target words for which the speech recognition processing and the database matching cannot be carried out within a prescribed period of time that can maintain the naturalness of the dialogues to be carried out between the user and the system for the purpose of the speech retrieval key determination. Here, the speech retrieval key determination is realized without making the user conscious of time required for the speech recognition processing and the database matching and incompleteness of the speech recognition accuracy just as in a human operator based system, by using a dialogue control that primarily accounts for the naturalness in the dialogue with the user.

In the speech recognition based interactive information retrieval method of this second scheme, because the retrieval target database is of large scale, the retrieval target database is maintained in a form of a plurality of statistically hierarchized databases that are hierarchically structured according to the importance levels, and the number of data contained the statistically hierarchized database at each level is designed such that the speech recognition and the retrieval key recognition likelihood calculation, and the speech recognition result table formation for the (n+1)-th level can be finished while the dialogue for determining the speech retrieval key according to the recognition result for the n-th level is carried out with the user. By utilizing differences in the processing times due to differences in the number of data contained at different levels, the speech recognition processing and the recognition candidate output are virtually realized within a prescribed period of time that does not make the user to feel unnaturalness.

Namely, the speech recognition processing for different levels of the statistically hierarchized databases are carried out in parallel and the speech retrieval key candidates are extracted separately at each level. Then, utilizing the fact that the speech recognition processing for the highest level statistically hierarchized database that contains the smallest number of data representing the speech retrieval key candidates with the statistically high importances can be finished first, the speech recognition result table is sequentially referred starting from that of the highest level statistically hierarchized database, and a method for leading the dialogue with the user is determined according to the number of speech retrieval key leading candidates that exceeds a prescribed likelihood threshold. In this way, the dialogue between the user and the system can be made as natural as the dialogue between human beings without making the user conscious of incompleteness of the speech recognition accuracy.

When the number of speech retrieval key leading candidates is less than or equal to a prescribed number but not zero, the retrieval key determination related query for narrowing down the candidates from the leading candidates is carried out, and the speech retrieval key leading candidate which is found to be related to the obtained related attribute information candidates are determined as the speech retrieval key and presented to the user.

When the number of the speech retrieval key leading candidates is greater than the prescribed number or zero, or when the speech retrieval key presented to the user above is negated by the user as not a correct one, or when no speech retrieval key leading candidate is found to be related to the related attribute information candidates obtained by the above described retrieval key determination related query, there is a possibility that the target speech retrieval key is not contained in the highest level statistically hierarchized database, so that the retrieval target is shifted to the next level (lower level) statistically hierarchized database for which the speech recognition processing is already finished at this point. Here, however, the user remains unconscious of the shift of the fact that the retrieval target database to the lower level one.

When the retrieval target database is shifted to the lower level one, if the speech retrieval key presented to the user above is negated by the user as not a correct one, or no speech retrieval key leading candidate is found to be related to the related attribute information candidates obtained by the above described retrieval key determination related query, the related attribute information candidates already obtained by the retrieval key determination related query are utilized again, or if the number of the speech retrieval key leading candidates is greater than the prescribed number of zero, the retrieval key determination related query is newly carried out, and then the obtained related attribute information is utilized to carry out the cross-checking of the recognition likelihood for those candidates which are found to be related to the related attribute information candidates among the speech retrieval key candidates in this second level statistically hierarchized database that is the current recognition target, so as to determine a new recognition likelihood.

Once again, the number of the speech retrieval key leading candidates is checked and if it is less than or equal to the prescribed number but not zero, the retrieval key determination related query for asking another related attribute information is carried out, the speech retrieval key leading candidates in this second level statistically hierarchized database are narrowed down by utilizing the newly obtained related attribute information candidates additionally, and the speech retrieval key having the highest retrieval key recognition likelihood after the cross-checking of the recognition likelihoods is presented to the user similarly as in the case of the highest level statistically hierarchized database.

When the recognition result of the second level statistically hierarchized database is such that the number of the speech retrieval key leading candidates is greater than the prescribed number or zero, or the speech retrieval key presented to the user above is negated by the user as not a correct one, or no speech retrieval key leading candidate is found to be related to the related attribute information candidates obtained by the above described retrieval key determination related query, the retrieval target is shifted to the next level (third level) statistically hierarchized database and the dialogue leading is repeated similarly as in the case of the highest level statistically hierarchized database, until the speech retrieval key is determined.

In the dialogue leading in the case where the number of the speech retrieval key leading candidates is less than or equal to the prescribed number but not zero at each level, the reliability of the retrieval key recognition likelihoods of the leading candidates is increased by carrying out the retrieval key determination related query so as to narrow down the candidates effectively. In the dialogue leading in the case of shifting the retrieval target database to the lower level, the number of the speech recognition target words is greater in the lower level so that the degradation of the recognition accuracy can be expected, but by accounting for the relevancy with respect to all the related attribute information candidates obtained up until a timing for shifting the retrieval target to the lower level and narrowing down the candidates using combination of more information, it is possible to compensate the degradation of the recognition accuracy due to the increased number of data.

Also, the speech recognition based interactive information retrieval method of this second scheme attempts the speech retrieval key determination using the related attribute information of the speech retrieval key, because the speech retrieval key determination at 100% accuracy is impossible because the speech recognition accuracy is not 100%. However, the related attribute information is also obtained by carrying out the speech recognition with respect to a response to the retrieval key determination related query so that the related attribute information also cannot be obtained at 100% accuracy.

For this reason, the recognition likelihoods of the speech retrieval key candidates and the related attribute information candidates are normalized and cross-checked in order to compensate for incompleteness of the speech recognition accuracy, and the dialogue control that primarily accounts for the naturalness is used while narrowing down the candidates by carrying out the retrieval key determination related query, such that the speech retrieval key candidates are narrowed down without making the user conscious of incompleteness of the speech recognition accuracy.

By carrying out the dialogue with the user according to the dialogue control utilizing the hierarchical structure of the speech recognition database and the normalization and the cross-checking of the speech recognition likelihoods, it becomes possible to realize the interactive information retrieval that has both high accuracy and naturalness similar to the human operator based system, without making the user conscious of the waiting time and incompleteness of the speech recognition accuracy.

Next, in the third scheme of the present invention, the narrowing down of the recognition target is realized without determining the attribute value uniquely in the process for realizing the speech recognition processing and the retrieval key determination in real time, by using the user to enter the attribute value of the attribute item of the retrieval key and narrowing down the recognition target according to the entered attribute value, in view of the fact that the speech recognition database has the recognition target words that cannot be processed in real time.

In this third scheme, similarly as in the conventional scheme, the retrieval key candidates are classified into groups each containing the number of words that can be processed in real time, by utilizing the attributes of the recognition target retrieval key candidates in the speech recognition database, and the recognition target is narrowed down by inquiring the attribute of the requested retrieval key to the user in order to limit the recognition target group, so as to realize the speech recognition processing and the retrieval key determination in real time. At this point, the entered attribute value is not determined uniquely because the current speech recognition accuracy is not 100%, so that the attribute value candidates are outputted in a descending order of the recognition likelihood obtained as a result of the speech recognition processing for the attribute value.

In this third scheme, however, the confirmation process for uniquely determining the attribute value is not carried out, and the attribute values that have the recognition likelihood greater than or equal to the prescribed likelihood threshold are set as the attribute value leading candidates, and all the retrieval key candidates belonging to the attribute value leading candidates are extracted from the speech recognition database as the recognition target. Namely, if the number of the attribute value leading candidates is n, the retrieval key candidates in n groups corresponding to the classification according to the attribute value leading candidates among the groups classified according to the attribute values will be extracted as the recognition target. Then, the user is urged to enter the speech input for the requested retrieval key, and the confirmation process for presenting the retrieval key candidates in a descending order of the recognition likelihood obtained by the speech recognition processing for the retrieval key using the retrieval key candidates as the retrieval target is carried out in an attempt to determine the retrieval key from the retrieval key candidates.

In this way, the third scheme of the present invention narrows down the recognition target from the large scale speech recognition database, and does not carry out the confirmation process for determining the attribute value uniquely in the process of initially requesting the user to enter the attribute value of the attribute item of the retrieval key, so that the confirmation process with respect to the user is carried out only once for the retrieval key determination, and the circuity due to the repeated confirmation processes required in the conventional attribute value determination can be eliminated and furthermore the processing time can be shortened.

Next, in the fourth scheme of the present invention, a recording medium that records the retrieval database to be used in determining the retrieval key at the retrieval apparatus in response to the user's input of the retrieval key is formed in a two level hierarchical structure, where the higher level hierarchical data contain the number of data that can be recognition processed in real time as specified by the system. On the other hand, the lower level hierarchical data are formed such that the retrieval key is contained, the number of data that cannot be recognition processed in real time are contained, each data contained in the lower level is always conceptually dependent on one data in the higher level, and the number of data in the lower level that are conceptually dependent on one data in the higher level is set to be the number of data that can be recognition processed in real time. In addition, an access frequency information indicating the bias of the access frequencies among the data in the lower level is provided and the data in the lower level are maintained such that a high frequency access data group and the other remaining data are distinguished according to the access frequency information.

Also, this fourth scheme realizes the speech recognition based interactive information retrieval aiming at the determination of the entered retrieval key from the speech recognition database by carrying out the speech recognition processing for the retrieval key entered by the user as the speech input, as follows.

When the speech input for the requested retrieval key is entered by the user, the recognition and retrieval processing for the high frequency access data group is carried out at higher priority (procedure 1), and the confirmation process for presenting the retrieval result candidates in a descending order of the recognition likelihood obtained as a result of the speech recognition processing for the retrieval key is carried out (procedure 2). If the retrieval key can be determined by the number of the confirmation processes less than or equal to a prescribed number in the procedure 2, the retrieval key is determined (procedure 3).

If the confirmation processes of the prescribed number of times are negated by the user as not a correct retrieval key in the procedure 3, the related query for inquiring a generic concept on which the requested retrieval key depends is carried out using the higher level data as the recognition target (procedure 4). Then, the speech recognition for the user's response to the related query is carried out and, using the recognition likelihoods of the obtained generic concept candidates, the confirmation process for presenting the generic concept candidates in a descending order of the recognition likelihood is carried out until the generic concept is determined (procedure 5). When the generic concept is determined, the lower level data that depend on the determined higher level data are selectively extracted as the recognition target data (procedure 6). Then, the speech recognition processing for the retrieval key entered by the user is carried out again and the confirmation process for presenting the obtained retrieval key candidates in a descending order of the recognition likelihood is carried out so as to determine the speech retrieval key (procedure 7).

In this fourth scheme, the requested retrieval key is contained in the high frequency access data group, it is possible to determine the retrieval key in real time using only the input of the retrieval key that the user really wants to request, without carrying out the related query to inquire a generic concept as assistant for narrowing down the retrieval key so that the fast retrieval can be realized. Even when the requested retrieval key is not contained in the high frequency access data group, the user is urged to enter the retrieval key that the user really wants to request first, and then urged to enter a generic concept as assisting information, which is natural unlike the conventional scheme in which the user is forced to start from the assisting query to inquire a generic concept in order to realize the effective narrowing down from a viewpoint of the system. It is also possible to determine the retrieval key entered by the user as the speech input from the large scale speech recognition database formed by data that cannot be processed in real time and that have the bias in the access frequencies, using the natural dialogue with the user in which the user is urged to enter the retrieval key that the user really wants to request first, without making the user conscious of the time required for the speech recognition processing and incompleteness of the speech recognition accuracy.

Assuming that the speech recognition accuracy is 100% and the candidate determination by the real time speech recognition processing takes T1 (sec), in the conventional scheme in which a generic concept for narrowing down the recognition target words is inquired first as the retrieval assist key rather than the retrieval key that the user really wants to request, and the input of the retrieval key is urged after the generic concept is determined and the specific concepts that are dependent on the generic concept are extracted as the retrieval target in order to realize the recognition processing in real time, 2×T1 (sec) will be required because the determination process is carried out with the user twice for the generic concept (retrieval assist key) and the retrieval key.

On the other hand, in this fourth scheme in which the high frequency access data group of the lower level is formed by data having the access frequency of 80%, the input of the retrieval key that the user really wants to request is urged first, and the retrieval processing is carried out at higher priority for the high frequency access data group, only T1 (sec) is required in the case where the requested retrieval key is contained in the high frequency access data group whereas 2×T1 (sec) is required in the case where the requested retrieval key is not contained in the high frequency access data group because a method for narrowing down by inquiring the generic concept next is adopted, and therefore 0.8×T1+0.2×2×T1=1.2×T1 (sec) is required overall, so that the expectation value for the time required in the retrieval key determination is smaller in this fourth scheme.

In practice, the speech recognition accuracy is not 100% so that it is difficult to complete the retrieval processing in the above processing time, but if the speech recognition device has such a recognition accuracy that the first candidate is a correct one at a probability of 50%, the second candidate is a correct one at a probability of 40%, and the third candidate is a correct one at a probability of 10% assuming that the correct retrieval key is obtained from the first three candidates when the correct retrieval key is contained in the speech recognition database, and assuming that the confirmation process requires T1 (sec), the conventional scheme will require 0.5×T1+0.4×2×T1+0.1×3×T1=1.6×T1 (sec) (the confirmation process time in the case where the second candidate is a correct one is 2×T1 (sec) because the confirmation process is carried out twice). Then, after narrowing down the recognition target to the number of words that can be processed in real time using the generic concept, the determination of the retrieval key requested by the user will also require 1.6×T1 (sec), so that 1.6×T1+1.6× T1 (sec) will be required overall.

On the other hand, in this fourth scheme, using the similar speech recognition accuracy and the high frequency access data group formed by data having the access frequency of 80%, and assuming that the confirmation process for the retrieval key candidates obtained from the lower level is carried out up to twice when the requested retrieval key is contained in the high frequency access data group. 0.8×0.5× T1+0.8×0.4×2×T1=1.04×T1 (sec) will be required for the retrieval key determination in the case where the correct retrieval key is obtained in the first two candidates. Also, this case adopts a method for narrowing down the retrieval range by inquiring the generic concept when the correct retrieval key is not obtained in the first two candidates even if the correct retrieval key is contained in the high frequency access data group, so that 0.5×T1+0.4×2×T1×0.1×3×T1= 1.6×T1 (sec) will be required in 10% of times (which is a probability by which the third candidate is the correct one), so that 1.6×T1×0.1=0.16×T1 will be required. Also, the same method is used when the requested retrieval key is not contained in the high frequency access data group so that 1.6×T1 (sec) will be required in 20% of times (in the case where the access frequency of the requested retrieval key is less than 20%), so that 1.6×T1×T1×0.2=0.32×T1 (sec) will be required. Thus, when the speech recognition accuracy is not 100%, this fourth scheme will require 1.04×T1+0.16× T1+0.32×T1=1.52×T1 (sec) overall.

Consequently, the expectation value for the time required in the retrieval key determination is reduced in this fourth scheme to less than a half compared with the conventional scheme. Moreover, this fourth scheme has the naturalness in that the user is first urged to enter the retrieval key that the user really wants to request, rather than starting from an assisting query for the purpose of the effective narrowing down from a viewpoint of the system.

According to one aspect of the present invention there is provided a method of speech recognition based interactive information retrieval for ascertaining and retrieving a target information of a user by determining a retrieval key entered by the user using a speech recognition processing, comprising the steps of: (a) storing retrieval key candidates that constitute a number of data that cannot be processed by the speech recognition processing in a prescribed processing time, as recognition target words in a speech recognition database, the recognition target words being divided into prioritized recognition target words that constitute a number of data that can be processed by the speech recognition processing in the prescribed processing time and that have relatively higher importance levels based on statistical information among the recognition target words, and non-prioritized recognition target words other than the prioritized recognition target words; (b) requesting the user by a speech dialogue with the user to enter a speech input indicating the retrieval key, and carrying out the speech recognition processing for the speech input with respect to the prioritized recognition target words to obtain a recognition result; (c) carrying out a confirmation process using a speech dialogue with the user according to the recognition result to determine the retrieval key, when the recognition result satisfies a prescribed condition for judging that the retrieval key can be determined only by a confirmation process with the user; (d) carrying out a related information query using a speech dialogue with the user to request the user to enter another speech input for a related information of the retrieval key, when the recognition result does not satisfy the prescribed condition; (e) carrying out the speech recognition processing for the another speech input to obtain another recognition result, and adjusting the recognition result according to the another recognition result to obtain adjusted recognition result; and (f) repeating the step (c) or the steps (d) and (e) using the adjusted recognition result in place of the recognition result, until the retrieval key is determined.

According to another aspect of the present invention there is provided a method of speech recognition based interactive information retrieval for ascertaining and retrieving a target information of a user by determining a retrieval key entered by the user using a speech recognition processing, comprising the steps of: (a) storing retrieval key candidates that are classified according to attribute values of an attribute item in a speech recognition database; (b) requesting the user by a speech dialogue with the user to enter a speech input indicating an attribute value of the attribute item for the retrieval key, and carrying out the speech recognition processing for the speech input to obtain a recognition result indicating attribute value candidates and their recognition likelihoods; (c) selecting those attribute value candidates which have recognition likelihoods that are exceeding a prescribed likelihood threshold as attribute value leading candidates, and extracting those retrieval key candidates that belong to the attribute value leading candidates as new recognition target data; (d) requesting the user by a speech dialogue with the user to enter another speech input indicating the retrieval key, and carrying out the speech recognition processing for the another speech input with respect to the new recognition target data to obtain another recognition result; and (e) carrying out a confirmation process using a speech dialogue with the user according to the another recognition result to determine the retrieval key.

According to another aspect of the present invention there is provided a method of speech recognition based interactive information retrieval for ascertaining and retrieving a target information of a user by determining a retrieval key entered by the user using a speech recognition processing, comprising the steps of: (a) storing retrieval key candidates that constitute a number of data that cannot be processed by the speech recognition processing in a prescribed processing time, in a plurality of statistically hierarchized databases provided in a speech recognition database, where lower level statistically hierarchized databases contain increasingly larger part of the retrieval key candidates such that a lowest level statistically hierarchized database contains all the retrieval key candidates; (b) requesting the user by a speech dialogue with the user to enter a speech input indicating the retrieval key, and carrying out the speech recognition processing for the speech input with respect to all of the plurality of statistically hierarchized databases in parallel, to sequentially obtain respective recognition results indicating recognition retrieval key candidates and their recognition likelihoods; (c) selecting those recognition retrieval key candidates which have recognition likelihoods that are exceeding a prescribed likelihood threshold as recognition retrieval key leading candidates, for each statistically hierarchized database for which the speech recognition processing is completed; and (d) controlling a next speech dialogue with the user according to whether a prescribed condition that a number of the recognition retrieval key leading candidates is less than or equal to a prescribed number but not zero is satisfied or not.

According to another aspect of the present invention there is provided a speech recognition based interactive information retrieval apparatus for ascertaining and retrieving a target information of a user by determining a retrieval key entered by the user using a speech recognition processing, comprising: a speech recognition database configured to store retrieval key candidates that constitute a number of data that cannot be processed by the speech recognition processing in a prescribed processing time, as recognition target words, the recognition target words being divided into prioritized recognition target words that constitute a number of data that can be processed by the speech recognition processing in the prescribed processing time and that have relatively higher importance levels based on statistical information among the recognition target words, and non-prioritized recognition target words other than the prioritized recognition target words; a speech recognition unit configured to carry out the speech recognition processing; and a dialogue control unit configured to carry out speech dialogues with the user; wherein the dialogue control unit carries out a speech dialogue for requesting the user to enter a speech input indicating the retrieval key, such that the speech recognition unit carries out the speech recognition processing for the speech input with respect to the prioritized recognition target words to obtain a recognition result; the dialogue control unit carries out a speech dialogue for a confirmation process according to the recognition result to determine the retrieval key, when the recognition result satisfies a prescribed condition for judging that the retrieval key can be determined only by a confirmation process with the user; the dialogue control unit carries out a speech dialogue for a related information query to request the user to enter another speech input for a related information of the retrieval key, when the recognition result does not satisfy the prescribed condition, such that the speech recognition unit carries out the speech recognition processing for the another speech input to obtain another recognition result and the dialogue control unit adjusts the recognition result according to the another recognition result to obtain adjusted recognition result, and the dialogue control unit controls the speech dialogues to repeat the confirmation process or the related information query using the adjusted recognition result in place of the recognition result, until the retrieval key is determined.

According to another aspect of the present invention there is provided a speech recognition based interactive information retrieval apparatus for ascertaining and retrieving a target information of a user by determining a retrieval key entered by the user using a speech recognition processing, comprising: a speech recognition database configured to store retrieval key candidates that are classified according to attribute values of an attribute item; a speech recognition unit configured to carry out the speech recognition processing; and a dialogue control unit configured to carry out speech dialogues with the user; wherein the dialogue control unit carries out a speech dialogue for requesting the user to enter a speech input indicating an attribute value of the attribute item for the retrieval key, such that the speech recognition unit carries out the speech recognition processing for the speech input to obtain a recognition result indicating attribute value candidates and their recognition likelihoods; the dialogue control unit selects those attribute value candidates which have recognition likelihoods that are exceeding a prescribed likelihood threshold as attribute value leading candidates, and extracts those retrieval key candidates that belong to the attribute value leading candidates as new recognition target data; the dialogue control unit carries out a speech dialogue for requesting the user to enter another speech input indicating the retrieval key, such that the speech recognition unit carries out the speech recognition processing for the another speech input with respect to the new recognition target data to obtain another recognition result; and the dialogue control unit carries out a speech dialogue for a confirmation process according to the another recognition result to determine the retrieval key.

According to another aspect of the present invention there is provided a speech recognition based interactive information retrieval apparatus for ascertaining and retrieving a target information of a user by determining a retrieval key entered by the user using a speech recognition processing, comprising: a speech recognition database having a plurality of statistically hierarchized databases configured to store retrieval key candidates that constitute a number of data that cannot be processed by the speech recognition processing in a prescribed processing time, where lower level statistically hierarchized databases contain increasingly larger part of the retrieval key candidates such that a lowest level statistically hierarchized database contains all the retrieval key candidates; a speech recognition unit configured to carry out the speech recognition processing; and a dialogue control unit configured to carry out speech dialogues with the user; wherein the dialogue control unit carries out a speech dialogue for requesting the user to enter a speech input indicating the retrieval key, such that the speech recognition unit carries out the speech recognition processing for the speech input with respect to all of the plurality of statistically hierarchized databases in parallel, to sequentially obtain respective recognition results indicating recognition retrieval key candidates and their recognition likelihoods; the dialogue control unit selects those recognition retrieval key candidates which have recognition likelihoods that are exceeding a prescribed likelihood threshold as recognition retrieval key leading candidates, for each statistically hierarchized database for which the speech recognition processing is completed; and the dialogue control unit controls a next speech dialogue with the user according to whether a prescribed condition that a number of the recognition retrieval key leading candidates is less than or equal to a prescribed number but not zero is satisfied or not.

According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database for storing retrieval key candidates that constitute a number of data that cannot be processed by the speech recognition processing in a prescribed processing time, as recognition target words in a speech recognition database, the recognition target words being divided into prioritized recognition target words that constitute a number of data that can be processed by the speech recognition processing in the prescribed processing time which have relatively higher importance levels based on statistical information among the recognition target words, and non-prioritized recognition target words other than the prioritized recognition target words, the computer readable program codes include: a first computer readable program code for causing said computer to request the user by a speech dialogue with the user to enter a speech input indicating the retrieval key, and carry out the speech recognition processing for the speech input with respect to the prioritized recognition target words to obtain a recognition result; a second computer readable program code for causing said computer to carry out a confirmation process using a speech dialogue with the user according to the recognition result to determine the retrieval key, when the recognition result satisfies a prescribed condition for judging that the retrieval key can be determined only by a confirmation process with the user; a third computer readable program code for causing said computer to carry out a related information query using a speech dialogue with the user to request the user to enter another speech input for a related information of the retrieval key, when the recognition result does not satisfy the prescribed condition; a fourth computer readable program code for causing said computer to carry out the speech recognition processing for the another speech input to obtain another recognition result, and adjust the recognition result according to the another recognition result to obtain adjusted recognition result; and a fifth computer readable program code for causing said computer to repeat processing of the second computer readable program code or the third and fourth computer readable program codes using the adjusted recognition result in place of the recognition result, until the retrieval key is determined.

According to another aspect of the present invention there is provided a computer usable medium storing a data structure to be used as a speech recognition database in a speech recognition based interactive information retrieval system for ascertaining and retrieving a target information of a user by determining a retrieval key entered by the user using a speech recognition processing, the data structure comprising: retrieval key candidates that constitute a number of data that cannot be processed by the speech recognition processing in a prescribed processing time, as recognition target words, the recognition target words being divided into prioritized recognition target words that constitute a number of data that can be processed by the speech recognition processing in the prescribed processing time which have relatively higher importance levels based on statistical information among the recognition target words, and non-prioritized recognition target words other than the prioritized recognition target words.

According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database for storing retrieval key candidates that are classified according to attribute values of an attribute item, the computer readable program codes include: a first computer readable program code for causing said computer to request the user by a speech dialogue with the user to enter a speech input indicating an attribute value of the attribute item for the retrieval key, and carry out the speech recognition processing for the speech input to obtain a recognition result indicating attribute value candidates and their recognition likelihoods; a second computer readable program code for causing said computer to select those attribute value candidates which have recognition likelihoods that are exceeding a prescribed likelihood threshold as attribute value leading candidates, and extract those retrieval key candidates that belong to the attribute value leading candidates as new recognition target data; a third computer readable program code for causing said computer to request the user by a speech dialogue with the user to enter another speech input indicating the retrieval key, and carry out the speech recognition processing for the another speech input with respect to the new recognition target data to obtain another recognition result; and a fourth computer readable program code for causing said computer to carry out a confirmation process using a speech dialogue with the user according to the another recognition result to determine the retrieval key.

According to another aspect of the present invention there is provided a computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database having a plurality of statistically hierarchized databases for storing retrieval key candidates that constitute a number of data that cannot be processed by the speech recognition processing in a prescribed processing time, where lower level statistically hierarchized databases contain increasingly larger part of the retrieval key candidates such that a lowest level statistically hierarchized database contains all the retrieval key candidates, the computer readable program codes include: a first computer readable program code for causing said computer to request the user by a speech dialogue with the user to enter a speech input indicating the retrieval key, and carry out the speech recognition processing for the speech input with respect to all of the plurality of statistically hierarchized databases in parallel, to sequentially obtain respective recognition results indicating recognition retrieval key candidates and their recognition likelihoods: a second computer readable program code for causing said computer to select those recognition retrieval key candidates which have recognition likelihoods that are exceeding a prescribed likelihood threshold as recognition retrieval key leading candidates, for each statistically hierarchized database for which the speech recognition processing is completed; and a third computer readable program code for causing said computer to control a next speech dialogue with the user according to whether a prescribed condition that a number of the recognition retrieval key leading candidates is less than or equal to a prescribed number but not zero is satisfied or not.

Other features and advantages of the present invention will become apparent from the following description taken in conjunction with the accompanying drawings.

BRIEF DESCRIPTION OF THE DRAWINGS

FIG. 2 is a diagram showing an exemplary information database to be utilized in the speech recognition based interactive information retrieval apparatus of FIG. 1.

FIG. 4 is a diagram showing an exemplary information database in a concrete example for an interactive information retrieval method in the first embodiment of the present invention.

FIG. 5 is a diagram showing an exemplary recognition result with respect to prioritized recognition target words in a concrete example for an interactive information retrieval method in the first embodiment of the present invention.

FIG. 7 is a diagram showing an exemplary result of adding a recognition result with respect to non-prioritized recognition target words in a concrete example of an interactive information retrieval method in the first embodiment of the present invention.

FIG. 11 is an exemplary speech recognition result table with calculated recognition likelihoods with respect to speech retrieval key candidates that is to be utilized in the speech recognition based interactive information retrieval apparatus of FIG. 9.

FIG. 12 is a diagram showing an exemplary retrieval key attribute database to be utilized in the speech recognition based interactive information retrieval apparatus of FIG. 9.

FIG. 13 is a diagram showing an exemplary related information recognition result table indicating a speech recognition result for a user's response to a retrieval key determination related query that is utilized in the speech recognition based interactive information retrieval apparatus of FIG. 9.

FIG. 15 is a diagram showing an example of statistically hierarchical databases for speech recognition in a concert ticket reservation system which is a concrete example of an interactive information retrieval method in the second embodiment of the present invention.

FIG. 16 is a diagram showing an exemplary speech recognition result table with respect to a first level statistically hierarchized database in a concert ticket reservation system which is a concrete example of an interactive information retrieval method in the second embodiment of the present invention.

FIG. 17 is a diagram showing an exemplary retrieval key attribute database in a concert ticket reservation system which is a concrete example of an interactive information retrieval method in the second embodiment of the present invention.

FIG. 18 is a diagram showing an exemplary related information recognition result table obtained from a response to a retrieval key determination related query for inquiring a concert data in a concert ticket reservation system which is a concrete example of an interactive information retrieval method in the second embodiment of the present invention.

FIG. 19 is a diagram showing an exemplary speech recognition result with respect to a second level statistically hierarchized database in a concert ticket reservation system which is a concrete example of an interactive information retrieval method in the second embodiment of the present invention.

FIG. 21 is a diagram showing an exemplary related information recognition result table obtained from a response to a retrieval key determination related query for inquiring a place of a concert in a concert ticket reservation system which is a concrete example of an interactive information retrieval method in the second embodiment of the present invention.

FIG. 24 is a diagram showing an exemplary speech recognition database to be utilized in the speech recognition based interactive information retrieval apparatus of FIG. 23.

FIG. 25 is a diagram showing an exemplary attribute database to be utilized in the speech recognition based interactive information retrieval apparatus of FIG. 23.

FIG. 27 is a diagram showing an exemplary speech recognition database in a city/town determination system which is a concrete example of an interactive information retrieval method in the third embodiment of the present invention.

FIG. 28 is a diagram showing an exemplary attribute database in a city/town determination system which is a concrete example of an interactive information retrieval method in the third embodiment of the present invention.

FIG. 37 is a diagram showing an exemplary speech retrieval key recognition result in the case of determining "Yokohama" in a city/town determination system which is a concrete example of an interactive information retrieval method in the fourth embodiment of the present invention.

FIG. 38 is a diagram showing an exemplary speech retrieval key recognition result in the case of determining "Yokokawa" using a high frequency access data group as a recognition target in a city/town determination system which is a concrete example of an interactive information retrieval method in the fourth embodiment of the present invention.

FIG. 39 is a diagram showing an exemplary speech retrieval key recognition result in the case of determining "Yokokawa" using cities or towns in Gunma as a recognition target in a city/town determination system which is a concrete example of an interactive information retrieval method in the fourth embodiment of the present invention.

DETAILED DESCRIPTION OF THE PREFERRED EMBODIMENTS

Referring now to FIG. 1 to FIG. 8, the first embodiment directed to the above described first scheme of the present invention will be described in detail.

Figure 1:
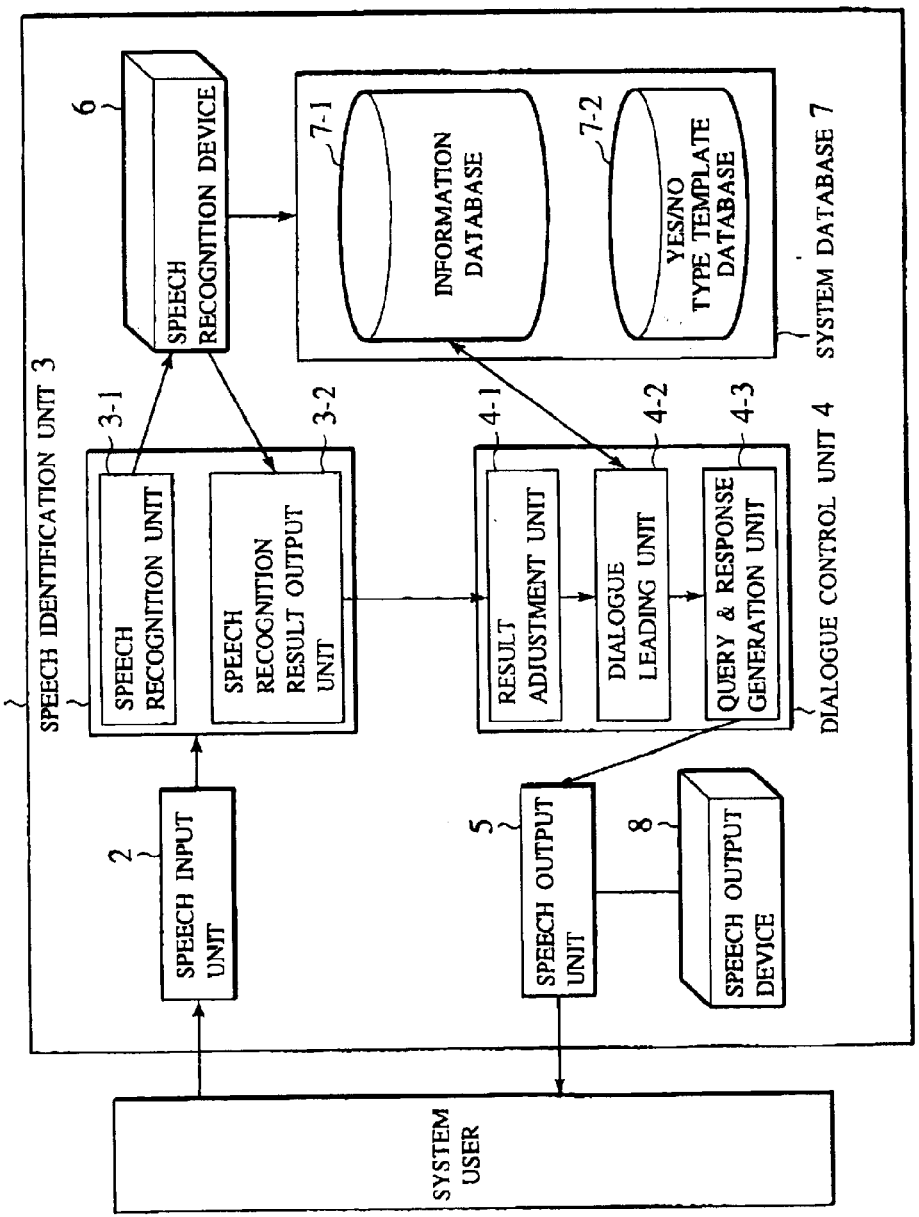
FIG. 1 is a block diagram showing an exemplary configuration of a speech recognition based interactive information retrieval apparatus in the first embodiment of the present invention.

FIG. 1 shows an exemplary configuration of a speech recognition based interactive information retrieval apparatus (which will also be referred to as interactive information retrieval apparatus for short) in the first embodiment of the present invention. This interactive information retrieval apparatus 1 comprises a speech input unit 2, a speech identification unit 3, a dialogue control unit 4, and a speech output unit 5. The speech identification unit 3 further comprises a speech recognition unit 3-1 and a speech recognition result output unit 3-2. The dialogue control unit 4 further comprises a result adjustment unit 4-1, a dialogue leading unit 4-2 and a query and response generation unit 4-3. The speech identification unit 3 utilizes a speech recognition device 6, and the speech output unit 5 utilizes a speech output device 8. Also, the speech recognition processing for input speech at the speech identification unit 3 and the result adjustment unit 4-1 and the dialogue leading unit 4-2 of the dialogue control unit 4 utilize a system database 7. The system database 7 comprises an information database 7-1 that records target information intended by users, and a YES/NO type template database 7-2.

FIG. 2 shows an exemplary overview of the information database 7-1, which contains a plurality of attributes and their attribute values in a form of a set of attribute databases for respective attributes, where different attributes may have different numbers of attribute values. The attributes are hierarchically related with each other. The interactive information retrieval apparatus 1 defines importance levels according to statistical information such as access frequencies with respect to attribute value candidates of each attribute, and selects a prescribed number of attribute values that are expected to be capable of being speech recognition processed within a real dialogue processing time in an order of the importance levels as prioritized recognition target words. The remaining non-prioritized recognition target words are recorded in subdivisions in units of the number of words that is specified by the system in view of carrying out the recognition processing in parallel to the dialogue with the user, such as the number that can be processed by the speech recognition processing in a real dialogue processing time or the number that can be processed by the speech recognition processing in a real related information query dialogue time, in an order of the importance levels.

Note that the real dialogue processing time is defined by the system as a time to be taken by the speech dialogue with the user that is expected not to cause any stress on the user and not to make the user conscious of any unnaturalness.

This embodiment will describe the case in which the interactive information retrieval apparatus 1 inquires to the user about an attribute that has the number of attribute values exceeding the number that can be processed in a real dialogue processing time and that can enable the target information determination efficiently by accounting for the user's preference, among the attributes that constitute the target information.

Figure 3:
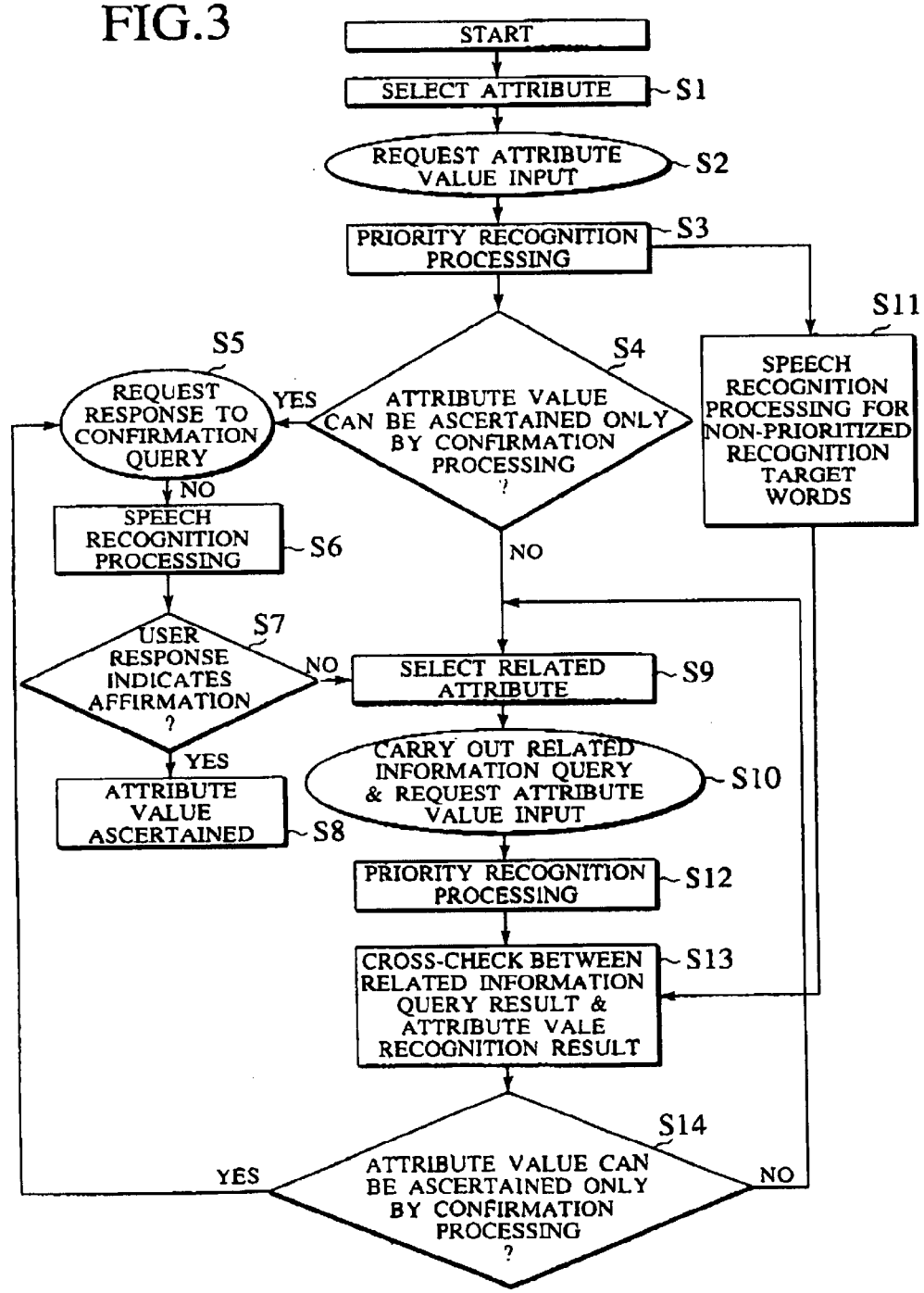
FIG. 3 is a flow chart for an information determination processing procedure in the speech recognition based interactive information retrieval apparatus of FIG. 1.

FIG. 3 shows a processing procedure for the target information determination by the interactive information retrieval apparatus 1 of this embodiment.

First, when the user selects an attribute of the target information to be requested (step S1), the interactive information retrieval apparatus 1 requests the user to enter an attribute value of that attribute (step S2), and when an attribute value of the requested attribute is entered by the user at the speech input unit 2, the input speech is sent to the speech identification unit 3 where the priority recognition processing for the received user input is carried out at the speech recognition unit 3-1 using the speech recognition device 6 (step S3). Here, the speech recognition device 6 selects a database to be used as the recognition target from the system database 7 according to a stage of the processing by the interactive information retrieval apparatus 1. Namely, the information database 7-1 is selected for an attribute value input or a response to a related information query, and the YES/NO type template database 7-2 is selected for a user response in the confirmation process. Also, when the information database 7-1 is referred, the recognition processing using attribute values of the attribute that is a target of the query in the database as the recognition target words is carried out.

The speech recognition unit 3-1 carries out the recognition processing for the attribute value specified as the prioritized recognition target words of the requested attribute in the information database 7-1. The speech recognition result output unit 3-2 obtains the recognition result and sends it to the dialogue control unit 4.

The result adjustment unit 4-1 of the dialogue control unit 4 holds the recognition result for the prioritized recognition target words and sends it to the dialogue leading unit 4-2. The dialogue leading unit 4-2 judges whether the received recognition result satisfies a prescribed condition defined in terms of the recognition likelihood for judging that the attribute value can be determined only by the confirmation process with the user, or not (step S4), and when this condition is satisfied, the dialogue leading unit 4-2 commands the query and response generation unit 4-3 to carry out the confirmation process. The query and response generation unit 4-3 then generates a query message for the confirmation process and sends it to the speech output unit 5, and the speech output unit 5 outputs the query message for the confirmation process while presenting candidates to the user, and requests a response to the confirmation query (step S5).

The speech input unit 2 receives a response of the user to the confirmation query and sends it to the speech identification unit 3, and the speech recognition unit 3-1 recognizes the user response by using the YES/NO type template database 7-2 as the recognition target, and sends the recognition result to the dialogue control unit 4 (step S6).

The result adjustment unit 4-1 sends the received recognition result to the dialogue leading unit 4-2, and the dialogue leading unit 4-2 judges whether the user response indicates affirmation or not (step S7). When the response indicating affirmation is obtained, the dialogue leading unit 4-2 commands the query and response generation unit 4-3 to generate a response message to notify the attribute value determination success, and this response message is outputted from the speech output unit 5 and the attribute value is determined (step S8). If there is another attribute which must be determined in order to ascertain the target information, the similar processing is repeated and then the target information is ascertained.

On the contrary, when the response indicating negation is obtained with respect to the confirmation query (step S7 NO), or when the prescribed condition for judging that the attribute value can be determined only by the confirmation process with the user is not satisfied (step S4 NO), the dialogue leading unit 4-2 determines to carry out the related information query, and selects an attribute to be inquired as the related information from the information database 7-1 in the system database 7 (step S9). The query and response generation unit 4-3 generates a query message for inquiring the selected related information and sends it to the speech output unit 5, so as to request the user to enter an attribute value (step S10).

When it is determined to carry out the related information query, the dialogue leading unit 4-2 also commands the speech identification unit 3 to start the recognition processing for the sets of the remaining non-prioritized recognition target words that are subdivided in units of the number specified by the system, and the speech recognition unit 3-1 starts the recognition processing for each set of the non-prioritized recognition target words (step S11). The speech recognition result output unit 3-2 sends the recognition result for each set of the non-prioritized recognition target words whenever it is obtained, to the dialogue control unit 4, where it is added to the recognition result for the prioritized recognition target words that is held at the result adjustment unit 4-1.

While the recognition processing for the non-prioritized recognition target words is in progress inside the interactive information retrieval apparatus 1, the query message to inquire the related information is outputted from the speech output unit 5 to the user. The speech input unit 2 receives a user response to the related information query and sends it to the speech identification unit 3 which then carries out the priority recognition processing for this user response (step S12).

The prescribed number of attribute values that constitutes one set of the non-prioritized recognition target words is defined such that the recognition processing is already finished at least for the first one set (comprising the prescribed number of attribute values) at this point.

The speech identification unit 3 checks the progress of the related information query whenever the recognition processing for one set is finshed during the recognition processing for the non-prioritized recognition target words. When the dialogue for the related information query is continuing, the recognition result for the set of the non-prioritized recognition target words is sent to the dialogue control unit 4, and added to the recognition result for those attribute values for which the recognition has been completed so far that is held in the result adjustment unit 4-1. Here, the recognition processing and the adding of the recognition result are carried out for as many sets of the non-prioritized recognition target words as possible until the response to the related information query is sent from the speech input unit 2.

When the user response to the related information query is received at the speech identification unit 3, the speech recognition unit 3-1 starts the recognition processing for the related information (attribute value) as the recognition target using the information database 7-1 of the system database 7. The speech recognition result output unit 3-2 sends the recognition result for the response to the related information query to the dialogue control unit 4.

The result adjustment unit 4-1 of the dialogue control unit 4 cross-checks the received recognition result for the related information and the recognition result for the attribute values to which the recognition results obtained up to that point have been added (step S13). At a time of cross-checking, the likelihood of each attribute value candidate to be a correct one is re-calculated by applying suitable operation on the recognition likelihood of each attribute value candidate.

The dialogue leading unit 4-2 judges whether the prescribed condition for judging that the attribute value can be determined only by the confirmation process with the user or not according to the re-calculated likelihood (step S14), and commands the query and response generation unit 4-3 to carry out the candidate presentation and the confirmation query (step S5) or the further related information query (step S9) depending on the judgement result. When the presentation of the cross-checked result is negated, the related information query is also carried out. During the recognition processing for the response to the related information query, the recognition processing for the set of the non-prioritized recognition target words is suspended.

Also if there is a remaining set of the non-prioritized recognition target words that has not yet recognition processed, the recognition processing and the result adding for the remaining set is continued when it is determined to carry out the related information query. Here, however, at a time of cross-checking the recognition result for the non-prioritized recognition target words at the result adjustment unit 4-1 of the dialogue control unit 4, if there exists the related information that has already been obtained by the past related information query, the recognition result for the attribute value candidates is added after cross-checking with the already obtained related information is done.

By repeating this series of operations until the attribute value can be determined, the target information is ascertained.

In the following, the interactive information retrieval method of this embodiment will be described for a concrete example. Here, the case of applying the interactive information retrieval method of this embodiment to an input interface for "address determination system" will be described. In this example, the target information is an address (in Japan).

The number of address candidates for all of Japan exceeds the number that can be processed in the real dialogue processing time, so that the information database to be utilized in the address determination is hierarchically structured such that the prefectures (47 attribute values), cities or towns in the preferctures (4,100 attribute values), and sections in the cities or towns (180,000 attribute values) are used as the attributes constituting the address, by setting the prefectures at the highest level, the cities or towns at the next level, and the sections at the lowest level. An example of the information database to be utilized in the address determination is shown in FIG. 4.

The current speech recognition technology is such that it is impossible to complete the recognition processing for 4,100 candidates for the cities or towns and 180,000 candidates for the sections in the real dialogue processing time. For this reason, the conventional method has no choice but adopting a method in which the prefetcture is inquired first, the confirmation is repeated until the prefecture is determined, then the recognition target is limited to the cities or towns in that prefecture and the city or town is inquired and determined next. However, from a viewpoint of the user, to be sequentially inquired from the name of the prefecture is circuitous, and in the case of specifying up to the section, it is necessary to carry out the input requests at least three times for the prefecture, the city or town, and the second, as well as the repetition of the confirmation process until each input is determined.

In this example, the case of specifying up to the city or town of the address will be considered. The interactive information retrieval apparatus defines the importance levels with respect to the cities or towns according to their past access frequencies, their sizes (populations), etc., and selects top 100 cities or towns that are expected to be capable of being processed in the real dialogue processing time as the priority-recognition target words.

Then, the input of the name of the city or town is requested to the user. According to the recognition result for the city or town, whether the city or town can be determined only by the confirmation process with the user or not is judged. In this example, this judgement is made according to the number of retrieval key candidates that have the recognition likelihood greater than a prescribed threshold which is obtained by comparing the recognition likelihood and the prescribed threshold. When the number of the retrieval key candidates that have the recognition likelihood greater than the prescribed threshold is less than or equal to 2 but not 0, it is judged that the retrieval key can be determined only by the confirmation process so that the confirmation process by presenting the candidates is carried out. When the number of candidates that have the recognition likelihood greater than the prescribed threshold is 0 or greater than 2, the related information query is carried out.

The remaining 4,000 non-prioritized recognition target words are subdivided into 8 sets of 500 each, in an order of the importance levels according to the specified dialogue time required for the related information query. In this example, the recognition processing and the result adding are carried out by utilizing the dialogue time during which the retrieval key determination related query is carried out. Here, it is possible to expect that the recognition processing for 2,000 candidates (4 sets) can be completed in one related information query dialogue time.

Now, the case of ascertaining the user input "Chigasaki, Kanagawa" will be described. The user enters the name of the city "Chigasaki" of the address that the user wants to request. Assuming that the importance level of Chigasaki is 500-th from the top, Chigasaki is not contained in the prioritized recognition target words.

When the speech retrieval key of "Chigasaki" is entered from the speech input unit 2, the speech recognition unit 3-1 of the speech identification unit 3 carries out the speech recognition processing with respect to the 100 prioritized recognition target words (cities or towns) in the information database 7-1.

The speech recognition result output unit 3-2 sends the recognition result for the prioritized recognition target words to the dialogue control unit 4. An example of the recognition result is shown in FIG. 5. The result adjustment unit 4-1 holds this recognition result and sends it to the dialogue leading unit 4-2. The dialogue leading unit 4-2 compares the calculated recognition likelihood with the prescirbed threshold for the 100 cities or towns that are the prioritized recognition target words. In this example, the prescribed threshold is assumed to be 1,000. As can be seen from FIG. 5, therte is no city or town candidates that have the recognition likelihood greater than the prescibed threshold in this case.

Consequently, the dialogue leading unit 4-2 determines to carry out the related information query, and selects the attribute to be utilized as the related information from the information database 7-1. In this example, the hierarchically adjacent prefecture is selected as the attribute. When it is determined to carry out the related information query, the speech recognition unit 3-1 starts the recognition processing for the remaing non-prioritized recognition target words. Here, the recognition processing is carried out for each set of 500 cites or towns that are the non-prioritized recognition target words. The speech recognition result output unit 3-2 sends the recognition result for each set of 500 cities or towns to the result adjustment unit 4-1 of the dialogue control unit 4, and adds it to the recognition result for the 100 cities or towns that are the prioritized recognition target words. In this example, the name of the prefecture is inquired as the related information query, and the recognition processing for 2,000 candidates (4 sets) are expected to be completed until the user's response "Kanagawa" is entered. An exemplary result obtained by adding the recognition result for 4 sets of the non-prioritized recognition target words is shown in FIG. 6.

The dialogue leading unit 4-2 then commands the query and response generation unit 4-3 to generate the related information query for inquiring the name of the prefecture, and the query message is outputted from the speech output unit 5.

When the user's response "Kanagawa" is entered from the speech input unit 2, the recognition processing for the non-prioritized recognition target words is suspended. In the speech identification unit 3, the entered prefecture is recognized at the speech recognition unit 3-1 and the result is sent from the speech recognition result output unit 3-2 to the result adjustment unit 4-1 of the dialogue control unit 4. An example of the recognition result for the prefecture is shown in FIG. 7.

Figure 6:
FIG. 6 is a diagram showing an exemplary recognition result for a related attribute (prefecture) in a concrete example of an interactive information retrieval method in the first embodiment of the present invention.

At this point, the result adjustment unit 4-1 holds the result for 2,100 cities or towns (100 prioritized recognition target words+2,000 non-prioritized recognition target words that are recognition processed during the related information query dialogue time) for which the recognition processing has been completed so far (FIG. 6).

The result adjustment unit 4-1 refers to the information database 7-1, and cross-checks the recognition results for the city or town candidates and the prefecture candidates. In this example, the cross-checking processing is defined to be a multiplication of the recognition likelihoods of the related attribute values. In other words, for each city or town candidate, the prefecture to which this city or town candidate belongs is judged by referring to the information database 7-1, and the recognition likelihood of this city or town candidate is multiplied by the recognition likelihood of the belonging prefecture. The multiplication result is then held as a new recognition likelihood. An exemplary result of the cross-checking is shown in FIG. 8.

Figure 8:
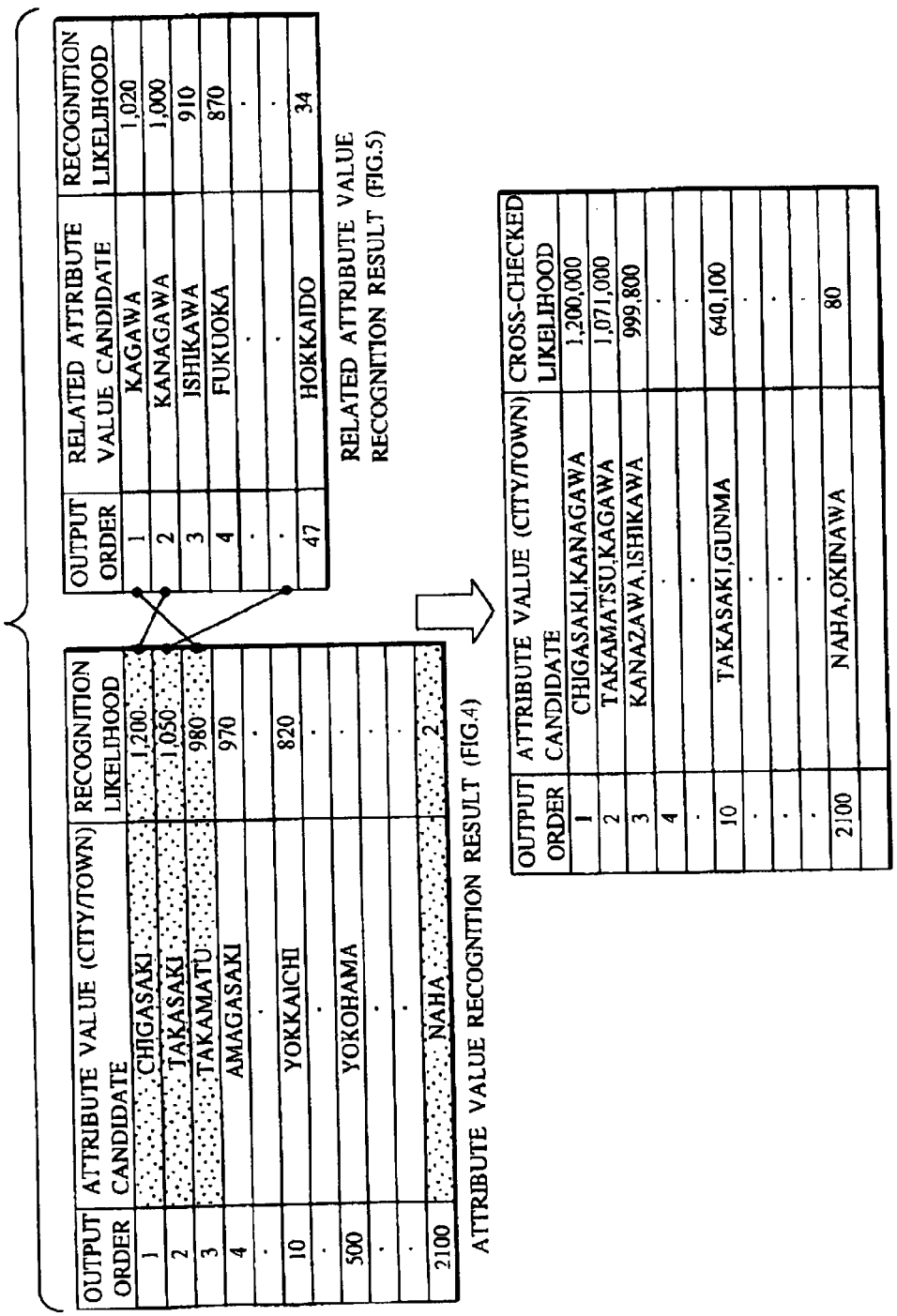
FIG. 8 is a diagram showing an exemplary cross-checking of attribute value candidates and related information in a concrete example of an interactive information retrieval method in the first embodiment of the present invention.

As can be seen from the result of the multiplication shown in FIG. 8, the top two retrieval key candidates "Chigasaki, Kanagawa" and "Takamatsu, Kagawa" have the cross-checked likelihood greater than the threshold (1,000,000). The dialogue leading unit 4-2 determines to carry out the confirmation process by presenting these two candidates sequentially, and commands the query and response generation unit 4-3 to generate the confirmation query message. When the response to the presentation of "Chigasaki, Kanagawa" outputted from the speech output unit 5 is entered from the speech input unit 2, the speech identification unit 3 carres out the recognition processing using the YES/NO type template database 7-2 as the recognition target. As a result of the recognition, the response indicating affirmation is obtained so that the dialogue leading unit 4-2 judges that the target city or town is determined as "Chigasaki", and outputs a notification of this fact from the speech output unit 5. Here, the prefecture can be derived automatically from the city or town according to the relations among the attributes in the information database 7-1, so that the target address is ascertained at this point.

According to the first scheme of the present invention described in this embodiment, the importance levels are defined with respect to the attribute values in the number exceeding the number that can be processed in the real dialogue processing time, and the attribute values with the higher importance levels in the number than can be processed in the real dialogue processing time are selected and the priority recognition processing for them is carried out. In this way, the number of the recognition target words can be seemingly narrowed down so that there is no need to keep the user awaiting, and moreover, the recognition result having a tolerable level of accuracy for the user can be expected as the recognition target words are narrowed down.

In addition, in the case where the importance levels are defined according to the past access frequencies, the possibility for the user's input to be the attribute value with the high importance level becomes higher when the access frequencies have the larger bias. Consequently, in the concrete example described above, for example, in contrast to the conventional method in which it is only possible to determine the prefecture and then the city or town in this order, the user is allowed to enter the city or town from the beginning, and the higher level prefecture can also be determined once the city or town is determined, so that it becomes possible to finish the retrieval processing only by the input of the city or town. In this way, it is possible to expect the reduction of the number of user utterances and the shortening of the overall dialogue time.

Even when the user input is the non-prioritized recognition target word, the recognition processing for the non-prioritized recognition target words is carried out by utilizing the related information query dialogue time, the obtained recognition result is added to the already obtained recognition result, and the attribute value candidates are narrowed down according to the relevancy with respect to the obtained related information, so that it becomes possible to carry out the recognition processing for the attribute values in the number exceeding the number than can be processed in the real dialogue processing time and to compensate for incompleteness of the speech recognition accuracy without making the user conscious of it. In contrast to the conventional method in which the confirmation process is repeated until the correct one is determined, the related information query is carried out so that it appears that the attribute value is determined through the natural dialogues from a viewpoint of the user, and it also becomes possible to allow the user to immediately enter the attribute value that seems to be more suitable for ascertaining the target information efficiently from a viewpoint of the user (the attribute value that is more in accord with the user preference).

In the concrete example described above, the case of determining the address up to the city or town has been described, but in the case of specifying up to the section, it is possible to determine the section from 180,000 section candidates by carrying out the similar dialogue processing using the prefecture and the city or town as the related information and the sections as the recognition tarnet attribute values.

In addition, it is also possible to use the speech input of the attribute values for plural attributes by selecting the prioritized recognition target words over plural attributes (levels) from the entire information database, without limiting to a specific attribute. In this case, by defining the importance levels with respect to all of the prefectures, the cities or towns and the sections, and selecting the prioritized recognition target words from all levels, it becomes possible to determine the input attribute value of any level, without specifying the attribute to be entered first by the user from the system side. By not specifying the attribute to be entered first by the user from the system side, it becomes possible to realize the interactive information retrieval that is even more in accord with the user preference.

Not that the address determination of the concrete example described above can be utilized for an address input in the product delivery, the telephone number search, of the postal code search, and the interactive information retrieval method of this embodiment is easily applicable to the ticket reservation, the target location search by an automotive global positioning systems, and the station search. In addition, this interactive information retrieval method is also applicable to the name search by providing a plurality of attributes such as address, sex, job, age, telephone number, etc., as the related attribute information and utilizing them in slotable combination.

Referring now to FIG. 9 to FIG. 22, the second embodiment directed to the above described second scheme or the present invention will be described in detail.

Figure 9:
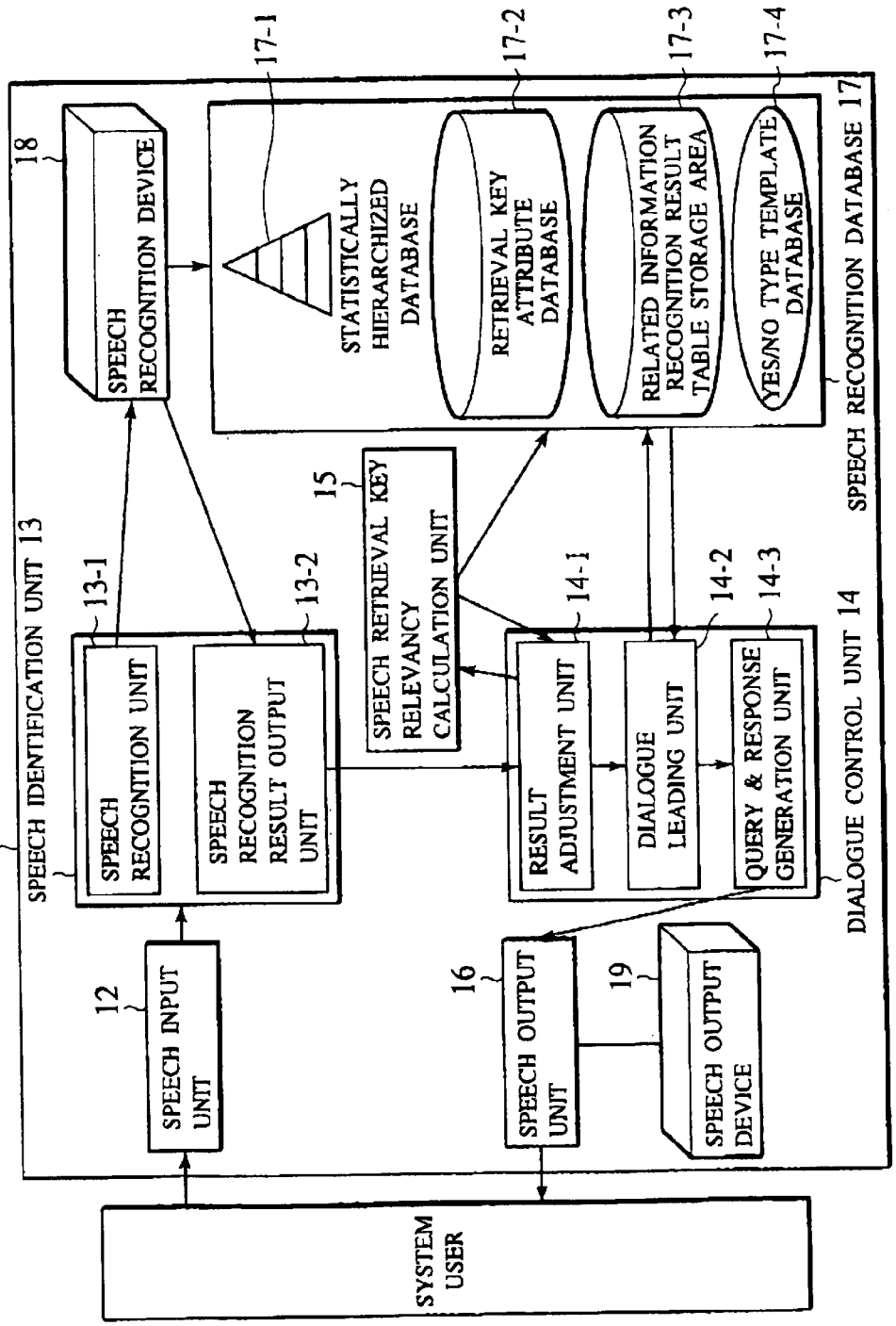
FIG. 9 is a block diagram showing an exemplary configuration of a speech recognition based interactive information retrieval apparatus in the second embodiment of the present invention.

FIG. 9 shows an exemplary configuration of a speech recognition based interactive information retrieval apparatus in the second embodiment of the present invention. This interactive information retrieval apparatus 11 comprises a speech input unit 12, a speech identification unit 13, a dialogue control unit 14, a speech retrieval key relevancy calculation unit 15, and a speech output unit 16. The speech identification unit 3 further comprises a speech recognition unit 13-1 and a speech recognition result output unit 13-2. The dialogue control unit 14 further comprises a result adjustment unit 14-1, a dialogue leading unit 14-2, and a query and response generation unit 14-3.

The speech identification unit 13 utilizes a speech recognition device 18, and the speech output unit 16 utilizes a speech output device 19. Also, the speech recognition processing for input speech at the speech identification unit 13 and the next dialogue leading at the dialogue leading unit 14-2 of the dialogue control unit 14 utilize a speech recognition database 17. The speech recognition database 17 comprises a plurality of statistically hierarchized databases 17-1, a retrieval key attribute database 17-2 that stores attribute items of retrieval key candidates for all retrieval target speech retrieval keys, a related information recognition result table storage area 17-3 and a YES/NO type template database 17-4.

Figure 10:
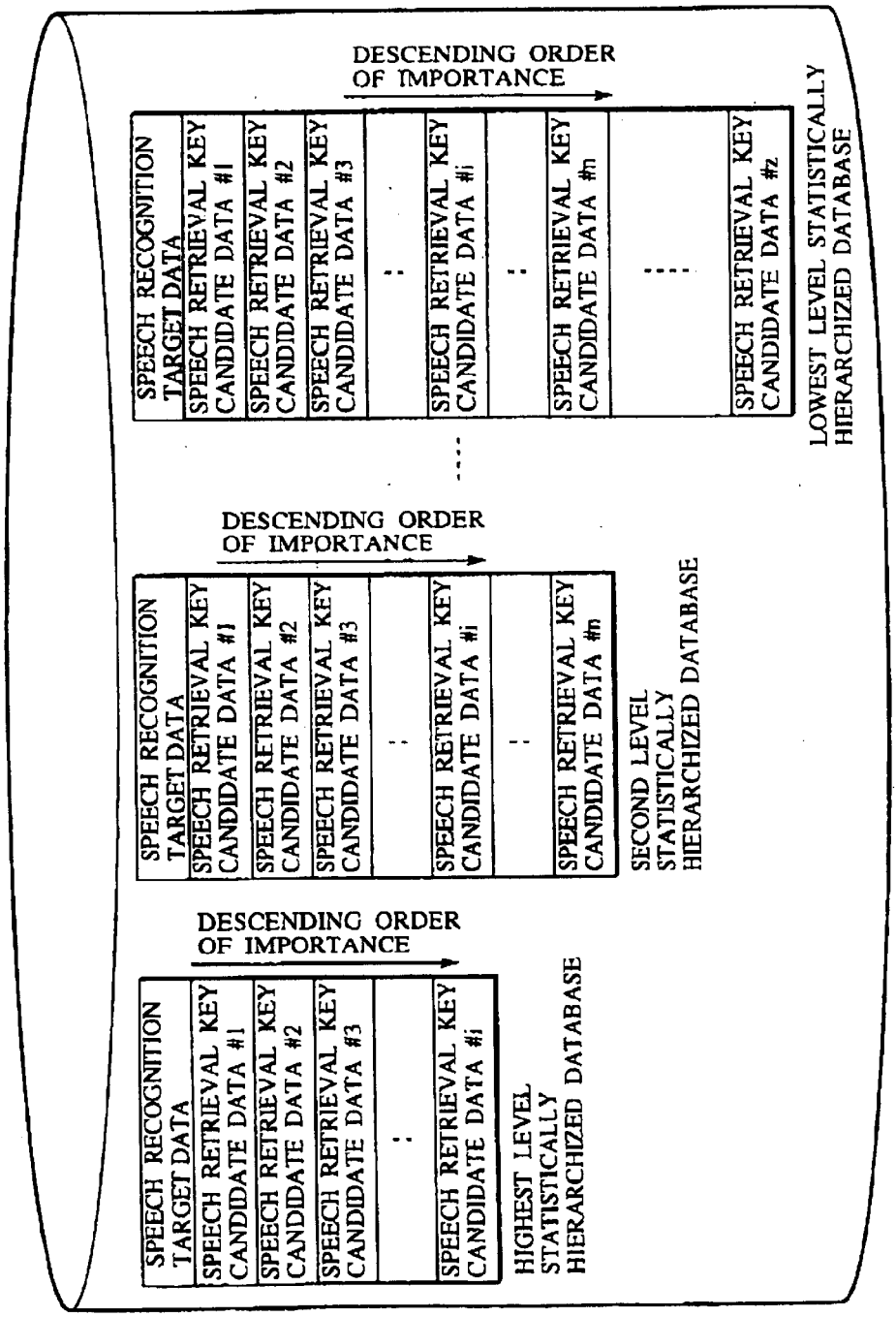
FIG. 10 is a diagram showing an example of statistically hierarchized database to be utilized in the speech recognition based interactive information retrieval apparatus of FIG. 9.

FIG. 10 shows an exemplary overview of the statistically hierarchized databases 17-1. Here, the importance levels according to statistical information such as past access frequencies by system users are defined with respect to all speech retrieval key candidates that constitute speech recognition target words, and the statistically hierarchized databases 17-1 are formed by subdividing the speech recognition target data in a hierarchical structure in an order of the importance levels.

The speech input unit 12 enters an input speech of the user into the speech identification unit 13.

In the speech identification unit 13, the speech recognition unit 13-1 carries out the speech recognition processing using the speech recognition device 18 with respect to the input speech entered from the speech input unit 13 first. At this point, the speech recognition device 18 refers to the speech recognition database 17 according to a stage of the dialogue leading to which the input speech correspond. Namely, the retrieval key attribute database 17-2 and the related information recognition result table storage area 17-3 are referred when a response to the retrieval key determination related query is entered from the speech input unit 12, and the YES/NO type template database 17-4 is referred when a response to the presentation of the speech retrieval key candidate is entered from the speech input unit 12.

Here, the speech recognition processing is started parallelly with respect to all levels of the statistically hierarchized databases 17-1 simultaneously as the speech retrieval key is entered from the user. Then, the speech recognition result output unit 13-2 produces a speech recognition result table in which the retrieval key candidates for the statistically hierarchized database 17-1 of each level are arranged in a descending order of their recognition likelihoods, when the speech recognition processing for the statistically hierarchized database 17-1 of each level is finished. An example of the speech recognition result table with respect to the highest level statistically hierarchized database is shown in FIG. 11.

Because of the difference in the number of recognition target words contained, the speech recognition processing and the speech recognition result table production for the highest level statistically hierarchized database are finished earliest among the statistically hierarchized database 17-1. When the speech recognition result table for the highest level statistically hierarchized database is produced, the recognition result is sent to the dialogue control unit 14. At this point, the speech recognition processing and the speech recognition result table production for the lower level statistically hierarchized databases are continue even when the processing for the higher level proceeds to the next stage.

The dialogue control unit 14 determines a dialogue leading to be carried out next by the interactive information retrieval apparatus 11 with respect to the user, according to the number of speech retrieval key leading candidates having the retrieval key likelihood that exceeds a prescribed likelihood threshold in the speech recognition result table for the highest level statistically hierarchized database sent from the speech recognition result output unit 13-2 of the speech identification unit 13.

When the speech recognition result table with respect to the speech retrieval key is received at the result adjustment unit 14-1, if the number of the speech retrieval key leading candidates in the recognition target statistically hierarchized database is less than or equal to a prescribed number but not zero, the dialogue leading unit 14-2 determines to carry out the retrieval key determination related query by referring to the retrieval key attribute database 17-2 shown in FIG. 12, and the retrieval key determination related query is generated by the query and response generation quit 14-3. Here, the next dialogue leading conditions are determined in advance as follows, for example.

1. A case where the speech retrieval key leading candidates greater than the prescribed number are outputted.
2. A case where there is no speech retrieval key leading candidate.
3. A case where a candidate that is determined as the speech retrieval key as a result of the cross-checking of the related attribute information candidates obtained from the retrieval key determination related query and the recognition likelihoods is presented but negated by the user as not corresponding to the speech retrieval key.
4. A case where there is no candidate which is related to the related attribute information candidates obtained from the retrieval key determination related query among the speech retrieval key leading candidates as a result of referring to the retrieval key attribute database.

Only in the case where the recognition target is the highest level, when the recognition result in the recognition target statistically hierarchized database satisfies any of the above described next dialogue leading conditions, if no related attribute information has been obtained yet, the dialogue control unit 14-2 determines to carry out a new retrieval key determination related query and commands the query and response generation unit 14-3 to generate a query message. In the other cases, the relevancy of the related attribute information candidates obtained by then and the speech retrieval key candidates in the recognition target statistically hierarchized database is judged by referring to the retrieval key attribute database 17-2 and the related information recognition result table storage area 17-3, and the normalization and the cross-checking of the recognition likelihoods are carried out by accessing the speech retrieval key relevancy calculation unit 15. Then, the query and response generation unit 14-3 is commanded to generate a query message for presenting the speech retrieval key that has the highest newly calculated retrieval key recognition likelihood.

During the above operation, the speech recognition processing and the speech recognition result table production for the other levels of the statistically hierarchized databases 17-1 are continually carried out by the speech recognition unit 13-1 and the speech recognition result output unit 13-2 of the speech identification unit 13.

Then, the generated response message or query message is outputted to the user from the speech output unit 16 using the speech output device 19, and a user's response is obtained at the speech input unit 12 again. The speech identification unit 13 carries out the speech recognition processing for the user's response to the response message or query message entered from the speech input unit 12 again and outputs the result.

By this time, the speech recognition result table production for the second statistically hierarchized database is already finished.

When the user's response received from the speech input unit 12 is a response to the retrieval key determination related query, the speech recognition result output unit 13-2 produces a related information recognition result table from the result of the speech recognition processing by the speech recognition unit 13-1, and stores it in the related information recognition result table storage area 17-3 of the speech recognition database 17, while also sending the result to the result adjustment unit 14-1. An example of the related information recognition result table is shown in FIG. 13.

When the related information recognition result table is received at the result adjustment unit 14-1, the dialogue leading unit 14-2 determines a policy for the dialogue according to the number of the speech retrieval key leading candidates having the retrieval key recognition likelihood that exceeds the prescribed likelihood threshold by referring to the speech recognition result table for the second statistically hierarchized database for which the speech recognition processing and the speech recognition result table production are already finished, similarly as in the dialogue leading for the highest level statistically hierarchized database.

When the number of the speech retrieval key leading candidates in the speech recognition result table for the second statistically hierarchized database is less than or equal to the prescribed number but not zero, the narrowing down by the retrieval key determination related query is carried out, and when any of the next dialogue leading condition is satisfied, the relevancy with respect to the related attribute information candidates obtained by then is judged and the recognition likelihoods are cross-checked, and the speech retrieval key candidate with the highest retrieval key recognition likelihood is determined as the speech retrieval key.

When the response to the speech retrieval key presentation is received at the result adjustment unit 14-1, if the response is "Yes", the dialogue leading unit 14-2 determines to generate a response message for notifying the speech retrieval key determination success and the query and response generation unit 14-3 generates this response message, and then the processing is finished. On the contrary, if the response is "No", the next dialogue leading condition is satisfied so that the result adjustment unit 14-1 commands the further dialogue leading to the dialogue leading unit 14-2 and the dialogue leading using the recognition result for the third statistically hierarchized database is started.

In this way, the normalization and the cross-checking of the recognition likelihoods utilizing the related attribute information obtained by the retrieval key determination related query are repeated until the speech retrieval key is determined, by following the dialogue policy according to the number of the speech retrieval key leading candidates.

Figure 14:
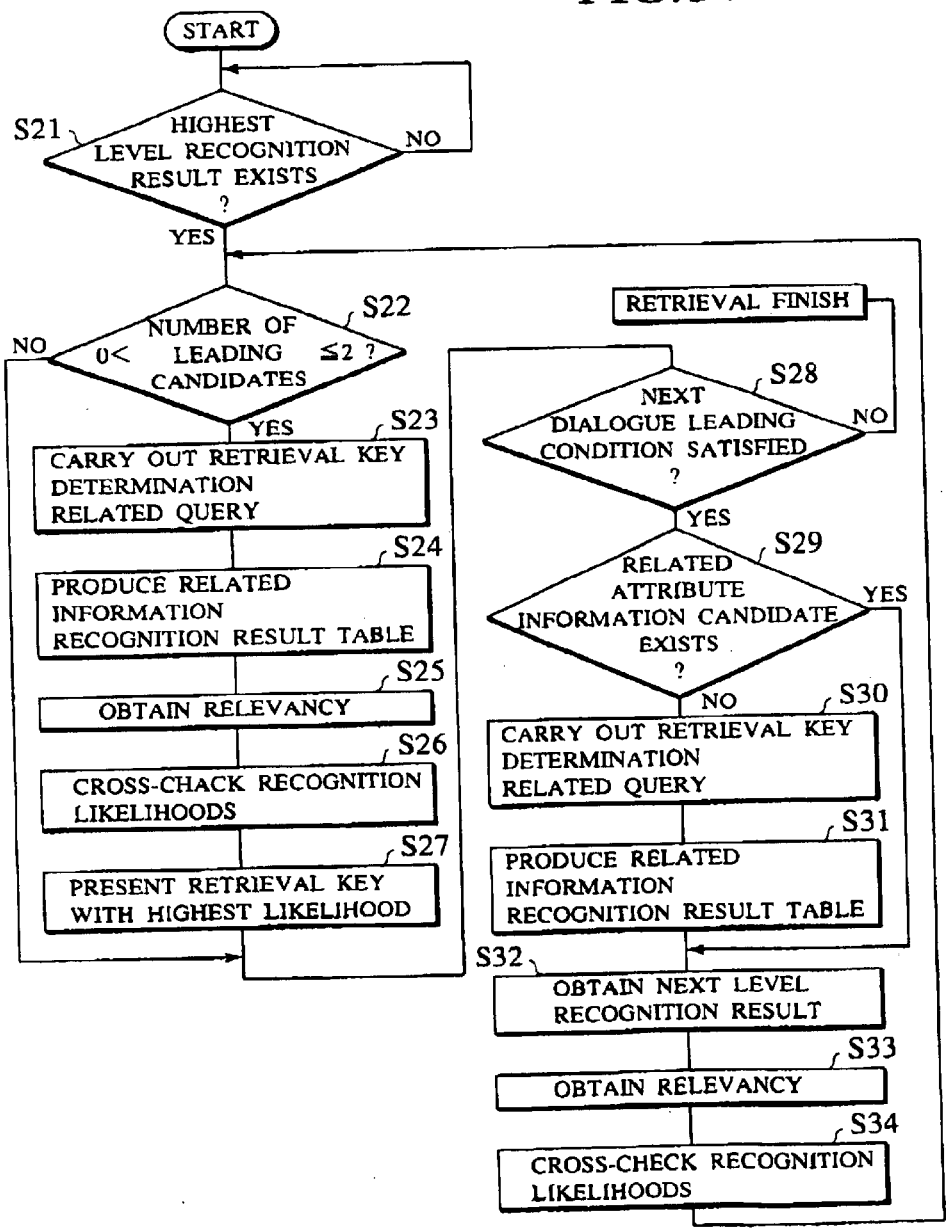
FIG. 14 is a flow chart for a processing procedure of a dialogue control unit in the speech recognition based interactive information retrieval apparatus of FIG. 9.

FIG. 14 shows the processing procedure of the dialogue control unit 14 in the interactive information retrieval apparatus 11 of this embodiment.

First, when the speech recognition result table obtained from the highest level statistically hierarchized database exists (step S21), if the number of the speech retrieval key leading candidates having the retrieval key recognition likelihood that exceeds the prescribed likelihood threshold is less than or equal to the prescribed number such as 2 but not zero (step S22), the retrieval key determination related query is carried out with respect to the user in order to obtain the related attribute information according to the speech retrieval key candidates narrowing down method (step S23), and the speech recognition processing for the user's response to the retrieval key determination related query is carried out using the speech recognition device and the related information recognition result table is produce (step S24).

When the obtained related attribute information candidate is found to be related to the speech retrieval key leading candidate in the highest level statistically hierarchized database that is currently being narrowed down by referring to the retrieval key attribute database (step S24), the related information recognition likelihood of that related attribute information and the retrieval key recognition likelihood of that speech retrieval key leading candidate are cross-checked to yield a new recognition likelihood for that speech retrieval key leading candidate (step S26), and the speech retrieval key candidate having the highest retrieval key recognition likelihood is presented to the user and the confirmation process is carried out (step S27).

Here, the next dialogue leading conditions are determined in advance as follows, for example.

1. A case where the speech retrieval key leading candidates greater than the prescribed number are outputted.
2. A case where there is no speech retrieval key leading candidate.
3. A case where a candidate that is determined as the speech retrieval key as a result of the cross-checking of the related attribute information candidates obtained from the retrieval key determination related query and the recognition likelihoods is presented but negated by the user as not corresponding to the speech retrieval key.
4. A case where there is no candidate which is related to the related attribute information candidates obtained from the retrieval key determination related query among the speech retrieval key leading candidates as a result of referring to the retrieval key attribute database.

In the case other than the above describe case where the number of the speech retrieval key leading candidates is less than or equal to the prescirbed number but not zero, when any of the above described four next dialogue leading conditions is satisfied (step S28), if the already obtained related attribute information candidate exists (step S29), the recognition result for the next level is obtained (step S32) and the relevancy with respect to the related attribute information candidate is obtained (step S33). If the already obtained related attribute information candidate does not exist, the retrieval key determination related query is newly carried out (step S30) and the related information recognition result table is produced (step S31), and then the recognition result for the next level is obtained (step S32) and the relevancy with respect to the related attribute information candidate is obtained (step S33).

When the related attribute information candidate so obtained is found to be related to the speech retrieval key leading candidate in the next (lower) level statistically hierarchized database for which the speech recognition processing and the speech recognition result are already finished at this point, by referring to the retrieval key attribute database, the retrieval key recognition likelihood of the speech retrieval key leading candidate and the related information recognition likelihood of the related attribute information are cross-checked to yield a new retrieval key recognition likelihood (step S34).

When the number of the speech retrieval key leading candidates in the next level statistically hierarchized database is less than or equal to the prescribed number such as 2 but not zero (step S22), the retrieval key determination related query is carried out with respect to the user in order to obtain another related attribute information according to the speech retrieval key candidates narrowing down method (step S23), and the speech recognition processing for the user's response to the retrieval key determination related query is carried out using the speech recognition device and the related information recognition result table is produce (step S24).

Then, the relevancy with respect to all the related attribute information candidates obtained by this and earlier retrieval key determination related queries is comprehensively evaluated (step S25), the related information recognition likelihood of the related attribute information is cross-checked with the retrieval key recognition likelihood of the speech retrieval key leading candidate in the next level statistically hierarchized database which is the current recognition target (step S26), and the speech retrieval key candidate having the highest retrieval key recognition likelihood is presented to the user and the confirmation process is carried out (step S27).

Then, when any of the above described four next dialogue leading conditions is satisfied by the speech recognition result for the next level statistically hierarchized database (step S28), the next lower statistically hierarchized database for which the speech recognition processing and the speech recognition result table production are already finished at this point is processed similarly as the higher level statistically hierarchized database (steps S29, S30, S31, and S32), and when all the related attribute information candidates obtained so far are found to be related (step S33), the recognition likelihoods are cross-checked to yield a new retrieval key recognition likelihood (step S34).

When the number of the speech retrieval key leading candidates is less than or equal to the prescribed number such as 2 but not zero (step S22), the retrieval key determination related query, the speech retrieval key candidates narrowing down, and the cross-checking of the recognition likelihoods and all the related attribute information candidates obtained by then in the case where the next dialogue leading condition is satisfied, are repeated until the speech retrieval key is determined.

In the following, the interactive information retrieval method of this embodiment will be described for a concrete example, Here, the case of applying the interactive information retrieval method of this embodiment to the determination of a name of a ticket entered by the user in a ticket reservation system having a task of reserving a concert ticket will be described.

In the ticket reservation system, it is assumed that the initial likelihood threshold specified by the system is 3500, and the prescribed number of the speech retrieval key leading candidates specified by the system for the purpose of the dialogue leading is 2, such that the retrieval key determination related query will be carried out with respect to the user when the number of the speech retrieval key leading candidates having the recognition likelihood that exceeds the prescribed likelihood threshold 3500 is less than or equal to 2, and the recognition target database will be shifted to the next level when the number of the speech retrieval key leading candidates is greater than 2.

Here, the operations in the case where the user makes a reservation of a concert ticket for "Gustav Leonhardt" will be described. In this concert ticket reservation system, the retrieval database has data of 350 concert performers overall. These 350 concert performers are subdivided into four levels of the statistically hierarchized databases according to the access frequencies (utilizing the popularity ranking based on CD sales of the past year, for example). As shown in FIG. 15, the first level (highest level) comprises a list of top 60 performers that are presumably most popular, the second level comprises a list of top 150 performers in which 90 next popular performers are added to 60 performers on the first level list, the third level comprises a list of top 250 performers in which 100 next popular performers are added to 150 performers on the second level list, and the fourth level comprises a list of all 350 performers. The target speech retrieval key "Gustav Leonhardt" is the 90th in the popularity ranking so that it does not exist in the first level statistically hierarchized database.

When the speech retrieval key "Gustav Leonhardt" is entered from the speech input unit 12, the speech recognition processing for all four levels of the statistically hierarchized databases 17-1 is started simultaneously in parallel at the speech recognition unit 13-1 of the speech identification unit 13.

The speech recognition result output unit 13-2 produces the speech recognition result table as shown in FIG. 16 by arranging 60 performers in the list of the highest level statistically hierarchized database in a descending order of the retrieval key recognition likelihood according to the speech recognition result of the speech recognition unit 13-1, and sends it to the dialogue control unit 14.

The result adjustment unit 14-1 selects the speech retrieval key leading candidates having the retrieval key recognition likelihood that exceed the prescribed likelihood threshold 3500 from the speech retrieval key candidates in the speech recognition result table of FIG. 16. As can be seen in FIG. 16, there are five speech retrieval key leading candidates, "London Symphony", "Boston Symphony", "New York Philharmonic", "Vienna State Opera" and "Metropolitan Opera" in this case.

Since the number of the speech retrieval key leading candidates is greater than the prescribed number 2, the dialogue leading unit 14-2 judges that the next dialogue leading condition No. 1 is satisfied, and since no related attribute information has been obtained at this point, the dialogue leading unit 14-2 determines to carry out the retrieval key determination related query in order to obtain the related attribute information.

As shown in FIG. 17, the retrieval key attribute database 17-2 stores the attribute values of the attribute items for all 350 concert performers, such as the concert date, the day of the week of the concert, the place of the concert, the prefecture in which the place of the concert is located, and the style of music to be played in the concert.

The dialogue leading unit 14-2 determines to inquire the concert date as the retrieval key determination related query according to the retrieval key attribute database of FIG. 17, and commands the query and response generation unit 14-3 to generate the retrieval key determination related query of "What is the data of this concert?".

The speech output unit 16 presents this retrieval key determination related query for inquiring the concert data to the user using the speech output device 19.

Then, the response "March 3" to this retrieval key determination related query from the user is entered from the speech input unit 2.

The speech recognition unit 13-1 carries out the speech recognition processing using the speech recognition device 18 for the user's response "March 3" that is sent to the speech identification unit 13, and the speech recognition result output unit 13-2 produces the related information recognition result table as shown in FIG. 18 in which the concert data candidates are arranged in a descending order of the recognition likelihood by referring to the data column of the retrieval key attribute database 17-2 and sends it to the dialogue control unit 14.

By this time, the speech recognition processing and the speech recognition result table production for the second statistically hierarchized database (containing 150 performers) are finished. The speech recognition result table for the second statistically hierarchized database is shown in FIG. 19.

The result adjustment unit 14-1 of the dialogue control unit 14 refers to the second statistically hierarchized database, and commands the speech retrieval key relevancy calculation unit 15 to carry out the normalization and multiplication of the retrieval key recognition likelihood of the speech retrieval key candidate and the related information recognition likelihood of the related attribute information candidate, with respect to the concert date candidates in the related information recognition result of FIG. 1 regarding the concert date and the speech retrieval key candidates which are found to be related to the speech retrieval key candidates in the speech recognition result table for the second statistically hierarchized database.

The speech retrieval key relevancy calculation unit 15 first normalizes the retrieval key recognition likelihoods in the speech recognition result table of FIG. 19 as indicated in the rightmost column. Then, the concert data information of "Hesperion XX: March 30", "Consort of Musicke: April 10", "London Symphony: May 30", "Gustav Leonhardt: March 3", and "Boston Symphony: April 10" are obtained as the related attribute information for the five speech retrieval key candidates having the recognition likelihood that exceeds the prescribed likelihood threshold 3500 in the speech recognition result table of FIG. 19, by referring to the retrieval key attribute database 17-2. Also, the related information recognition likelihoods for the concert data candidates in the related information recognition result table of FIG. 18 are normalized as indicated in the rightmost column.

Then, when the concert date candidate coincides with any of the concert dates of the five retrieval key candidates "Hesperion XX", "Consort of Musike", "London Symphony", "Gustav Leonhardt", and "Boston Symphony" having the recognition likelihood that exceeds the prescribed likelihood threshold 3500 in the speech recognition result table of FIG. 19 obtained from the second statistically hierarchized database, the normalized related information recognition likelihood in the related information recognition result table and the normalized retrieval key recognition likelihood of the speech retrieval key candidate in the speech recognition result table, so as to obtain the new recognition likelihoods for "Hesperion XX", "Consort of Musick", "London Symphony", "Gustav Leonhardt", and "Boston Symphony".

In other words, based on the relevancy of the speech retrieval key candidates "Hesperion XX", "Consort of Musicke", "London Symphony", "Gustav Leonhardt" and "Boston Symphony" in the speech recognition result table of FIG. 19 with respect to the concert dates in the related information recognition result table, a product of the normalized retrieval key recognition likelihood of each of these speech retrieval key candidates and the normalized related information recognition likelihood of the related concert date is calculated as the new recognition likelihood.

Figure 20:
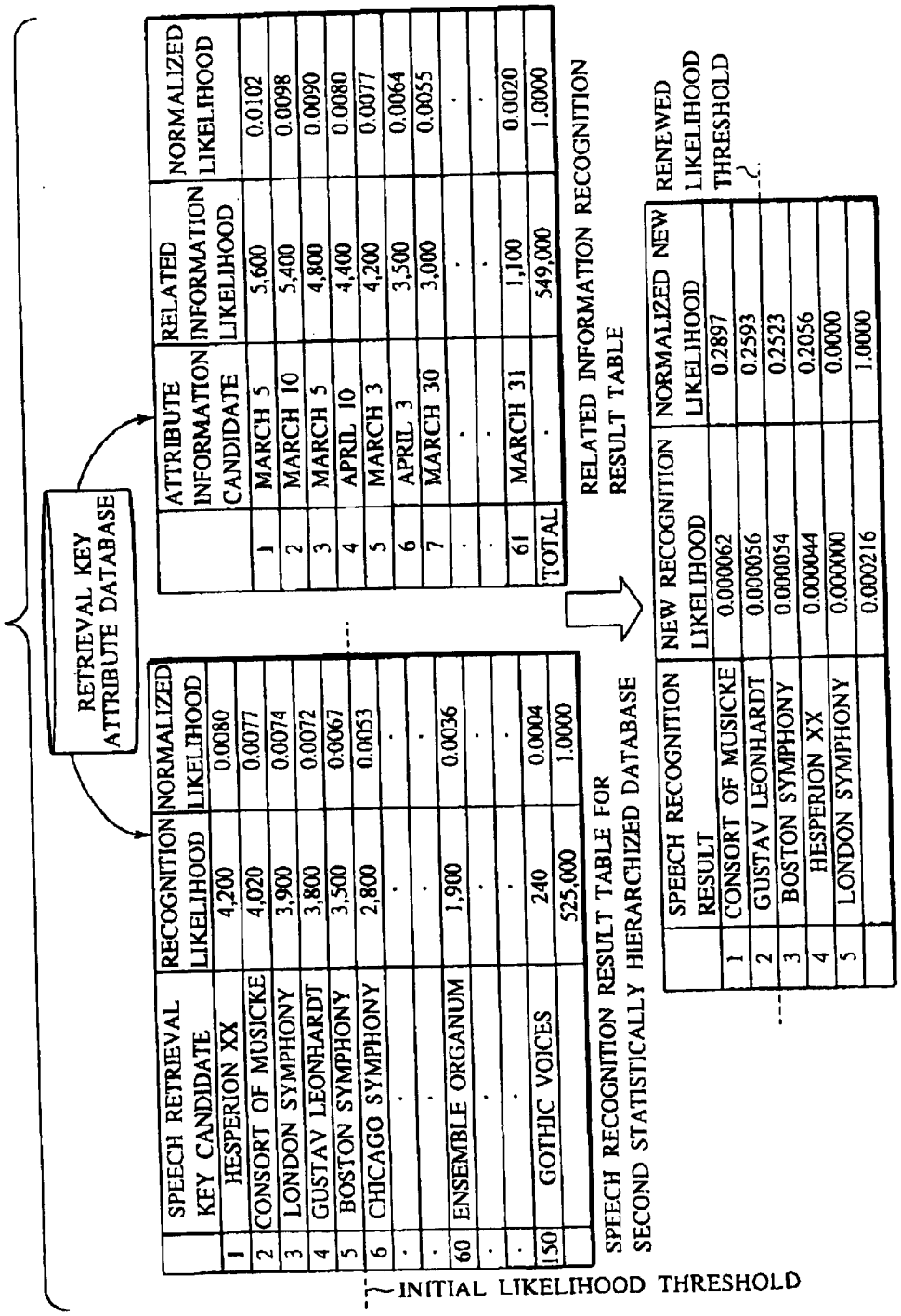
FIG. 20 is a diagram showing an exemplary cross-checking of a second level statistically hierarchized database and a related information recognition result table for a concert data in a concert ticket reservation system which is a concrete example of an interactive information retrieval method in the second embodiment of the present invention.

In this case, as shown in FIG. 20, the concert date "March 30" of "Hesperion XX" has the normalized related information recognition likelihood of 0.0055 in the related information recognition result table so that the new recognition likelihood of "Hesperion XX" is given by 0.0080 ×0.0055= 0.00044. Similarly, the normalized recognition likelihood 0.0077 of "Consort of Musicke" is multiplied with the normalized related information recognition likelihood 0.0080 of "April 10" to yield the new recognition likelihood of 0.000062. For "London Symphony", the new recognition likelihood is to be obtained by multiplying the normalized related information recognition likelihood of "May 30", but in this example it is assumed that "May 30" is not included in the recognition target words so that this date is not recognizable and therefore the related information recognition result is not obtained, and for this reason the new recognition likelihood of "London Symphony" is set equal to 0. The normalized recognition likelihood 0.0072 of "Gustav Leonhardt" is multiplied with the normalized related information recognition likelihood 0.0077 of "March 3" to yield the new recognition likelihood of 0.000056, and the normalized recognition likelihood of 0.0067 of "Boston Symphony" is multiplied with the normalized related information recognition likelihood 0.0080 of "April 10" to yield the new recognition likelihood of 0.000054.

The result adjustment unit 14-1 sends the result of calculating the new recognition likelihoods by the normalization and the cross-checking for the speech retrieval key candidates of the second statistically hierarchized database that are selected as described above, to the dialogue leading unit 14-2.

The dialogue leading unit 14-2 defines the renewed likelihood threshold for the retrieval key recognition likelihoods of the second statistically hierarchized database as 0.2590 according to the normalized new recognition likelihood. This renewed likelihood threshold is determined to be a value which is smaller than the highest likelihood value by more than a prescribed value, for example. Then, the dialogue leading according to the number of the speech retrieval key candidates having the normalized new recognition likelihood that exceeds the renewed likelihood threshold 0.2590 is started. As can be seen in FIG. 20, there are two speech retrieval key leading candidates "Consort of Musicke" and "Gustav Leonhardt" which have the recognition likelihood exceeding 0.2590 in this case.

Since the number of the speech retrieval key leading candidates in the normalized and cross-checked recognition result table is less than or equal to the prescribed number 2, the dialogue leading unit 14-2 determines to carry out the narrowing down of the leading candidates by obtaining a new related attribute information and determines to inquire the place of the concert as the new related attribute information, by referring to th retrieval key attribute database 17-2.

The query and response generation unit 14-3 generates the retrieval key determination related query of "Please answer the place of this concert" for inquiring the place of the concert, and this retrieval key determination related query is outputted from the speech output unit 16.

Then, the response speech "Casals Hall" by the user is entered from the speech input unit 12, and sent to the speech identification unit 13. The speech recognition processing for the place of the concert candidate is carried out at the speech recognition unit 13-1 of the speech identification unit 13, the related information recognition likelihood of each candidate is calculated at the speech recognition result output unit 13-2, and the related information recognition result table is sent to the dialogue control unit 14. The related information recognition result table for the place of the concert obtained as the related attribute information is shown in FIG. 21. The rightmost column in the related information recognition result table of FIG. 21 is the normalized recognition likelihood.

Then, the result adjustment unit 14-1 commands the speech retrieval key relevancy calculation unit 15 to carry out the cross-checking of the recognition likelihoods by judging the relevancy of the speech retrieval key leading candidates in the second statistically hierarchized database which is currently a target of the narrowing down, with respect to both of the related attribute information including the place of the concert now obtained and the concert data information that was obtained earlier by inquiring the concert data which is now stored in the related information recognition result table storage area.

The speech retrieval key relevancy calculation unit 15 carries out the cross-checking of the retrieval key recognition likelihood and the related information recognition likelihood of each related attribute information when the speech retrieval key leading candidates "Consort of Musicke" and "Gustave Leonhardt" are found to be related to the related attribute information candidates in the concert date recognition result and the place of the concert recognition result that is newly obtained, by referring to the retrieval key attribute database 17-2.

Namely, in this case, as shown in FIG. 21, "Casals Hall", "Orchard Hall", "Festival Hall", "Symphony Hall", "NHK Hall", etc., are obtained as the related attribute information candidates for the place of the concert. The normalized new recognition likelihoods for the "Consort of Musicke" and "Gustav Leonhardt" in the rightmost column in a lower part of FIG. 20 are values obtained by the normalization and the cross-checking of the retrieval key recognition likelihoods of the speech retrieval key leading candidates "Consort of Musicke" and "Gustav Leonhardt" and the related information recognition likelihoods of the concert data information, so that by cross-checking the related information recognition likelihood of the place of the concert candidate and the values in the rightmost column in a lower part of FIG. 20, the cross-checking with the two related attribute information of the concert date information and the place of the concert information can be realized. The relevancy of the places of the concert shown in FIG. 21 with respect to the speech retrieval key leading candidates "Consort of Musicke" and "Gustav Leonhardt" is judged from the retrieval key attribute database 17-2.

Figure 22:
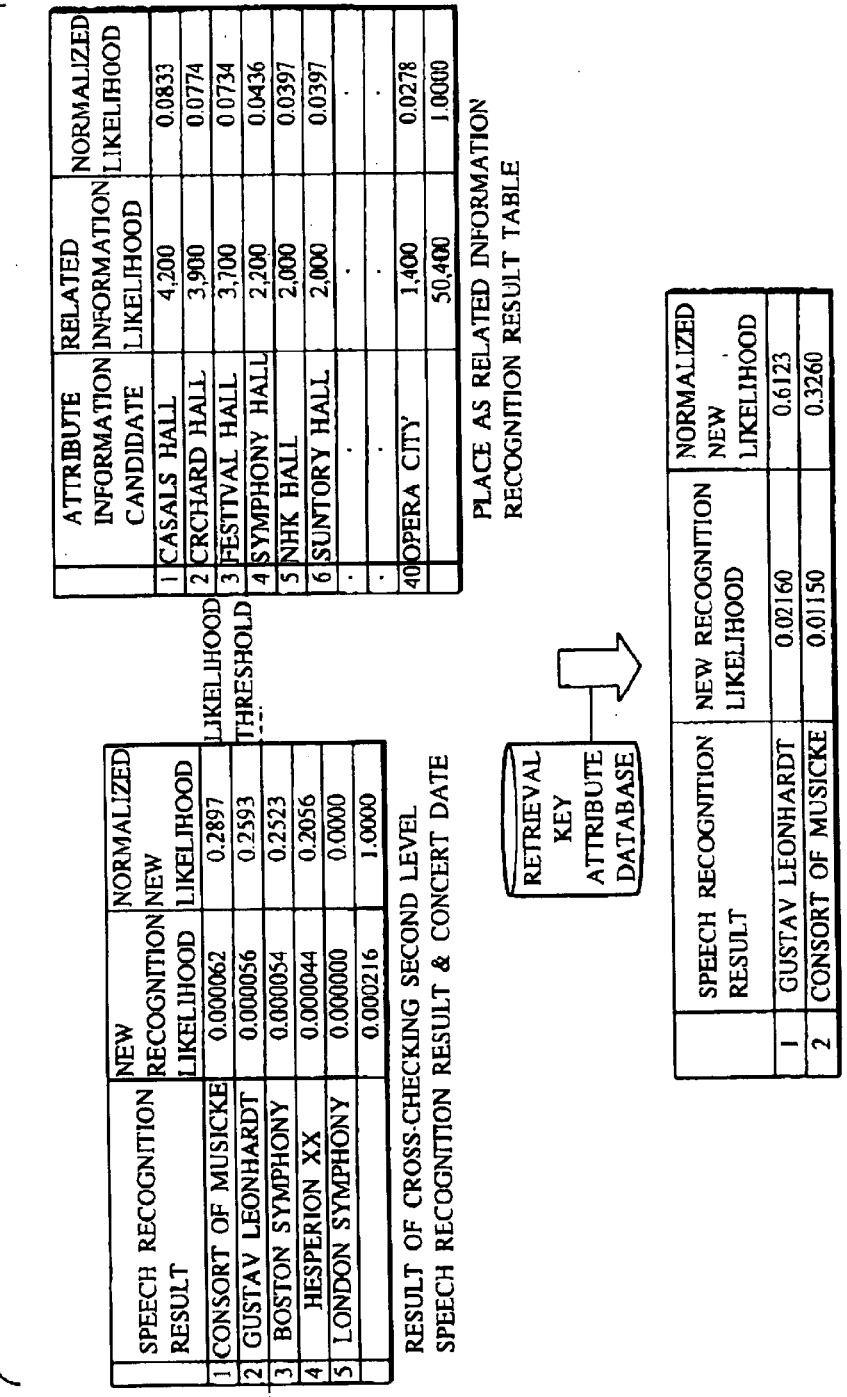
FIG. 22 is a diagram showing an exemplary cross-checking of speech retrieval key leading candidates in a second level statistically hierarchized database and a concert date and a place of a concert in a concert ticket reservation system which is a concrete example of an interactive information retrieval method in the second embodiment of the present invention.

As a result, as shown in FIG. 22, "Consort of Musicke" has the related attribute of "Suntory Hall", so that by multiplying the respective normalized recognition likelihoods of 0.2897 and 0.0397, the new recognition likelihood of "Consort of Musicke" becomes 0.01150, whereas "Gustav Leonhardt" has the related attribute of "Casals Hall", so that by multiplying the respective normalized recognition likelihoods of 0.2593 and 0.0833, the new recognition likelihood of "Gustav Leonhardt" becomes 0.02160.

From this result, the dialogue leading unit 14-2 determines that the speech retrieval key leading candidate "Gustav Leonhardt" for which the highest retrieval key recognition likelihood is obtained as a result of the recognition likelihood cross-checking is the speech retrieval key, and commands the query and response generation unit 14-3 to generate a message for presentation to the user, according to the dialogue leading scheme.

The speech output unit 16 outputs the determined candidate presentation message of "You wish to attend a concert of Gustav Leonhardt of March 3 at the Casals Hall. correct?"

The user's response "Yes" to this presentation is entered from the speech input unit 12 and sent to the speech identification unit 13. The speech recognition unit 13-1 carries out the speech recognition processing using the YES/NO type template database 17-4, and the speech recognition result output unit 13-2 sends the recognition result to the dialogue control unit 14.

The result adjustment unit 14-1 sends the recognition result "Yes" received from the speech recognition result output unit 13-2 to the dialogue leading unit 14-2, and the dialogue leading unit 14-2 judges that the correct speech retrieval key has been determined and determines to finish the dialogue.

As can be seen from the above description, in the case of the large scale speech recognition target words, the recognition processing requires a long time and moreover the recognition accuracy is not 100% by the current speech recognition technology so that it is difficult to achieve the task requested by speech from the user within a prescribed period of time. Namely the user must be kept awaiting while the system carries out the speech recognition, and when the candidate presented after waiting turns out to be the recognition error, it is necessary to repeat the query and response until the correct candidate is presented or another speech input is requested and the user is kept awaiting again, so that it is difficult to achieve the task through natural dialogues similar to dialogues with the human operator.

According to the second scheme of the present invention described in this embodiment, the importance levels are defined for all data according to the statistical information such as access frequencies, and the speech recognition database is provided in forms of a plurality of statistically hierarchized databases in which data are subdivided and hierarchically structured according to the importance levels, Also, the virtual real time performance for the speech recognition processing is realized by utilizing difference in the recognition time due to difference in the number of data contained in these databases.

Also, by setting a threshold for the recognition likelihood of the speech recognition processing, the effective narrowing down is realized by inquiring the related attribute information when there are a small number of highly reliable recognition results. When the number of highly reliable recognition results is greater than a prescribed number, or when there is no highly reliable recognition result, or when the first candidate is negated by the user as not the correct retrieval key, there is a possibility that the correct retrieval key candidate is not contained in the highest level statistically hierarchized database, so that the recognition target is shifted to the lower level statistically hierarchized database, and incompleteness of the speech recognition accuracy is compensated by carrying out the cross-checking with the related attribute information. Also, by carrying out the retrieval key determination related query to continue the dialogue, the natural dialogue is realized while pretending as if the speech recognition processing is carried out for all the data.

Note that this interactive information retrieval method is easily applicable to systems in which the task is conventionally achieved by the human operator, such as the seat reservation in which a seat is to be determined using a price of the seat as attribute, and the station search in which a station name is to be determined using a route as attribute. In addition, this interactive information retrieval method is also applicable to the name search in which the retrieval key is a name of a person, by providing a plurality of attributes such as address, sex, job, age, telephone number, etc., as the related attribute information and utilizing them in suitable combination.

Referring now to FIG. 23 to FIG. 31, the third embodiment directed to the above described third scheme of the present invention will be described in detail.

Figure 23:
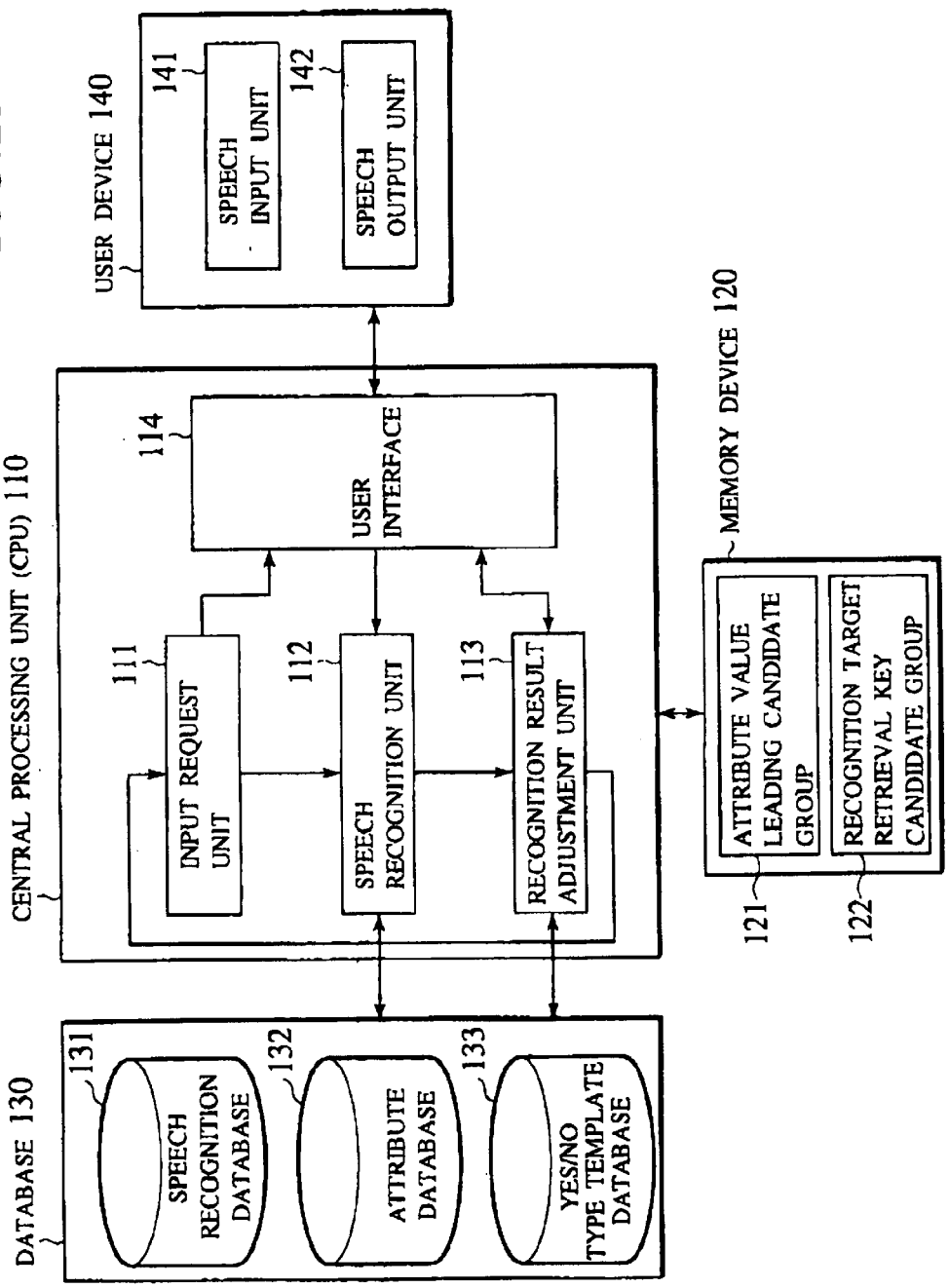
FIG. 23 is a block diagram showing an exemplary configuration of a speech recognition based interactive information retrieval apparatus in the third embodiment of the present invention.

FIG. 23 shows an exemplary configuration of a speech recognition based interactive information retrieval apparatus in the third embodiment of the present invention. This interactive information retrieval apparatus comprises a central processing unit (CPU) 110, a memory device 120, a database 130 and a user device 140. Here, it is also possible to connecte the CPU 110 and the user device 140 through a network.

The CPU 110 is a major component of this interactive information retrieval apparatus, which comprises an input request unit 111, a speech recognition unit 112, a recognition result adjustment unit 113 and a user interface (speech interface) 114. Note that these elements 111 to 114 can be constructed by utilizing hardware and software of the general purpose computer in practice. The memory device 120 is a work memory of the CPU 110 which stores various programs and intermediate processing result data as well as an attribute value leading candidate group 121 and a recognition target retrieval key cndidate group 122 to be described below. It is also possible to provide this memory device 120 as a built-in element of the CPU 110. The database 130 is an external memory device of the CPU 110, which comprises a speech recognition database 131, an attribute database 132, and a YES/NO type template database 133. The user device 140 comprises a speech input unit 141 and a speech output unit 142, and exchanges data with the CPU 110 basically in forms of speeches.

FIG. 24 shows an exemplary configuration of the speech recognition database 131, and FIG. 25 shows an exemplary configuration of the attribute database 132. Note that the YES/NO type template database 133 in this embodiment basically stores only "Yes" and "No" data so that its configuration will not be described here.

As shown in FIG. 24, the speech recognition database 131 contains retrieval key candidates, and attributes values of attribute items of the retrieval key candidates separately for each attribute item. In general, a large scale speech recognition database comprises the number of retrieval key candidates that cannot be processing within a prescribed real time. Also, as shown in FIG. 25, the attribute database 132 contains attribute value candidates for each attribute item separately. The number of attribute value candidates is in general set to be the number for which the recognition can be finished in real time.

Figure 26:
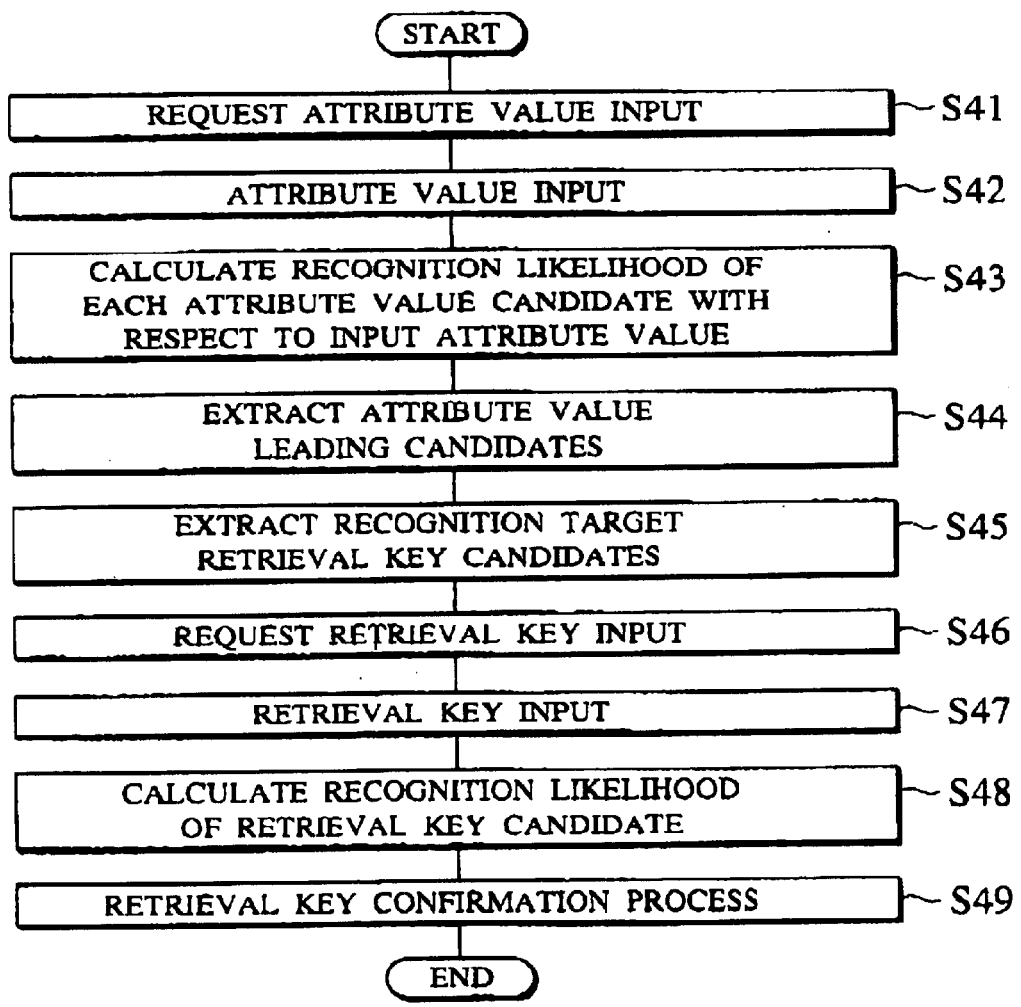
FIG. 26 is a flow chart for a retrieval key determination processing procedure in the speech recognition based interactive information retrieval apparatus of FIG. 23.

FIG. 26 shows a processing procedure for the retrieval key determination in this embodiment. The outline of the operation of the interactive information retrieval apparatus of FIG. 23 will now be described with reference to FIG. 26.

The input request unit 111 determines an attribute item to be used in selecting the recognition target words that can be processed in real time, and notifies the determined attribute item to the speech recognition unit 112 while also requesting the user to enter he attribute value of the attribute item through the user interface 114 (step S41). The user listens to the attribute value input request through the speech output unit 142, and enters the attribute value from the speech input unit 141 (step S42).

When the attribute value is entered from the user through the user interface 114, the speech recognition unit 112 carries out the speech recognition processing for the input attribute value by referring to the attribute database 132 and calculates the recognition likelihood of each attribute value candidate for that attribute item (step S43). At this point, the recognition likelihood is calculated as a similarity (distance) between the input attribute value and each attribute value candidate, for example.

The recognition result adjustment unit 113 receives each attribute value candidate and its recognition likelihood from the speech recognition unit 112, extracts those attribute value candidates which have the recognition likelihood greater than or equal to a prescribed threshold as the attribute value leading candidates, and stores them in the memory device 120 (step S44). Then, the recognition result adjustment unit 113 searches through the speech recognition database 131 using these attribute value leading candidates as keys, extracts retrieval keys that have the same attribute values as the attribute value leading candidates for that attribute item, and stores them as the recognition target retrieval key candidates in the memory device 120 (step S45).

By the above operation, the recognition target retrieval key candidates are narrowed down to the number of words that can be processed in real time. After this, the control is returned to the input request unit 111 again.

The input request unit 111 requests the user to enter the retrieval key through the user interface 114 (step S46). The user listens to the retrieval key input request through the speech output unit 142, and enters the target retrieval key from the speech input unit 141 (step S47).

When the retrieval key is entered from the user through the user interface 114, the speech recognition unit 112 carries out the speech recognition processing for this input retrieval key using the retrieval key candidates stored in the memory device 120 as the recognition target, and calculates the recognition likelihood of each retrieval key candidate (step S48). At this point, the recognition likelihood is calculated as a similarity (distance) between the input retrieval key and each retrieval key candidate, for example.

The recognition result adjustment unit 113 outputs the retrieval key candidates in a descending order of the recognition likelihood to the user through the user interface 114, and carries out the confirmation process with the user until the retrieval key is determined (step S49). More specifically, the recognition result adjustment unit 113 outputs the retrieval key candidates in a descending order of the recognition likelihood to the user, "Yes" or "No" entered by the user in response is recognized at the speech recognition unit 112 by referring to the YES/NO type template database 133, and this result is given to the recognition result adjustment unit 113. This operation is repeated until "Yes" is returned from the user.

Note that the processing algorithm and procedure shown in FIG. 26 can be provided as a retrieval key determination program which is described in a language that is executable by a computer and recorded in a computer readable recording medium such as floppy disk, CD-ROM, or memory card, for example.

In the following, the interactive information retrieval method of this embodiment will be described for a concerete example. Here, the case of applying the interactive information retrieval method of this embodiment to the determination of an address from 4,000 cities or towns in Japan will be described.

This city/town determination has 4,000 cities or towns as the recognition target which cannot be processed in real time according to the current speech recognition technology. For this reason, the prefecture to which each city or town belongs is selected as the attribute item here. There are only 47 prefectures in Japan, which can be processed in real time.

Now, the exemplary case of determining "Yokohama" will be described.

FIG. 27 shows an example of the speech recognition database 131 to be used for the city/town determination, and FIG. 28 shows an example of the attribute database 132 to be used in the city/town determination. In the case of the city/town determination, as shown in FIG. 27, the speech recognition database 131 contains 4,000 cites or towns which are the retrieval key candidates, and each city or town has attribute items such as a prefecture to which each city or town belongs which is one of 47 prefectures existing in Japan, a district to which each city or town belongs which is one of 8 districts existing in Japan, and whether or not each city or town is located on seaside.

Figure 29:
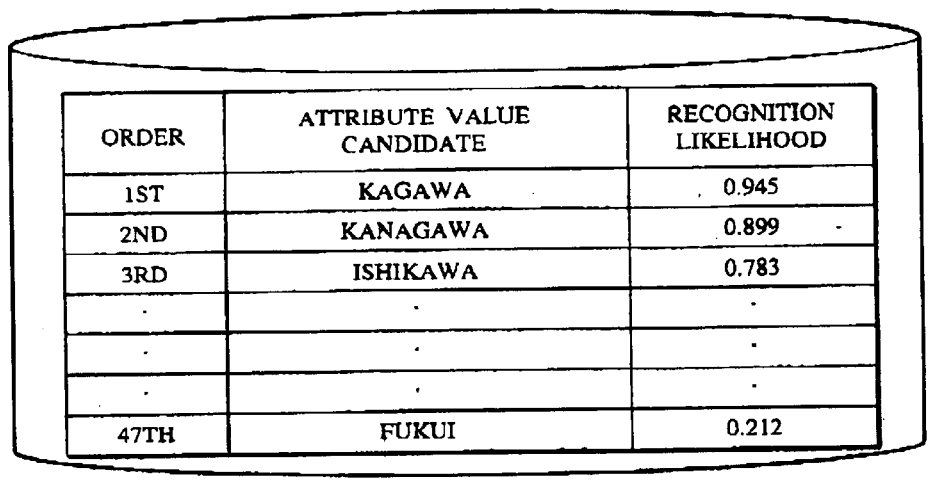
FIG. 29 is a diagram showing an exemplary recognition result for an attribute value in a city/town determination system which is a concrete example of an interactive information retrieval method in the third embodiment of the present invention.

First, the input request unit 111 inquires the prefecture which is the selected attribute item, to the user. The user enters "Kanagawa" which is the prefecture to which "Yokohama" belongs. The speech recognition unit 112 carries out the speech recognition processing for "Kanagawa" using the attribute database 132, and calculates the recognition likelihood of each one of 47 prefectures (attribute value candidates). FIG. 29 shows an exemplary recognition result for "Kanagawa" in which the candidates are arranged in a descending order of the recognition likelihood.

Figure 30:
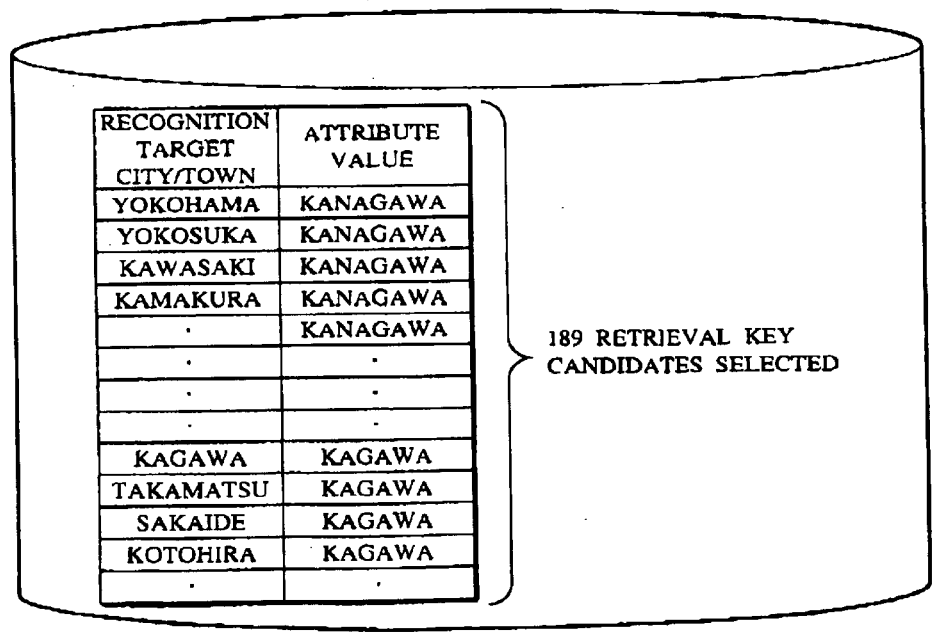
FIG. 30 is a diagram showing an exemplary result of narrowing down a recognition target in a city/town determination system which is a concrete example of an interactive information retrieval method in the third embodiment of the present invention.

The recognition result adjustment unit 113 selects those attribute value candidates which have the recognition likelihood greater than or equal to the prescribed likelihood threshold of 0.8 as the attribute value leading candidates among the recognition candidates for "Kanagawa". In this example, there are two attribute value leading candidates "Kagawa" and "kanagawa". Then the recognition result adjustment unit 113 extracts the cities or towns in Kagawa and Kanagawa as the recognition target. FIG. 30 shows a list of the extracted recognition target.

Figure 31:
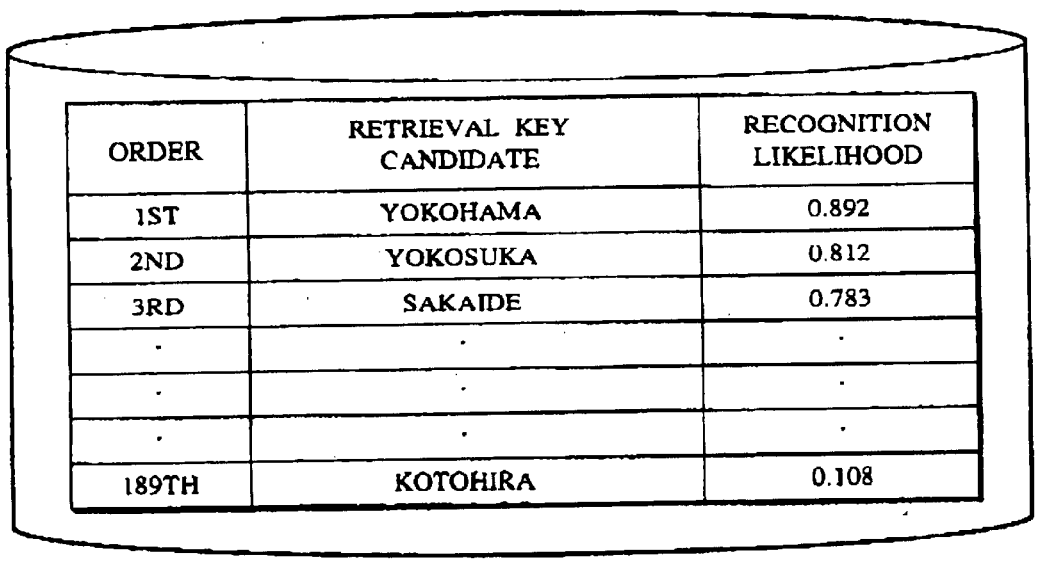
FIG. 31 is a diagram showing an exemplary recognition result for a retrieval key in a city/town determination system which is a concrete example of an interactive information retrieval method in the third embodiment of the present invention.

Next, the input request unit 111 urges the user to enter the target city or town which is the retrieval key. In response, the user enteres "Yokohama" from the speech input unit 141. The speech recognition unit 112 calculates the recognition likelihood of each city or town in Kagawa and Kanagawa that is extracted as the recognition target with respect to the input retrieval key "Yokohama", and outputs the recognition result. FIG. 31 shows an exemplary rercognition result.

The recognition result adjustment unit 113 then carries out the confirmation process with the user for the recognition result sequentially from the top candidate. In this example. "Yokohama" is outputted as the first (top) candidate having the highest recognition likelihood, so that "Yokohama" can be determined by a single confirmation process.

Now, using the example described above, the method of this embodiment will be compared with the conventional method for narrowing down the recognition target by uniquely determining the attribute value by carrying out the confirmation process even for the attribute value. In the conventional method, the determination of "Kanagawa" requires two confirmation processes because "Kanagawa" is outputted as the second candidate in the recognition result based on the recognition likelihood calculation with respect to the input attribute value as shown in FIG. 29, so that time for two confirmation processes will be required before the retrieval key input. In contrast, this time for two confirmation processes is unnecessary in the method of this embodiment.

In the following, the comparison of the processing time required in the method of this embodiment and the conventional method will be described for a concrete example. It is assumed that, when the recognition target words are 100 words or less, the speech recognition accuracy is 70% and the input speech is always outputted as one of the top three candidates. Namely, it is assumed that a probability for the input speech to be outputted as the first candidate is 70%, a probability for the input speech to be outputted as the second candidate is 20%, and a probability for the input speech to be outputted as the third candidate is 10%. It is also assumed that, when the recognition target words are 300 words or less, the speech recognition accuracy is 60% and the input speech is always outputted as one of the top four candidates. In this case, it is assumed that a probability for the input speech to be outputted as the first candidate is 80%, a probability for the input speech to be outputted as the second candidate is 25%, a probability for the input speech to be outputted as the third candidate is 10%, and a probability for the input speech to be outputted as the fourth candidate is 5%.

The attribute item is selected such that the number of attribute value candidates becomes 50 or less, and the number of retrieval key candidates belonging to each attribute value becomes 100 or less. Here, for the sake of simplicity, the speech recognition processing time T is regarded approximately as equal to 0 in the case of the number of words that can be processed in real time. The number of words that can be processed in real time is assumed to be 300. A time required for one confirmation process is assumed to be S (sec).

In the conventional method, the attribute value recognition is completed in real time T (sec) because the number of attribute value candidates is 50, and at a time of determining the attribute value by the confirmation process carried out sequentially in a descending order of the recognition likelihood, the number of the confirmation process required is one (required time of S (sec)) at 70% probability, two (required time of 2S (sec)) at 20% probability, and three (required time of 3S (sec)) at 10% probability so that the attribute value determination will require 0.7×S+0.2×2S+ 0.1×3S=1.4S (sec). Then, the recognition target is narrowed down by using the attribute value and the retrieval key input is urged to the user. Here, the speech recognition processing is completed in real time T (sec) because the number of data belonging to one attribute value is 100 or less. Form the assumption on the recognition accuracy, the number of the confirmation processes required in the retrieval key determination is one at 70% probability, two at 20% probability, and three at 10% probability, so that the retrieval key determination will require 1.4S (sec) on average similarly as the attribute value determination. Thus the retrieval key recognition and determination will require T+1.4S=1.4S (sec). Consequently, under the above assumption, the overall time required for the retrieval key determination will be 1.4S+1.4S=2.8S (sec).

On the other hand, in the method of this embodiment, under the same speech recognition accuracy, the attribute value recognition will require T (sec), and the correct attribute value is always outputted in the top three candidates because the number of attribute value candidates is 50 or less, so that top three attribute values will be stored as the attribute value leading candidates. Then, the retrieval keys belonging to these top three attribute value leading candidates are extracted and the retrieval key input is urged. Here, the number of recognition target retrieval keys becomes 300 or less because the number of data belonging to one attribute value is 100 or less. The recognition for the retrieval key is completed in real time T (sec), but because the number of the recognition target retrieval keys is 300, the number of the confirmation processes required in the retrieval key determination is one (required time of S (sec)) at 60% probability, two (required time of 2S (sec)) at 25% probability, three (required time of 3S (sec)) at 10% probability, and four (required time of 4S (sec)) at 5% probability. Thus the retrieval key determination will require 0.6×S+0.25 ×2S+ 0.1×3S+0.05×4S=1.6S (sec), and the retrieval key recognition and determination will require T+1.6S=1.6S (sec). Consequently, the overall time required since the start of the user input until the retrieval key determination will be 1.6S (sec) because the time required for the attribute value determination is T=0 (sec).

From this result, it can be seen that the method of this embodiment can reduce the retrieval key determination processing time considerably compared with the conventional method that narrows down the recognition target after uniquely determining the attribute value.

As can be seen from the above description, when the retrieval key candidates to be entered by speech from the user are a large number of words that cannot be processed in real time, because there is a limit to the number of words that can be processed in real time and the recognition accuracy is lowered for the larger number of words according to the current speech recognition technology, the real time processing is realized by narrowing down the recognition target by using the attribute value of the attribute item of the retrieval key. However, the recognition accuracy cannot become 100% even when the recognition target is narrowed down, so that the confirmation process with the user is necessary in order to determine the input of the user.

The attribute value input is an indispensable process for the purpose of realizing the real time speech recognition processing from a viewpoint of the system, but the inability to immediately enter the retrieval key that the user really wants to request appears circuitous to the user, and the repetition of two confirmation processes for the attribute value determination and the retrieval key determination causes further stress on the user.

In the third scheme of the present invention described in this embodiment, the retrieval key determination is realized without carrying out the attribute value determination, so that the confirmation process for the attribute value determination is eliminated and the circuity due to the repetition of the confirmation processes and the processing time required for the retrieval key determination are reduced, and thereby stress on the user is reduced. This scheme is particularly effective for the input speech determination using a large scale database as the recognition target.

Referring now to FIG. 32 to FIG. 39, the fourth embodiment directed to the above described fourth scheme of the present invention will be described in detail.

Figure 32:
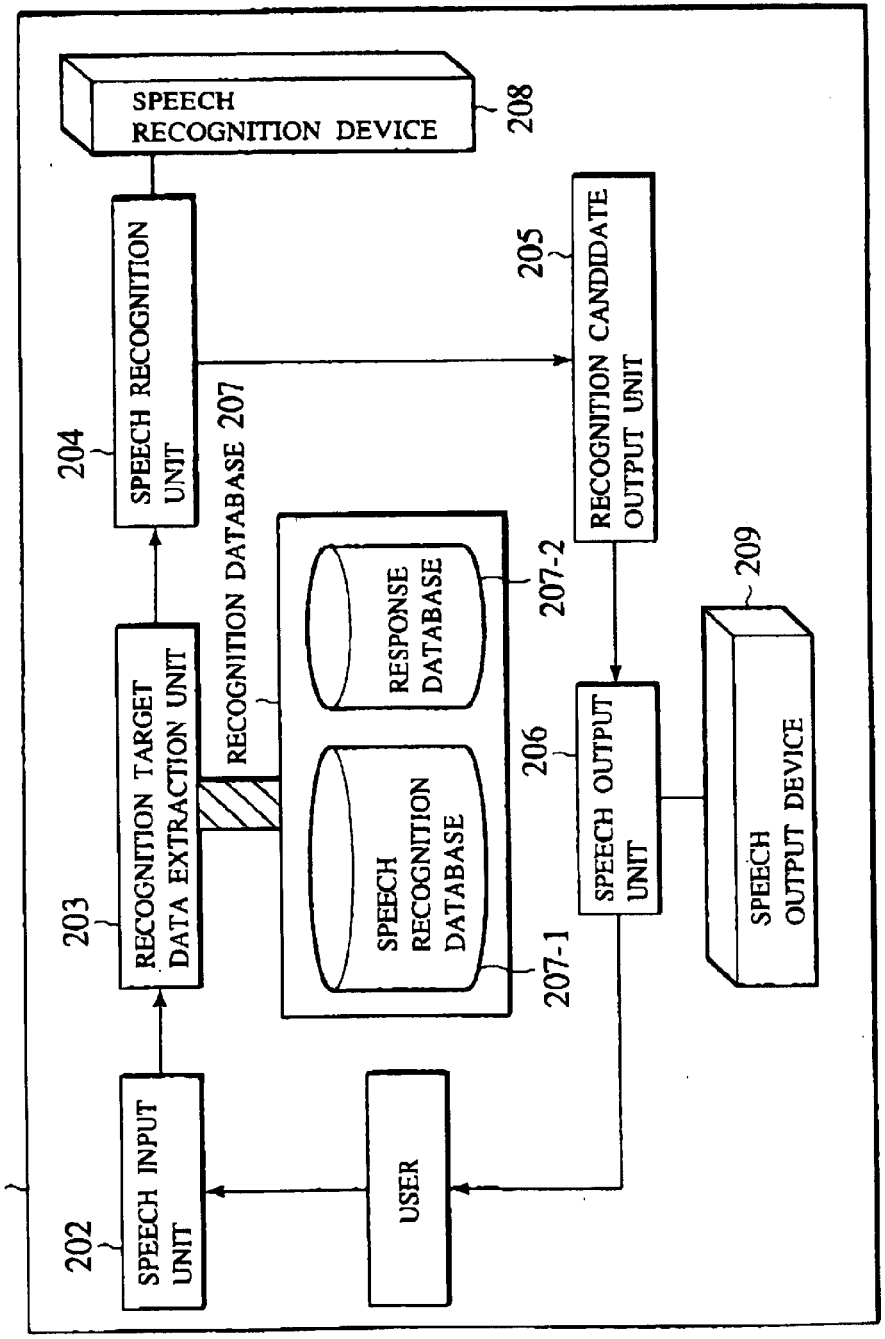
FIG. 32 is a block diagram showing an exemplary configuration of a speech recognition based interactive information retrieval apparatus in the fourth embodiment of the present invention.

FIG. 32 shows an exemplary configuration of a speech recognition based interactive information retrieval apparatus in the fourth embodiment of the present invention. This interactive information retrieval apparatus 201 comprises a speech input unit 202, a recognition target data extraction unit 203, a speech recognition unit 204, a recognition candidate output unit 205, and a speech output unit 206. The recognition target data extract unit 203 utilizes a recognition database 207 that comprises a speech recognition database 207-1 and a response database 207-2. The speech recognition unit 204 utilizes a speech recognition device 208, and the speech output unit 206 utilizes a speech output device 209.

Figure 33:
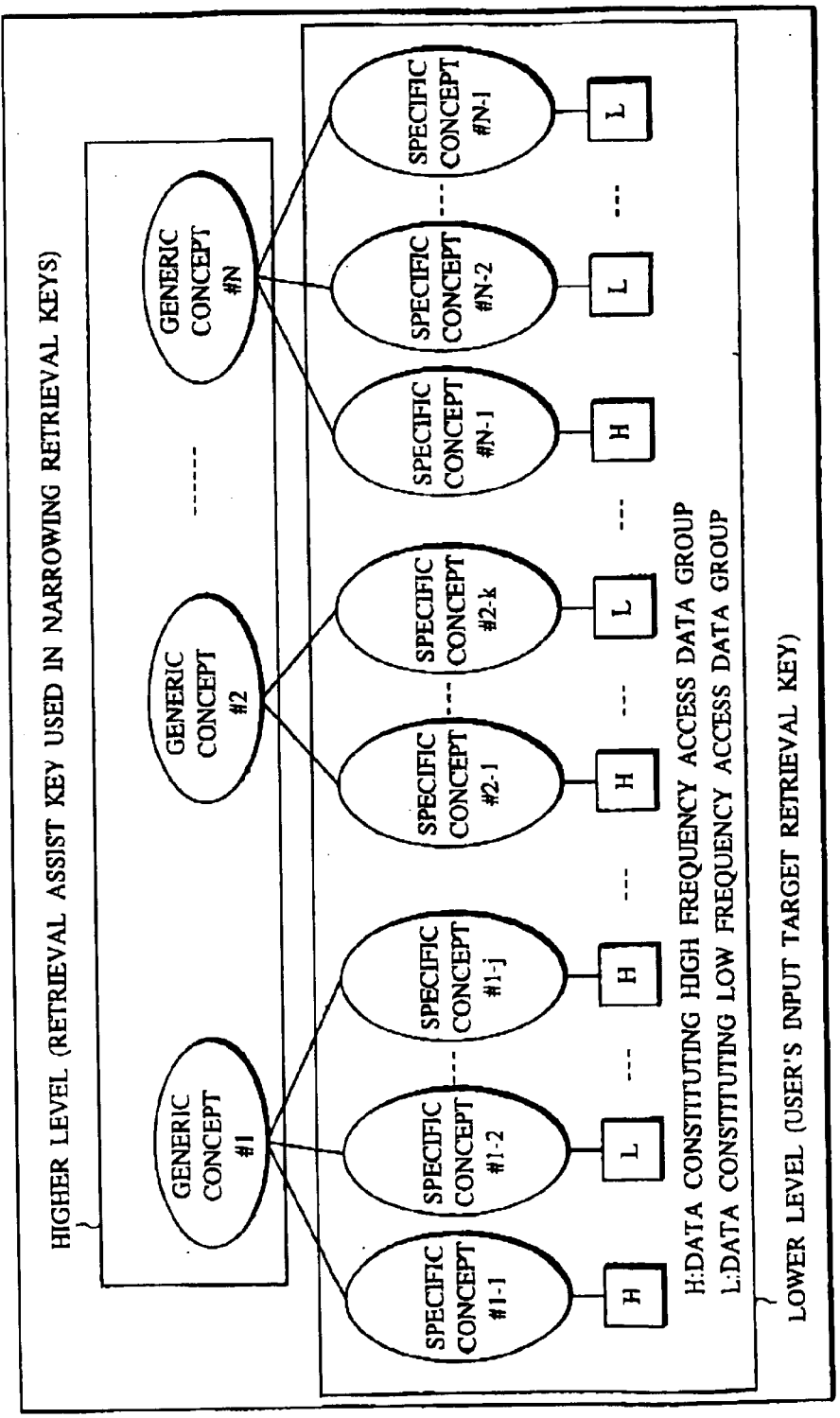
FIG. 33 is a diagram showing an exemplary speech recognition database to be utilized in the speech recognition based interactive information retrieval apparatus of FIG. 32.

FIG. 33 shows an exemplary overview of the speech recognition database 207-1 that is to be recorded in a recording medium.

The speech recognition database 207-1 is formed in two hierarchical levels for generic concepts and specific concepts, where the retrieval key to be requested by the user is a lower level data. The higher level has the number of words that can be processed in real time, while the lower level has a large number of words that cannot be processed in real time. Every lower level data has a dependecy with respect to one higher level data, and the number of the lower level data that are dependent on one higher level data is set to be the number that can be processed in real time. Also, by utilizing the bias in the access frequencies for the large number of the lower level data, as many of the lower level data as the number that can be processed in real time are selected in a descending order of the access frequency, and marked "H" to form a high frequency access data group that is to be stored in another memory separately from the other lower level data that are marked "L".

In the interactive information retrieval apparatus 201, when the speech is entered by the user at the speech input unit 202, the identification of data to be selected as the recognition target is carried out at the recognition target data extraction unit 203 according to the input speech.

Figure 34:
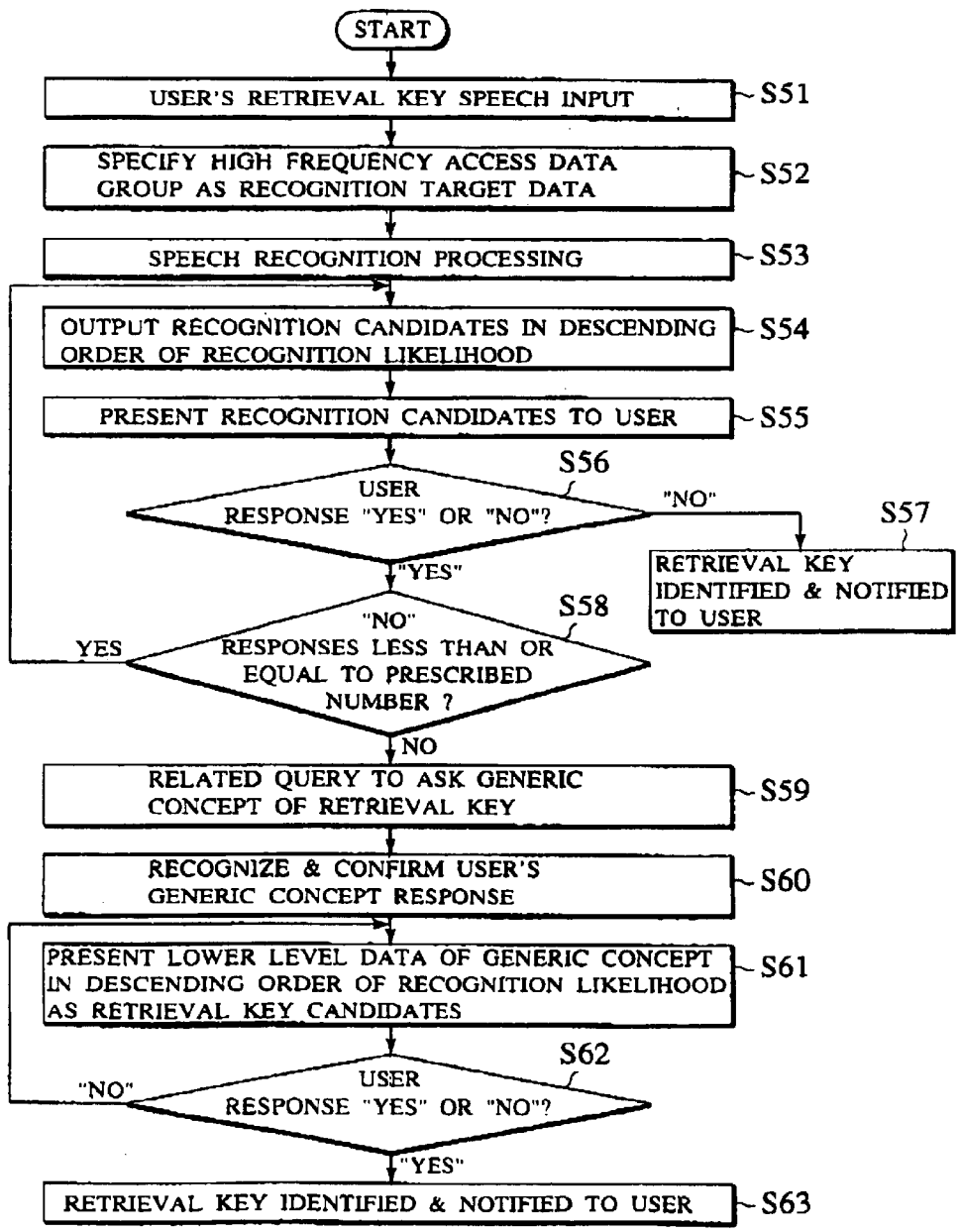
FIG. 34 is a flow chart for an interactive information retrieval processing procedure in the speech recognition based interactive information retrieval apparatus of FIG. 32.

FIG. 34 shows a processing procedure of the interactive information retrieval apparatus 201 in this embodiment.

When the retrieval key is entered by the user at the speech input unit 202 (step S51), the recognition target data extraction unit 203 specifies the high frequency access data group as the recognition target data, among the lower level data in the speech recognition database 207-1 for which the recognition and the retrieval are to be carried out at higher priority first (step S52).

Then, the speech recognition processing is carried out at the speech recognition unit 204 (step S53), and the recognition result is outputted at the recognition candidate output unit 205 (step S54). At this point, the recognition candidates are outputted in a descending order of the calculated recognition likelihood. The speech output unit 206 outputs the confirmation query while presenting the outputted retrieval key candidates in a descending order of the recognition likelihood to the user (step S55). Here, the number of times for which the confirmation query can be outputted in the confirmation process is specified in advance by the interactive information retrieval apparatus 201.

When a response to the confirmation query is entered from the speech input unit 202 (step S56), the recognition target data extraction unit 203 specifies the response database 207-2 of the recognition database 207 as the recognition target data, and when the response "Yes" is recognized at the speech recognition unit 204 and the recognition candidate output unit 205, the retrieval key determination success is notified to the user at the speech output unit 206 (step 557).

When the prescribed number of the confirmation queries for the retrieval key candidates are all negated by the user (the response "No" is recognized at the speech recognition unit 204 and the recognition candidate output unit 205) (step S58 NO), the speech output unit 206 carries out the related query for inquiring a generic concept of the retrieval key that is contained in the higher level data to the user (step S59).

When the response to the related query is entered from the speech input unit 202 and recognized by the speech recognition unit 204, the recognition target data extraction unit 203 extracts the lower level data that are dependent on the recognized generic concept as the recognition target from the speech recognition database 207-1, and then the retrieval key originally entered by the user is recognized at the speech recognition unit 204 again (step S60). Then the confirmation query for the retrieval key candidates that are outputted in a descending order of the recognition likelihood at the recognition candidate output unit 205 is outputted from the speech output unit 206 (step S61). The confirmation process is repeated until the response "Yes" is obtained from the user with respect to the confirmation query (step S62). When the response "Yes" is recognized the retrieval key determination success is notified to the user (step S63).

In the following, the interactive information retrieval method of this embodiment will be descriobed for a concerete example. Here, the case of applying the interactive information retrieval method of this embodiment to the determination of an address form cities or towns in Japan will be described.

In the city/down determination, it is assumed that the number of times for which the confirmation query can be outputted in the confirmation process for the retrieval key candidates in a descending order of the recognition likelihood is set to be 3 when the recognition target is the high frequency access data group.

Figure 35:
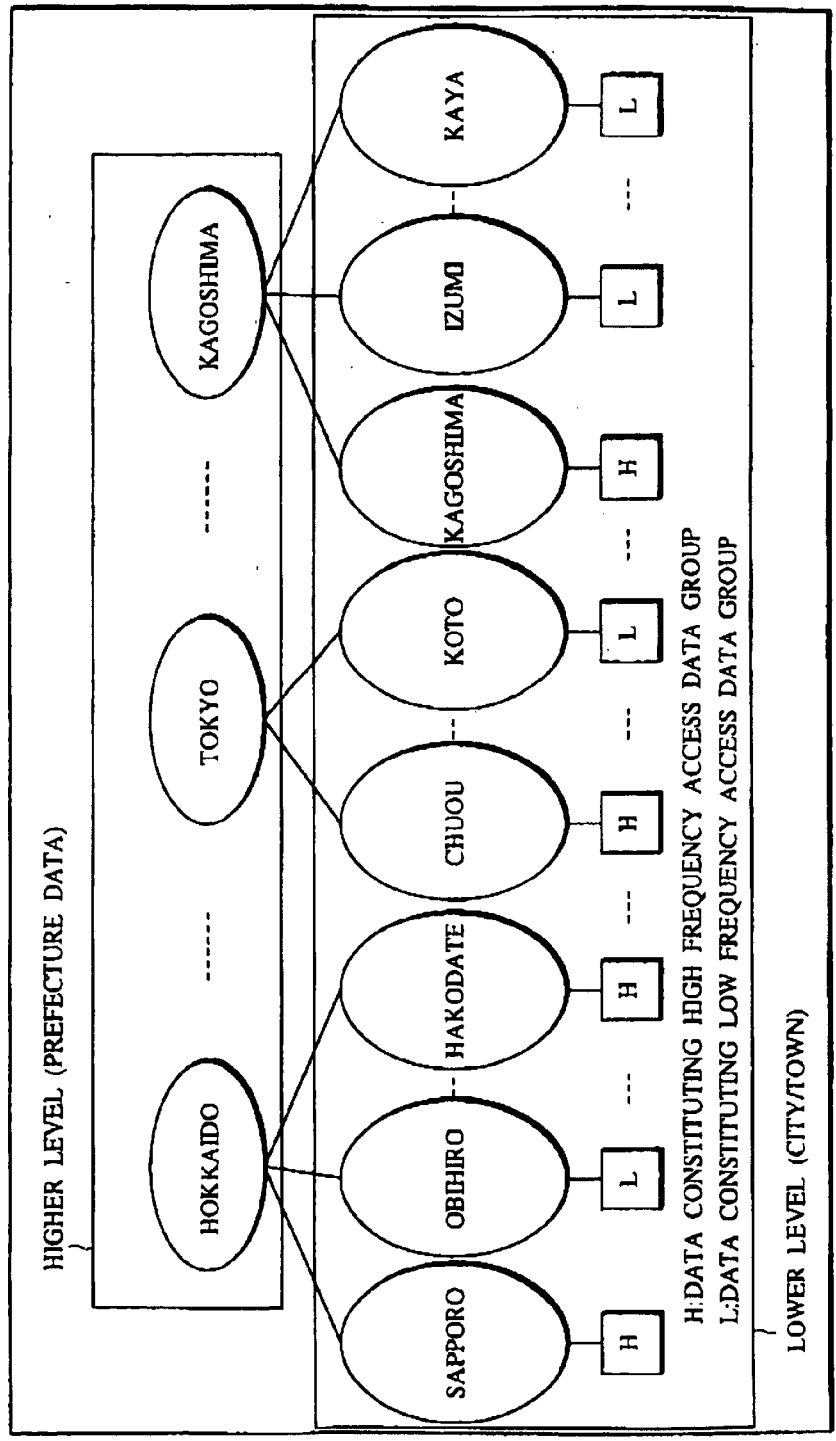
FIG. 35 is a diagram showing an exemplary speech recognition database in a city/town determination system which is a concrete example of an interactive information retrieval method in the fourth embodiment of the present invention.
Figure 36:
FIG. 36 is a diagram showing an exemplary high frequency access data group in a city/town determination system which is a concrete example of an interactive information retrieval method in the fourth embodiment of the present invention.

FIG. 35 shows an exemplary speech recognition database to be used in the city/town determination, Here, the cities or towns that can be the retrieval keys are the lower level data in the speech recognition database, and the prefectures in Japan are selected as the higher level data. There are 47 prefectures in Japan which is the number that can be processed in real time, every city or town has a prefecture to which it belongs, and the number of cities or towns belonging to one prefecture is 50 at most which can processed in real time. Also, the access frequencies in the case of using the city/town determination for telephone number guidance or the like is utilized as the access frequencies for the cities or towns, and 50 (the number that can be processed in real time) cities or towns in a descending order of the access frequency are specified as the high frequency access data group. FIG. 36 shows an example of cities or towns constituting the high frequency access data group.

First, the exemplary case of determining "Yokohama" will be described.

When "Yokohama" is entered from the speech input unit 202, the recognition target data extraction unit 203 extracts the cities or towns belonging to the high frequency access data group (such as Sapporo, Hakodate, Chuo, Kagoshima, etc., in FIG. 35) as the recognition target data among the lower level data in the speech recognition database 207-1. Here, "Yokohama" is data that is contained in the high frequency access data group. The result of the speech recognition processing at the speech recognition unit 204 is outputted at the recognition candidate output unit 205 in a descending order of the recognition likelihood. FIG. 37 shows an exemplary output result in which the first candidate is "Yokosuka", the second candidate is "Yokohama", the third candidate is "Yotsugi" and so on.

The speech output unit 208 outputs the confirmation query for the retrieval key candidates in a descending order of the recognition likelihood to the user. Since "Yokohama" is the second candidate in FIG. 37, "Yokohama" can be determined as a correct one by two confirmation queries.

Next, another exemplary case of determining "Yokokawa" will be described. Here, "Yokokawa" is data that is not contained in the high frequency access data group.

When "Yokokawa" is entered from the speech input unit 202, the recognition target data extraction unit 203 extracts the high frequency access data group as the recognition target data, and the speech recognition processing is carried out at the speech recognition unit 204. FIG. 38 shows an exemplary result outputted from the recognition candidate output unit 205.

Then, according to the result of FIG. 38, the speech output unit 206 outputs the confirmation query for the retrieval key candidates "Yokohama". "Yokosuka", and "Yokoyama" in this order. In this case, the response "No" is entered from the speech input unit 202 for all the confirmation queries, so that the interactive information retrieval apparatus 201 urges the user to enter the prefecture to which the retrieval key "Yokowaka" belongs from the speech output unit 206. When the user's response "Gunma" is entered from the speech input unit 202, the recognition target data extraction unit extracts all the lower level data belonging to Gunma, that is 41 cities or towns in Gunma, as the recognition target data. Then, the speech recognition processing for "Yokokawa" is carried out at the speech recognition unit 204 again, and the retrieval key candidates are outputted from the recognition candidate output unit 205. FIG. 39 shows an exemplary output result in this case.

Then, the confirmation query to the retrieval key candidates in a descending order of the recognition likelihood is outputted at the speech output unit 206. Since "Yokowaka" is the first candidate in FIG. 39, "Yokokawa" can be determined as a correct one by one confirmation query.

As can be seen from the above description, in the case of using a large number of speech recognition target words, there is a limit to the number of words that can be processed in real time and the recognition accuracy is lowered for the larger number of words according to the current speech recognition technology, so that the conventional system forces the user to first enter an efficient retrieval assist key by which the recognition target can be narrowed down to a small number of retrieval target words that can be recognized by the system at good accuracy in real time, rather than the retrieval key that the user really wants to request.

According to the fourth scheme of the present invention described in this embodiment, the speech recognition database is formed in two hierarchical levels, where the retrieval keys that can be requested by the user are set as the lower level data and the retrieval assist keys in the number of words that can be processed in real time with respect to which the lower level data have dependency are set as the higher level data. Moreover, the higher level data are selected such that the number of the lower level data (retrieval key candidates) that are dependent on one higher level data is the number that can be processed in real time, and the number of the lower level data with higher access frequencies that can be processed in real time are stored separately in another memory, such that the high frequency access data group is selected as the retrieval and recognition target at higher priority.

Using this specifically devised database configuration, if the retrieval key is contained in the high frequency access data group, the retrieval key determination can be realized in real time, using only the input of the retrieval key that the user really wants to request, without carrying out any related query for inquiring the generic concept as the retrieval assist key. Even when the retrieval key is not contained in the high frequency access data group, the retrieval key that the user really wants to request is entered first, and then the assisting generic concept is entered, which is natural from a viewpoint of the user, rather than forcing the user to start from the assisting query for inquiring the generic concept first in order to realize the effective narrowing down in the system as in the conventional system.

As described, according to the first scheme of the present invention, it becomes possible to provide a speech recognition based interactive information retrieval scheme capable of ascertaining the target information by determining the attribute values without making the user conscious of the time required for the speech recognition processing and the retrieval, an without causing unnatural dialogues with the user due to incompleteness of the speech recognition processing. In this scheme, in a process for determining the attribute value necessary in order to ascertain the target information, the recognition target attribute value can be determined even when the number of attribute values exceeds the number that can be processed within a prescribed period of time, by utilizing a method for narrowing down the recognition target words that can return a response with a tolerable level of accuracy for the user without making the user to have a feeling of being kept awaited, and a method for ascertaining input that can realize the reduction or the omission of the confirmation processes.

Also, according to the second scheme of the present invention, it becomes possible to provide an operator-less speech recognition based interactive information retrieval scheme using speech dialogues based on the dialogue control which is capable of determining the retrieval key entered by the user through natural dialogues. In this scheme, the retrieval key can be determined using a large scale database having the retrieval target words that cannot be processed within a prescribed period of time, without making the user conscious of the time required for the speech recognition processing and the database matching, and without causing unnatural dialogues with the user due to incompleteness of the speech recognition processing, such that the task of determining the speech retrieval key entered by the user can be achieved in the operator-less speech recognition based interactive information retrieval system, without making the user conscious of the waiting time, through dialogues that have both quickness and naturalness equivalent to a human operator based system.

Also, according to the third scheme of the present invention, it becomes possible to provide a speech recognition based interactive information retrieval scheme using a large scale database as the recognition target, which is capable of ascertaining a retrieval key entered by the speech input while reducing stress on the user. In this scheme, the retrieval key is ascertained without carrying out the attribute value determination, such that the confirmation process for the purpose of determining the attribute value is eliminated and the circuity due to the confirmation process is eliminated, while the processing time required for the retrieval key determination is shortened.

Also, according to the fourth scheme of the present inention, it becomes possible to provide a speech recognition based interactive information retrieval scheme capable of realizing the retrieval that has both quickness and naturalness in determining the retrieval key from a large scale database. In this scheme, the recognition and the retrieval are carried out without making the user conscious of the waiting time and incompleteness of the recognition accuracy during the recognition even when the retrieval key that the user really wants to request is entered immediately at the beginning, by utilizing the bias in the access frequencies of data in the large scale database, in the retrieval aimed at determining the retrieval key entered by the user using the large scale database as the recognition target.

Thus, according to the speech recognition based interactive information retrieval scheme of the present invention, the ambiguity in the recognition result of the initially entered speech input and the ambiguity in the recognition result of the subsequent speech input entered in response to the related information query can be simultaneously resolved by the cross-checking process for checking the relevancy of these recognition results, and this is a factor that contributes to the capability of returning an appropriate response to the user in short time.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the interactive information retrieval apparatus of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of speech recognition based interactive information retrieval for ascertaining and retrieving a target information of a user by determining a retrieval key entered by the user using a speech recognition processing, comprising the steps of:
   (a) storing retrieval key candidates that constitute a number of data that cannot be processed by the speech recognition processing in a prescribed processing time as recognition target words, in a plurality of statistically hierarchized databases provided in a speech recognition database, where lower level statistically hierarchized databases contain increasingly larger part of the retrieval key candidates such that a lower level statistically hierarchized database contains all the retrieval key candidates;
   (b) requesting the user by a speech dialogue with the user to enter a speech input indicating the retrieval key, and carrying out the speech recognition processing for the speech input with respect to all of the plurality of statistically hierarchized databases in parallel, to sequentially obtain respective recognition results indicating recognition retrieval key candidates and their recognition likelihoods;
   (c) selecting those recognition retrieval key candidates which have recognition likelihoods that are exceeding a prescribed likelihood threshold as recognition retrieval key leading candidates, for each statistically hierarchized database for which the speech recognition processing is completed; and
   (d) controlling a next speech dialogue with the user according to whether a prescribed condition that a number of the recognition retrieval key leading candidates is less than or equal to a prescribed number but not zero is satisfied or not.

2. The method of claim 1, wherein the step (d) further comprises the sub-steps of:
   (d1) carrying out a related information query using a speech dialogue with the user to request the user to enter another speech input indicating a related information of the retrieval key, when the prescribed condition is satisfied;
   (d2) carrying out the speech recognition processing for the another speech input to obtain another recognition result indicating recognition related information candidates and their recognition likelihoods, and adjusting the recognition result according to the another recognition result to obtain adjusted recognition result; and
   (d3) carrying out a confirmation process using a speech dialogue with the user according to the adjusted recognition result to determine the retrieval key.

3. The method of claim 2, wherein the step (d2) adjusts the recognition result by calculating new recognition likelihoods for the recognition retrieval key candidates according to recognition likelihoods for the recognition retrieval key candidates indicated in the recognition result and recognition likelihoods for the recognition related information candidates indicated in the another recognition result.

4. The method of claim 3, wherein the step (d2) calculates the new recognition likelihoods for the recognition retrieval key candidates by normalizing the recognition likelihoods for the recognition retrieval key candidates indicated in the recognition result, normalizing the recognition likelihoods for the recognition related information candidates indicated in the another recognition result, and multiplying a normalized recognition likelihood of each recognition retrieval key candidate with a normalized recognition likelihood of a corresponding recognition related information candidate that is found to be related to each recognition retrieval key candidate.

5. The method of claim 2, further comprising the step of:
(e) checking whether any of prescribed next dialogue leading conditions is satisfied or not, and shirting a recognition target to a next lower level statistically hierarchized database when any of the prescribed next dialogue leading conditions is satisfied.

6. The method of claim 5, further comprising the steps of:
(f) adjusting the recognition result for the next lower level statistically hierarchized database according to a related information of the retrieval key to obtain another adjusted recognition result;
(g) selecting those recognition retrieval key candidates which have recognition likelihoods that are exceeding the prescribed likelihood threshold as recognition retrieval key leading candidates, from the another adjusted recognition result; and
(h) controlling a next speech dialogue with the user according to whether the prescribed condition that a number of recognition retrieval key leading candidates is less than or equal to a prescribed number but not zero is satisfied or not.

7. The method of claim 6, wherein the related information used at the step (f) is information already obtained before the step (e) in a course of processing a higher level statistically hierarchized database.

8. The method of claim 6, wherein the related information used at the step (f) is obtained by carrying out a related information query using a speech dialogue with the user to request the user to enter another speech input for a related information of the retrieval key, when no related information of the retrieval key is obtained yet.

9. The method of claim 5, wherein the prescribed next dialogue leading conditions include:
(1) a case where the number of the recognition retrieval key leading candidates is not less than or equal to the prescribed number;
(2) a case where the number of the recognition retrieval key leading candidates is zero;
(3) a case where a recognition retrieval key candidate presented to the user in the confirmation process of the step (dS) according to the adjusted recognition result is negated by the user; and
(4) a case where no recognition retrieval key leading candidates is found to be related to the recognition related information candidates obtained by the speech recognition processing of the step (d2).

10. The method of claim 1, wherein the step (a) stores the retrieval key candidates in the plurality of statistically hierarchized databases, such that an (n+1)-th level statistically hierarchized database contains a number of the retrieval key candidates that can be processed by the speech recognition processing while carrying out a speech dialogues with the user to determine the retrieval key using an n-th level statistically hierarchized database.

11. The method of claim 1, wherein the step (a) stores the retrieval key candidates in the plurality of statistically hierarchized databases according to importance levels based on statistical information defined for the recognition target words, such that the recognition target words in a higher level statistically hierarchized database have relatively higher importance level than the recognition target words in a lower level statistically hierarchized database.

12. A speech recognition based interactive information retrieval apparatus for ascertaining and retrieving a target information of a user by determining a retrieval key entered by the user using a speech recognition processing, comprising:

a speech recognition database having a plurality of statistically hierarchized databases configured to store retrieval key candidates that constitute a number of data that cannot be processed by the speech recognition processing in a prescribed processing time as recognition target words, where lower level statistically hierarchized databases contain increasingly larger part of the retrieval key candidates such that a lower level statistically hierarchized database contains all the retrieval key candidates;

a speech recognition unit configured to carry out the speech recognition processing; and a dialogue control unit configured to carry out speech dialogues with the user;

wherein the dialogue control unit carries out a speech dialogue for requesting the user to enter a speech input indicating the retrieval key, such that the speech recognition unit carries out the speech recognition processing for the speech input with respect to all of the plurality of statistically hierarchized databases in parallel, to sequentially obtain respective recognition results indicating recognition retrieval key candidates and their recognition likelihoods;

the dialogue control unit selects those recognition retrieval key candidates which have recognition likelihoods that are exceeding a prescribed likelihood threshold as recognition retrieval key leading candidates, for each statistically hierarchized database for which the speech recognition processing is completed; and the dialogue control unit controls a next speech dialogue with the user according to whether a prescribed condition that a number of the recognition retrieval key leading candidates is less than or equal to a prescibed number but not zero is satisfied or not.

13. The apparatus of claim 12, wherein the dialogue control unit controls the next speech dialogue by:
carrying out a speech dialogue for a related information query to request the user to enter another speech input indicating a related information of the retrieval key, when the prescribed condition is satisfied, such that the speech recognition unit carries out the speech recognition processing for the another speech input to obtain another recognition result indicating recognition related information candidates and their recognition likelihoods,
adjusting the recognition result according to the another recognition result to obtain adjusted recognition result; and
carrying out a speech dialogue for a confirmation process according to the adjusted recognition result to determine the retrieval key.

14. The apparatus of claim 13, wherein the dialogue control unit adjusts the recognition result by calculating new recognition likelihoods for the recognition retrieval key candidates according to recognition likelihoods for the recognition retrieval key candidates indicated in the recognitin result and recognition likelihoods for the recognition related information candidates indicated in the another recognition result.

15. The apparatus of claim 14, wherein the dialogue control unit calculates the new recognition likelihoods for the recognition retrieval key candidates by normalizing the recognition likelihoods for the recognition retrieval key candidates indicated in the recognition result, normalizing the recognition likelihoods for the recognition related information candidates indicated in the another recognition result, and multiplying a normalized recognition likelihood of each recognition retrieval key candidate with a normalized recognition likelihood of a corresponding recognition related information candidate that is found to be related to each recognition retrieval key candidate.

16. The apparatus of claim 13, wherein the dialogue control unit also checks whether any of prescribed next dialogue leading conditions is satisfied or not, and shifts a recognition target to a next lower level statistically hierarchized database when any of the prescribed next dialogue leading conditions is satisfied.

17. The apparatus of claim 16, wherein the dialogue control unit adjusts the recognition result for the next lower level statistically hierarchized database according to a related information of the retrieval key to obtain another adjusted recognition result, selects those recognition retrieval key candidates which have recognition likelihoods that are exceeding the prescribed likelihood threshold as recognition retrieval key leading candidates, from the another adjusted recognition result, and controls a next speech dialogue with the user according to whether the prescribed condition that a number of recognition retrieval key leading candidates is less than or equal to a prescribed number but not zero is satisfied or not.

18. The apparatus of claim 17, wherein the related information used in adjusting the recognition result for the next lower level statistically hierarchized database is information already obtained before shifting the recognition target to the next lower level statistically hierarchized database in a course of processing a higher level statistically hierarchized database.

19. The apparatus of claim 17, wherein the related information used in adjusting the recognition result for the next lower level statistically hierarchized database is obtained by carrying out a speech dialogue for a related information query to request the user to enter another speech input for a related information of the retrieval key, when no related information of the retrieval key is obtained yet.

20. The apparatus of claim 16, wherein the prescribed next dialogue leading conditions include:
   (1) a case where the number of the recognition retrieval key leading candidates is not less than or equal to the prescribed number;
   (2) a case where the number of the recognition retrieval key leading candidates is zero;
   (3) a case where a recognition retrieval key candidate presented to the user in the confirmation process according to the adjusted recognition result is negated by the user; and
   (4) a case where no recognition retrieval key leading candidates is found to be related to the recognition related information candidates obtained by the speech recognition processing.

21. The apparatus of claim 12, wherein the speech recognition database stores the retrieval key candidates in the plurality of statistically hierarchized databases, such that an (n+1)-th level statistically hierarchized database contains a number of the retrieval key candidates that can be processed by the speech recognition processing while carrying out a speech dialogues with the user to determine the retrieval key using an n-th level statistically hierarchized database.

22. The apparatus of claim 12, wherein the speech recognition database stores the retrieval key candidates in the plurality of statistically hierarchized databases according to importance levels based on statistical information defined for the recognition target words, such that the recognition target words in a higher level statistically hierarchized database have relatively higher importance level than the recognition target words in a lower level statistically hierarchized database.

23. A computer usable medium having computer readable program codes embodied therein for causing a computer to function as a speech recognition based interactive information retrieval system for ascertaining and retrieving a target information of a user by determining a retrieval key entered by the user using a speech recognition processing and a speech recognition database having a plurality of statistically hierarchized databases for storing retrieval key candidates that constitute a number of data that cannot be processed by the speech recognition processing in a prescribed processing time as recognition target words, where lower level statistically hierarchized databases contain increasingly larger part of the retrieval key candidates such that a lowest level statistically hierarchized databases contains all the retrieval key candidates, the computer readable program codes include:

a first computer readable program code for causing said computer to request the user by a speech dialogue with the user to enter a speech input indicating the retrieval key, and carry out the speech recognition processing for the speech input with respect to all of the plurality of statistically hierarchized databases in parallel, to sequentially obtain respective recognition results indicating recognition retrieval key candidates and their recognition likelihoods;

a second computer readable program code for causing said computer to select those recognition retrieval key candidates which have recognition likelihoods that are exceeding a prescribed likelihood threshold as recognition retrieval key leading candidates, for each statistically hierarchized database for which the speech recognition processing is completed; and a third computer readable program code for causing said computer to control a next speech dialogue with the user according to whether a prescribed condition that a number of the recognition retrieval key leading candidates is less than or equal to a prescribed number but not zero is satisfied or not.

* * * * *